United States Patent
Um et al.

(10) Patent No.: US 11,985,685 B2
(45) Date of Patent: May 14, 2024

(54) METHOD AND APPARATUS FOR TRANSMITTING SOUNDING REFERENCE SIGNAL IN WIRELESS COMMUNICATION SYSTEM OF UNLICENSED BAND AND METHOD AND APPARATUS FOR TRIGGERING SOUNDING REFERENCE SIGNAL TRANSMISSION

(71) Applicant: Electronics and Telecommunications Research Institute, Daejeon (KR)

(72) Inventors: Jung Sun Um, Daejeon (KR); Hoiyoon Jung, Daejeon (KR); Seung Keun Park, Daejeon (KR); Sungjin Yoo, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 0 days.

(21) Appl. No.: 18/111,148

(22) Filed: Feb. 17, 2023

(65) Prior Publication Data
US 2023/0199788 A1   Jun. 22, 2023

Related U.S. Application Data

(62) Division of application No. 17/176,175, filed on Feb. 15, 2021, now Pat. No. 11,589,381, which is a
(Continued)

(30) Foreign Application Priority Data

Dec. 29, 2015   (KR) .................. 10-2015-0188802
Jan. 29, 2016   (KR) .................. 10-2016-0011803
(Continued)

(51) Int. Cl.
*H04W 72/23*   (2023.01)
*H04L 5/00*    (2006.01)
(Continued)

(52) U.S. Cl.
CPC .......... *H04W 72/23* (2023.01); *H04L 5/0048* (2013.01); *H04L 5/005* (2013.01); *H04L 5/0051* (2013.01);
(Continued)

(58) Field of Classification Search
CPC . H04W 72/23; H04W 16/14; H04W 72/0446; H04W 74/0808; H04W 84/12;
(Continued)

(56) References Cited

U.S. PATENT DOCUMENTS 8,755,340 B2   6/2014  Anderson et al.
8,831,042 B2   9/2014  Kim et al.
(Continued)

FOREIGN PATENT DOCUMENTS

CN   101617489 A   12/2009
CN   103299703 A    9/2013
(Continued)

OTHER PUBLICATIONS

Technical Document R1-168225, "Introduction of eLAA into 36.212," 29 pages, 3GPP TSG-RAN WG1 Meeting #86, Gothenburg, Sweden, Aug. 22-26, 2016.
(Continued)

*Primary Examiner* — Ashley Shivers
(74) *Attorney, Agent, or Firm* — NSIP Law

(57) ABSTRACT

Disclosed herein is a method for transmitting, by a terminal, a sounding reference signal (SRS). The terminal receives a grant for uplink multiple subframes from a base station. The terminal determines a first subframe for an SRS transmission of the terminal among the uplink multiple subframes on the basis of SRS transmission position information received from the base station. Further, the terminal transmits the SRS in the first subframe.

12 Claims, 30 Drawing Sheets

Related U.S. Application Data division of application No. 15/769,897, filed as application No. PCT/KR2016/015365 on Dec. 28, 2016, now Pat. No. 10,925,085.

(30) Foreign Application Priority Data

| Apr. 1, 2016 | (KR) | ........................ 10-2016-0040443 |
| Apr. 1, 2016 | (KR) | ........................ 10-2016-0040443 |
| May 3, 2016 | (KR) | ........................ 10-2016-0054764 |
| May 13, 2016 | (KR) | ........................ 10-2016-0059061 |
| Aug. 12, 2016 | (KR) | ........................ 10-2016-0103160 |
| Dec. 26, 2016 | (KR) | ........................ 10-2016-0179245 |

(51) Int. Cl.

| *H04L 27/00* | (2006.01) |
|---|---|
| *H04L 27/26* | (2006.01) |
| *H04W 16/14* | (2009.01) |
| *H04W 72/0446* | (2023.01) |
| *H04L 25/02* | (2006.01) |
| *H04W 74/0808* | (2024.01) |
| *H04W 84/12* | (2009.01) |

(52) U.S. Cl.
CPC ........ *H04L 5/0053* (2013.01); *H04L 27/0006* (2013.01); *H04L 27/261* (2013.01); *H04W 16/14* (2013.01); *H04W 72/0446* (2013.01); *H04L 5/0035* (2013.01); *H04L 25/0224* (2013.01); *H04W 74/0808* (2013.01); *H04W 84/12* (2013.01)

(58) Field of Classification Search
CPC .. H04W 72/20; H04W 84/042; H04L 5/0048; H04L 5/005; H04L 5/0051; H04L 5/0053; H04L 27/0006; H04L 27/261; H04L 5/0035; H04L 25/0224; H04L 5/0005; H04L 5/0007; H04L 5/001; H04L 5/0055; H04L 27/2601
See application file for complete search history.

(56) References Cited

U.S. PATENT DOCUMENTS

| 9,668,207 | B2 | 5/2017 | Östergaard et al. |
|---|---|---|---|
| 10,305,652 | B2 | 5/2019 | Zhang |
| 10,925,085 | B2 | 2/2021 | Um et al. |
| 2011/0268028 | A1 | 11/2011 | Stern-Berkowitz et al. |
| 2012/0014349 | A1* | 1/2012 | Chung .............. H04W 72/0453 |
| | | | 370/329 |
| 2012/0176977 | A1 | 7/2012 | Gao et al. |
| 2012/0257582 | A1 | 10/2012 | Damnjanovic et al. |
| 2013/0188619 | A1* | 7/2013 | Dinan .................. H04W 72/23 |
| | | | 370/336 |
| 2013/0242958 | A1* | 9/2013 | Dinan .................. H04L 5/0085 |
| | | | 370/336 |
| 2013/0329660 | A1 | 12/2013 | Noh |
| 2014/0029569 | A1 | 1/2014 | Ni |
| 2014/0086119 | A1 | 3/2014 | Yang et al. |
| 2014/0335858 | A1 | 11/2014 | Lee et al. |
| 2015/0023315 | A1 | 1/2015 | Yerramalli et al. |
| 2015/0201431 | A1 | 7/2015 | Um et al. |
| 2015/0223075 | A1 | 8/2015 | Bashar et al. |
| 2015/0334695 | A1 | 11/2015 | Kim et al. |
| 2016/0095114 | A1 | 3/2016 | Kim et al. |
| 2016/0330720 | A1 | 11/2016 | Yang et al. |
| 2017/0048717 | A1* | 2/2017 | Yoo ........................ H04L 5/1469 |
| 2017/0201967 | A1* | 7/2017 | Yang ........................ H04L 5/14 |
| 2018/0007576 | A1 | 1/2018 | Lee et al. |
| 2018/0048498 | A1 | 2/2018 | Stern-Berkowitz et al. |
| 2018/0191483 | A1* | 7/2018 | Yamazaki ......... H04W 74/0833 |
| 2018/0255578 | A1 | 9/2018 | Kim et al. |
| 2018/0279365 | A1 | 9/2018 | Wang et al. |
| 2018/0332618 | A1 | 11/2018 | Kakishima et al. |
| 2021/0168853 | A1 | 6/2021 | Um et al. |

FOREIGN PATENT DOCUMENTS

| CN | 103733717 A | 4/2014 |
|---|---|---|
| CN | 104955158 A | 9/2015 |
| EP | 2 955 971 A1 | 12/2015 |
| KR | 10-2014-0026494 A | 3/2014 |
| WO | WO 2016/123402 A1 | 8/2016 |

OTHER PUBLICATIONS

3GPP TS 36.212 V14.0.0 (Sep. 2016), "3rd Generation Partnership Project; Technical Specification Group Radio Access Network; Evolved Universal Terrestrial Radio Access (E-UTRA); Multiplexing and channel coding (Release 14)," pp. 1-148, Sep. 29, 2016.

3GPP TS 36.213 V14.0.0 (Sep. 2016), "3rd Generation Partnership Project; Technical Specification Group Radio Access Network; Evolved Universal Terrestrial Radio Access (E-UTRA); Physical Layer Procedures (Release 14)," pp. 46-263, Sep. 29, 2016.

3GPP TS 36.213 V14.0.0 (Sep. 2016), "3rd Generation Partnership Project; Technical Specification Group Radio Access Network; Evolved Universal Terrestrial Radio Access (E-UTRA); Physical Layer Procedures (Release 14)," pp. 345-395, Sep. 29, 2016.

International Search Report dated Mar. 20, 2017, in counterpart International Patent Application No. PCT/KR2016/015365 (2 pages in English and 2 pages in Korean).

Partial Supplementary European Search Report dated Jul. 23, 2019, in counterpart European Patent Application No. 16882077.7 (14 pages in English).

U.S. Appl. No. 17/176,175, filed Feb. 15, 2021, Jung Sun Um et al., Electronics and Telecommunications Research Institute.

* cited by examiner

FIG. 6
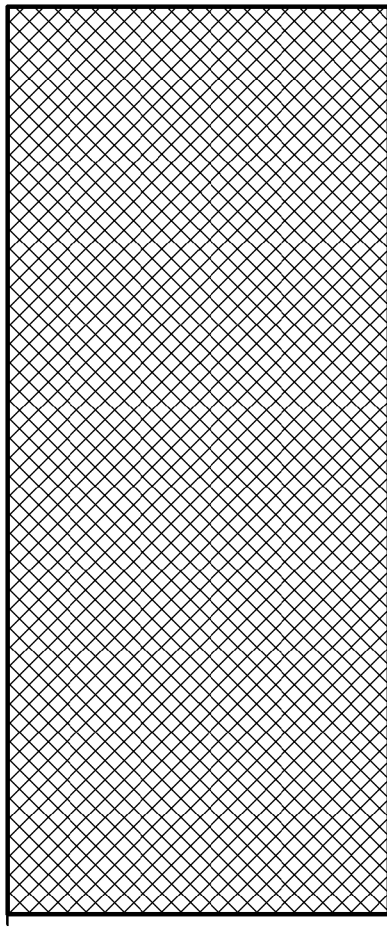
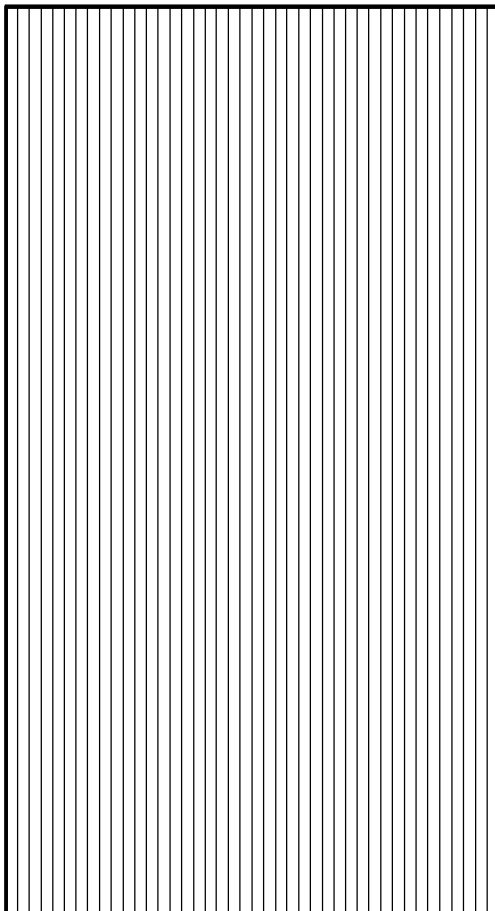

METHOD AND APPARATUS FOR TRANSMITTING SOUNDING REFERENCE SIGNAL IN WIRELESS COMMUNICATION SYSTEM OF UNLICENSED BAND AND METHOD AND APPARATUS FOR TRIGGERING SOUNDING REFERENCE SIGNAL TRANSMISSION

CROSS-REFERENCE TO RELATED APPLICATIONS

This application is a divisional application of U.S. patent application Ser. No. 17/176,175 filed on Feb. 15, 2021, which is a divisional application of U.S. patent application Ser. No. 15/769,897 filed on Apr. 20, 2018, now U.S. Pat. No. 10,925,085 issued on Feb. 16, 2021, which is a U.S. national stage application of International Application No. PCT/KR2016/015365 filed on Dec. 28, 2016. This application claims the benefit under 35 USC 119(a) and 365(b) of Korean Patent Application No. 10-2015-0188802 filed on Dec. 29, 2015, Korean Patent Application No. 10-2016-0011803 filed on Jan. 29, 2016, Korean Patent Application No. 10-2016-0040443 filed on Apr. 1, 2016, Korean Patent Application No. 10-2016-0054764 filed on May 3, 2016, Korean Patent Application No. 10-2016-0059061 filed on May 13, 2016, Korean Patent Application No. 10-2016-0103160 filed on Aug. 12, 2016, and Korean Patent Application No. 10-2016-0179245 filed on Dec. 26, 2016, all of which were filed in the Korean Intellectual Property Office. The entire disclosures of application Ser. Nos. 15/769,897 and 17/176,175, International Application No. PCT/KR2016/015365, and Korean Patent Application Nos. 10-2015-0188802, 10-2016-0011803, 10-2016-0040443, 10-2016-0054764, 10-2016-0059061, 10-2016-0103160, and 10-2016-0179245 are incorporated herein by reference for all purposes.

TECHNICAL FIELD

The present invention relates to a method and an apparatus for transmitting a sounding reference signal in a wireless communication system of an unlicensed band.

Further, the present invention relates to a method and an apparatus for configuring and allocating a resource for a sounding reference signal transmission.

BACKGROUND ART

With the development of information communication technologies, various wireless communication technologies have been developed. The wireless communication technology may be largely classified into a wireless communication technology using a licensed band, a wireless communication technology using an unlicensed band (for example, industrial scientific medical (ISM) band), or the like depending on a used band. A use right of the licensed band is exclusively assigned to one operator, and therefore the wireless communication technology using the licensed band may provide more excellent reliability, communication quality, or the like than the wireless communication technology using the licensed band.

An example of representative wireless communication technologies using a licensed band may include long term evolution (LTE), etc. defined in the 3rd generation partnership project (3GPP) standard. A base station (NodeB, NB) and a terminal (user equipment, UE) supporting the LTE may transmit and receive a signal through the licensed band.

An example of representative wireless communication technologies using an unlicensed band may include a wireless local area network (WLAN), etc. defined in the Institute of Electrical and Electronics Engineers (IEEE) 802.11 standard. An access point (AP) and a station (STA) each supporting WLAN may transmit and receive a signal through the unlicensed band.

Meanwhile, mobile traffic has grown explosively in recent years. Therefore, there is a need to additionally secure the licensed band to process the mobile traffic through the licensed band. However, the licensed band is finite and the general licensed band may be secured by a frequency band auction among operators, or the like. Therefore, it may cost the operators an astronomical amount of money to secure the additional licensed band. To solve the problem, a method for providing an LTE service through an unlicensed band may be considered.

An unlicensed band cell has different characteristics from a cell in the existing licensed band. The unlicensed band cell opportunistically occupies a channel and therefore may not continuously occupy the channel over a predetermined time. For this reason, resources capable of transmitting a sounding reference signal (SRS) in the wireless communication system of the unlicensed band may not be guaranteed. Thus, unlike the licensed band, a method for configuring and allocating resources for transmitting sounding reference signals in an unlicensed band needs to be defined.

DISCLOSURE

Technical Problem

The present invention has been made in an effort to provide a method and an apparatus for transmitting a sounding reference signal in a wireless communication system of an unlicensed band.

Further, the present invention has been made in an effort to provide a method and an apparatus for configuring and allocating a resource for a sounding reference signal transmission.

In addition, the present invention has been made in an effort to provide a method and an apparatus for configuring a resource for a sounding reference signal transmission in an unlicensed band and allocating the resource to user equipment.

Technical Solution

An exemplary embodiment of the present invention provides a method for transmitting, by a terminal, a sounding reference signal (SRS). The method for transmitting, by the terminal, an SRS includes: receiving a grant for uplink multiple subframes from a base station; determining a first subframe for an SRS transmission of the terminal among the uplink multiple subframes on the basis of SRS transmission position information received from the base station; and transmitting the SRS in the first subframe.

The number of bits included in the SRS transmission position information may be determined on the basis of a first value that is the maximum number of subframes included in the uplink multiple subframes and a second value that is the maximum number of subframes configurable for an SRS transmission among the uplink multiple subframes.

The determining may include: receiving the SRS transmission position information of 2 bits from the base station when the first value is 4 and the second value is 4; and receiving the SRS transmission position information of 1 bit from the base station when the first value is 4 and the second value is 2.

The determining may include: determining a first time domain symbol for the SRS transmission of the terminal among time domain symbols of the first subframe on the basis of SRS symbol position information. The SRS symbol position information may be included in a UE-specific SRS configuration parameter signaled by a higher layer.

The SRS symbol position information may be included in downlink control information (DCI) for triggering of an SRS transmission.

Another exemplary embodiment of the present invention provides a method for triggering, by a base station, a sounding reference signal (SRS) transmission. The method for triggering, by a base station, an SRS transmission includes: granting, to a first terminal, first uplink multiple subframes including a plurality of SRS subframes in which the SRS transmission is possible; triggering the SRS transmission in a first SRS subframe among the plurality of SRS subframes for the first terminal; granting the first SRS subframe to a second terminal; and triggering the SRS transmission in the first SRS subframe for the second terminal.

The triggering of the SRS transmission for the first terminal may include: triggering the SRS transmission in the first SRS subframe and the remaining SRS subframes among the plurality of SRS subframes for the first terminal, through an SRS request field included in first downlink control information (DCI) for granting the first uplink multiple subframes.

The triggering of the SRS transmission for the first terminal may include: triggering the SRS transmission in the headmost first SRS subframe among the plurality of SRS subframes for the first terminal, through an SRS request field included in first downlink control information (DCI) for granting the first uplink multiple subframes.

The SRS transmission in the remaining SRS subframes other than the first SRS subframe among the plurality of SRS subframes may not be triggered.

A physical uplink shared channel (PUSCH) may be configured in a last time domain symbol of the remaining SRS subframes. The triggering of the SRS transmission for the first terminal may include: triggering the SRS transmission in the first SRS subframe that is the last subframe among the plurality of SRS subframes for the first terminal, through an SRS request field included in first downlink control information (DCI) for granting the first uplink multiple subframes.

The SRS transmission in the remaining SRS subframes other than the first SRS subframe among the plurality of SRS subframes may not be triggered. The granting to the second terminal may include: granting second uplink multiple subframes different from the first uplink multiple subframes and including the first SRS subframe to the second terminal.

The triggering of the SRS transmission for the first terminal may include: triggering the SRS transmission in the first SRS subframe for the first terminal, through an SRS request field included in first downlink control information (DCI) for granting the first uplink multiple subframes. The triggering of the SRS transmission for the second terminal may include: triggering the SRS transmission in the first SRS subframe for the second terminal, through an SRS request field included in second downlink control information (DCI) for granting the second uplink multiple subframes.

The SRS may not be transmitted in the remaining subframes other than the first SRS subframe among the first uplink multiple subframes.

The SRS may not be transmitted in the remaining subframes other than the first SRS subframe among the second uplink multiple subframes.

Yet another exemplary embodiment of the present invention provides a method for transmitting, by a terminal, a sounding reference signal (SRS). The method for transmitting, by terminal, an SRS includes: receiving timing advance (TA) information for an SRS transmission from a base station, through at least one of a radio resource control (RRC) message and a downlink control information (DCI) message; and transmitting an SRS at timing based on the TA information by using at least one of an SRS subframe configured for the SRS transmission and an extended uplink pilot time slot (UpPTS).

The extended UpPTS may be spaced by a predetermined interval from a downlink partial subframe having a downlink pilot time slot (DwPTS) length.

The downlink partial subframe may have a length corresponding to one of three time domain symbols, six time domain symbols, nine time domain symbols, ten time domain symbols, eleven time domain symbols, and twelve time domain symbols.

The predetermined interval may be equal to or larger than a length corresponding to one time domain symbol.

A last time domain symbol of a subframe including the extended UpPTS may be used for clear channel assessment (CCA) for an unlicensed band channel.

Some time domain symbols existing in a head part among time domain symbols of the SRS subframe or some time domain symbols existing in a tail part among time domain symbols of the SRS subframe can be used for the SRS transmission.

One time domain symbol existing in a head part or one time domain symbol existing in a tail part among time domain symbols of the SRS subframe may be used for clear channel assessment (CCA) for an unlicensed band channel.

Even-numbered time domain symbols among time domain symbols of the SRS subframe can be used for the SRS transmission.

Odd-numbered time domain symbols among the time domain symbols of the SRS subframe may be used for clear channel assessment (CCA) for an unlicensed band channel.

A second time slot among a first time slot and the second time slot subsequent to the first time slot included in the SRS subframe can be used for the SRS transmission.

Advantageous Effects

According to the embodiment of the present invention, it is possible to effectively transmit the sounding reference signal in consideration of the opportunistic discontinuous channel characteristics of the unlicensed band.

DESCRIPTION OF THE DRAWINGS

FIG. 6 is a diagram illustrating an SRS symbol set configured after a last partial subframe included in a downlink transmission burst, according to an exemplary embodiment of the present invention.

MODE FOR INVENTION

Figure 1:
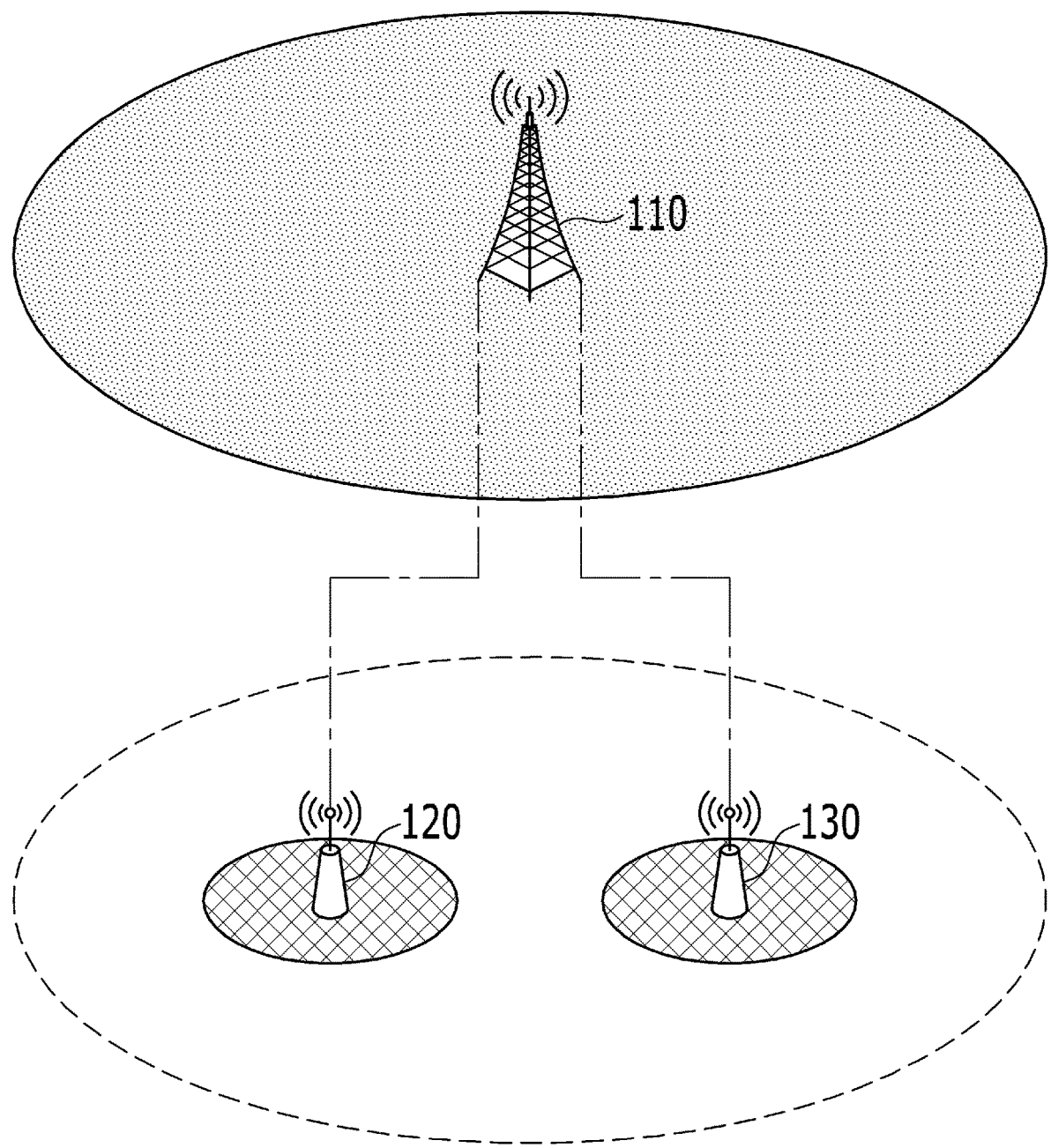
FIG. 1, FIG. 2, FIG. 3, and FIG. 4 are diagrams illustrating an example of a wireless communication network.

In the following detailed description, only certain example embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

In the present specification, the overlapping description of the same components will be omitted.

Further, in the present specification, it is to be understood that when one component is referred to as being "connected to" or "coupled to" another element, it may be connected directly to or coupled directly to another element or be connected to or coupled to another element, having the other element intervening therebetween. On the other hand, in the present specification, it is to be understood that when one element is referred to as being "connected directly to" or "coupled directly to" another element, it may be connected to or coupled to another element without the other element intervening therebetween.

Further, terms used in the present specification are used only in order to describe specific exemplary embodiments rather than limiting the present invention.

Further, in the present specification, singular forms may be intended to include plural forms unless the context clearly indicates otherwise.

Further, in the present specification, it will be further understood that the terms "include" or "have" used in the present specification, specify the presence of features, numerals, steps, operations, components, parts mentioned in the present specification, or a combination thereof, but do not preclude the presence or addition of one or more other features, numerals, steps, operations, components, parts, or a combination thereof.

Further, in the present specification, the term "and/or" includes a combination of a plurality of relevant items or any of a plurality of relevant items. In the present specification, 'A or B' may include 'A', 'B', or 'A and B'.

Further, in the present specification, a terminal may refer to a mobile terminal, a station, a mobile station, an advanced mobile station, a high reliability mobile station, a subscriber station, a portable subscriber station, an access terminal, user equipment (UE), a node, a device, and the like and may also include all or some of the functions of the terminal, the mobile terminal, the station, the mobile station, the advanced mobile station, the high reliability mobile station, the subscriber station, the portable subscriber station, the access terminal, the user equipment, the node, the device, and the like.

Further, in the present specification, a base station (BS) may refer to an advanced base station, a high reliability base station, a nodeB (NB), an evolved node B (eNodeB, eNB), a radio base station, a radio transceiver, an access point, an access node, a radio access station, a base transceiver station, a mobile multihop relay (MMR)-BS, a relay station serving as the base station, a high reliability relay station serving as the base station, a repeater, a macro base station, a small base station, and the like and may also include all or some of the functions of the base station, the advanced base station, the high reliability base station, the nodeB, the eNodeB, the radio base station, the radio transceiver, the access point, the access node, the radio access station, the base transceiver station, the MMR-BS, the relay station, the high reliability relay station, the repeater, the macro base station, the small base station, and the like.

FIG. 1, FIG. 2, FIG. 3, and FIG. 4 are diagrams illustrating an example of a wireless communication network.

In detail, FIGS. 1 to 4 illustrate a wireless communication network to which a method and an apparatus according to an exemplary embodiment of the present invention are applied. However, this is only an example, and the wireless communication network to which the method and apparatus according to the exemplary embodiment of the present invention are applied is not limited to the wireless communication network described herein. The method and apparatus according to the exemplary embodiment of the present invention may be applied to various wireless communication networks.

FIG. 1 illustrates an example of the wireless communication network.

In the wireless communication network illustrated in FIG. 1, a first base station 110 may support cellular communications (e.g., LTE, LTE-advanced (LTE-A), LTE-unlicensed (LTE-U), etc. defined in the 3GPP standard). The first base station 110 may support multiple input multiple output (MIMO) (e.g., single user (SU)-MIMO, multi user (MU)-MIMO, massive MIMO, or the like), coordinated multipoint (CoMP), carrier aggregation (CA), or the like. The first base station 110 may be operated in a licensed band F1 and may form a macro cell. The first base station 110 may be connected to other base stations (for example, a second base station 120, a third base station 130, or the like) through an ideal backhaul or a non-ideal backhaul.

The second base station 120 may be located within a coverage of the first base station 110. The second base station 120 may be operated in an unlicensed band F3 and may form a small cell.

The third base station 130 may be located within the coverage of the first base station 110. The third base station 130 may be operated in the unlicensed band F3 and may form the small cell.

The second base station 12 and the third base station 130 may each support the WLAN defined in the IEEE 802.11 standard.

The first base station 110 and a terminal (for example, UE) connected to the first base station 110 may each transmit/receive a signal through a CA between the licensed band F1 and the unlicensed band F3.

Figure 2:
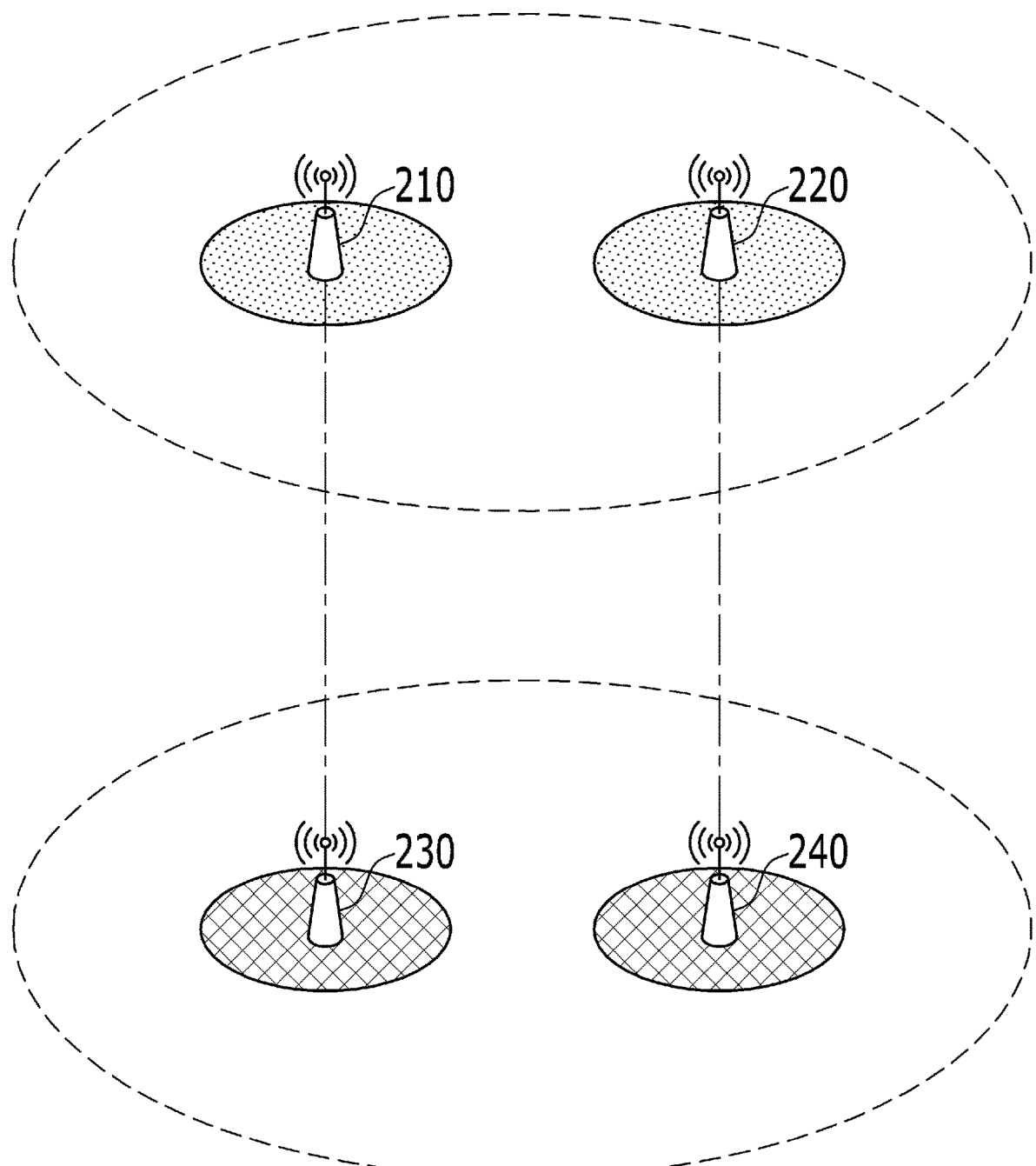

FIG. 2 illustrates another example of the wireless communication network.

In the wireless communication network illustrated in FIG. 2, a first base station 210 and a second base station 220 may each support cellular communications (e.g., LTE, LTE-A, LTE-U, etc. defined in the 3GPP standard). The first base station 210 and the second base station 220 may each support the MIMO (e.g., SU-MIMO, MU-MIMO, massive MIMO, or the like), the CoMP, the CA, or the like. The first base station 210 and the second base station 220 may each be operated in the licensed band F1 and may form the small cell. The first base station 210 and the second base station 220 may each located within coverage of the base station that forms the macro cell. The first base station 210 may be connected to a third base station 230 through the ideal backhaul or the non-ideal backhaul. The second base station 220 may be connected to a fourth base station 240 through the ideal backhaul or the non-ideal backhaul.

The third base station 230 may be located within the coverage of the first base station 210. The third base station 230 may be operated in the unlicensed band F3 and may form the small cell.

The fourth base station 240 may be located within a coverage of the second base station 220. The fourth base station 240 may be operated in the unlicensed band F3 and may form the small cell.

The third base station 230 and the fourth base station 240 may each support the WLAN defined in the IEEE 802.11 standard.

The first base station 210, the terminal connected to the first base station 210, the second base station 220, and the terminal connected to the second base station 220 may each transmit/receive a signal through the CA between the licensed band F1 and the unlicensed band F3.

Figure 3:
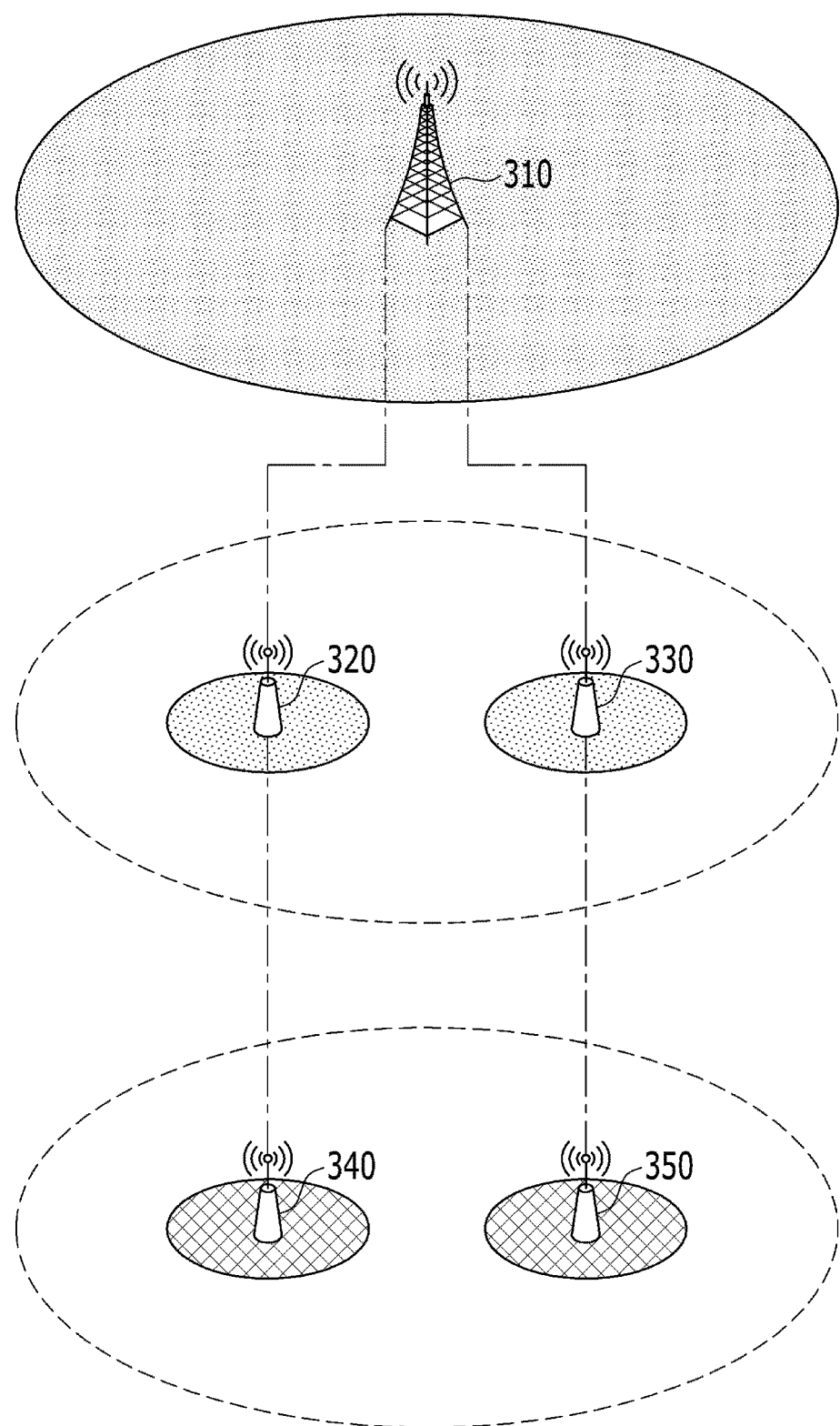

FIG. 3 illustrates yet another example of the wireless communication network.

In the wireless communication network illustrated in FIG. 3, a first base station 310, a second base station 320, and a third base station 330 may each support cellular communications (e.g., LTE, LTE-A, LTE-U, etc. defined in the 3GPP standard). The first base station 310, the second base station 320, and the third base station 330 may each support the MIMO (e.g., SU-MIMO, MU-MIMO, massive MIMO, or the like), the CoMP, the CA, or the like.

The first base station 310 may be operated in the licensed band F1 and may form the macro cell. The first base station 310 may be connected to other base stations (for example, the second base station 320, the third base station 330, or the like) through the ideal backhaul or the non-ideal backhaul.

The second base station 320 may be located within coverage of the first base station 310. The second base station 320 may be operated in the licensed band F1 and may form the small cell.

The third base station 330 may be located within the coverage of the first base station 310. The third base station 330 may be operated in the licensed band F1 and may form the small cell.

The second base station 320 may be connected to a fourth base station 340 through the ideal backhaul or the non-ideal backhaul. The fourth base station 340 may be located within coverage of the second base station 320. The fourth base station 340 may be operated in the unlicensed band F3 and may form the small cell.

The third base station 330 may be connected to a fifth base station 350 through the ideal backhaul or the non-ideal backhaul. The fifth base station 350 may be located within coverage of the third base station 330. The fifth base station 350 may be operated in the unlicensed band F3 and may form the small cell.

The fourth base station 340 and the fifth base station 350 may each support the WLAN defined in the IEEE 802.11 standard.

The first base station 310, the terminal connected to the first base station 310, the second base station 320, the terminal connected to the second base station 320, the third base station 330, and the terminal connected to the third base station 330 may each transmit/receive a signal through the CA between the licensed band F1 and the unlicensed band F3.

Figure 4:
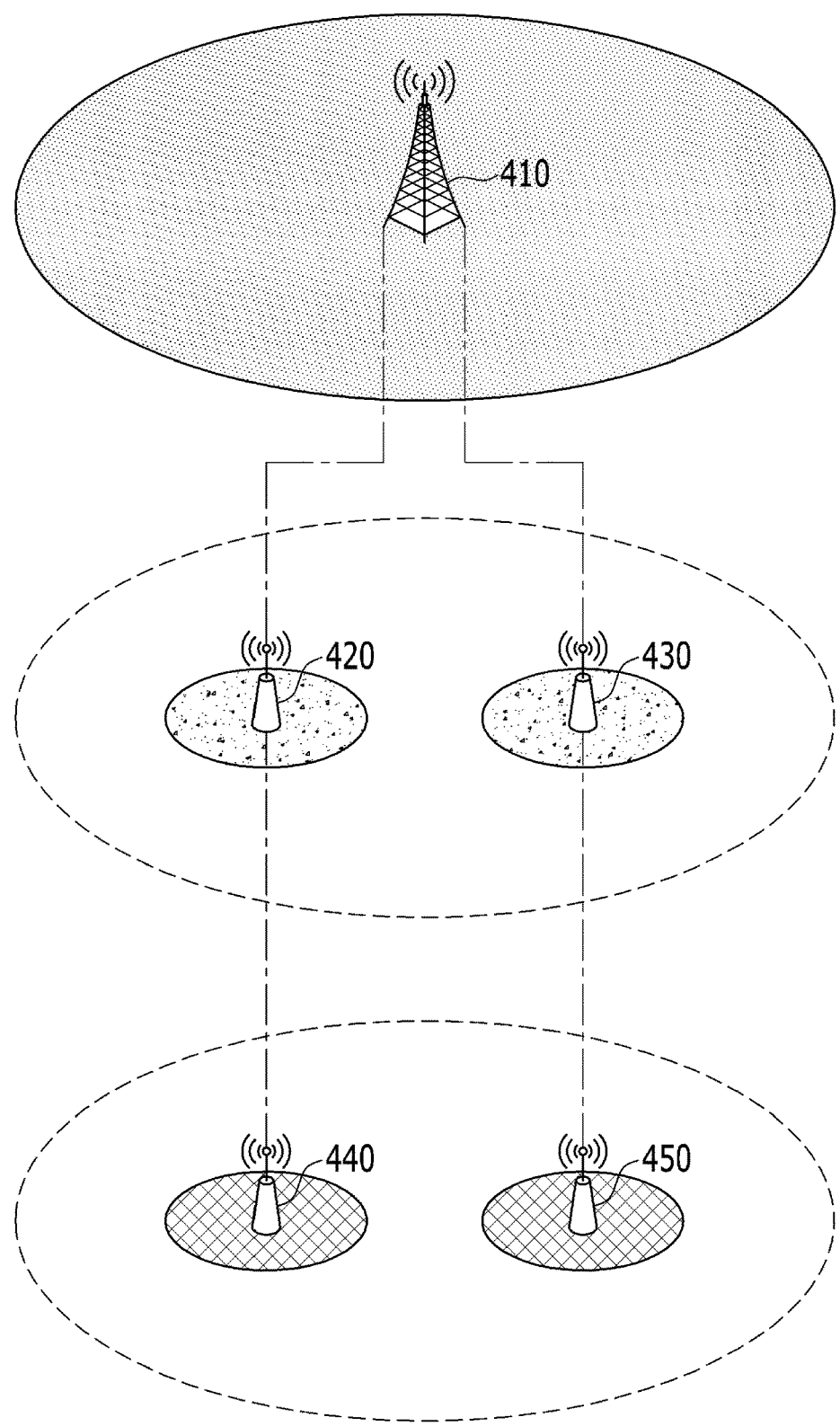

FIG. 4 illustrates yet another example of the wireless communication network.

In the wireless communication network illustrated in FIG. 4, a first base station 410, a second base station 420, and a third base station 430 may each support cellular communications (e.g., LTE, LTE-A, LTE-U, etc. defined in the 3GPP standard). The first base station 410, the second base station 420, and the third base station 430 may each support the MIMO (e.g., SU-MIMO, MU-MIMO, massive MIMO, or the like), the CoMP, the CA, or the like.

The first base station 410 may be operated in the licensed band F1 and may form the macro cell. The first base station 410 may be connected to other base stations (for example, the second base station 420, the third base station 430, or the like) through the ideal backhaul or the non-ideal backhaul.

The second base station 420 may be located within coverage of the first base station 410. The second base station 420 may be operated in the licensed band F2 and may form the small cell.

The third base station 430 may be located within the coverage of the first base station 410. The third base station 430 may be operated in the licensed band F2 and may form the small cell.

The second base station 420 and the third base station 430 may each be operated in a licensed band F2 different from the licensed band F1 in which the first base station 410 is operated.

The second base station 420 may be connected to a fourth base station 440 through the ideal backhaul or the non-ideal backhaul. The fourth base station 440 may be located within coverage of the second base station 420. The fourth base station 440 may be operated in the unlicensed band F3 and may form the small cell.

The third base station 430 may be connected to a fifth base station 450 through the ideal backhaul or the non-ideal backhaul. The fifth base station 450 may be located within coverage of the third base station 430. The fifth base station 450 may be operated in the unlicensed band F3 and may form the small cell.

The fourth base station 440 and the fifth base station 450 may each support the WLAN defined in the IEEE 802.11 standard.

The first base station 410 and a terminal (for example, UE) connected to the first base station 410 may each transmit/receive a signal through a CA between the licensed band F1 and the unlicensed band F3. The second base station 420, the terminal connected to the second base station 420, the third base station 430, and the terminal connected to the third base station 430 may each transmit/receive a signal through the CA between the licensed band F2 and the unlicensed band F3.

Meanwhile, communication nodes (for example, base station, terminal, or the like) that configure the wireless communication network may transmit a signal in the unlicensed band on the basis of a listen before talk (LBT) procedure. That is, the communication node may perform an energy detection operation to determine an occupancy state of the unlicensed band. The communication node may transmit a signal when it is determined that the unlicensed band is in an idle state. In this case, the communication node may transmit a signal when the unlicensed band is in the idle state during a contention window depending on a random backoff operation. On the other hand, the communication node may not transmit a signal when it is determined that the state of the unlicensed band is in a busy state.

Alternatively, the communication node may transmit a signal on the basis of a carrier sensing adaptive transmission (CSAT) procedure. That is, the communication node may transmit a signal on the basis of a preset duty cycle. The communication node may transmit a signal when the current duty cycle is a duty cycle that is allocated for the communication node supporting cellular communications. On the other hand, the communication node may not transmit a signal when the current duty cycle is a duty cycle that is allocated for the communication node supporting communications (e.g., WLAN, or the like) other than the cellular communications. The duty cycle may be adaptively determined on the basis of the number of communication nodes present in the unlicensed band and supporting the WLAN, the use state of the unlicensed band, or the like.

The communication node may perform a discontinuous transmission in the unlicensed band. For example, when a maximum transmission duration or a maximum channel occupancy time (COT) is set in an unlicensed band, the communication node may transmit a signal within a maximum transmission duration. If the communication node fails to transmit all of the signals within the current maximum transmission duration, the remaining signals may be transmitted in the next maximum transmission duration. Further, the communication node may select a carrier having a relatively smaller interference in the unlicensed band and may be operated in the selected carrier. Further, when transmitting a signal in the unlicensed band, the communication node may control transmit power to reduce an interference with other communication nodes.

Meanwhile, the communication node may support code division multiple access (CDMA)-based communication protocol, wideband CDMA (WCDMA)-based communication protocol, time division multiple access (TDMA)-based communication protocol, frequency division multiple access (FDMA)-based communication protocol, single carrier (SC)-FDMA-based communication protocol, orthogonal frequency division multiplexing (OFDM)-based communication protocol, orthogonal frequency division multiple access (OFDMA)-based communication protocol, or the like.

Figure 5:
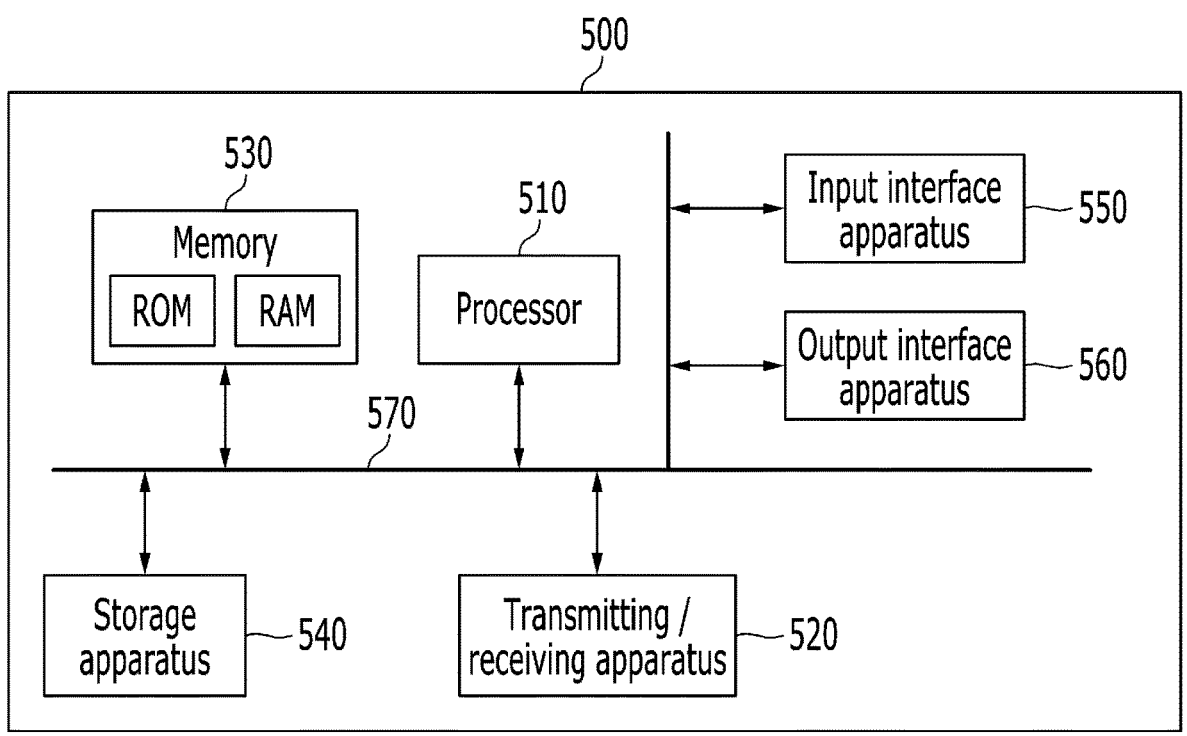
FIG. 5 is a diagram illustrating a communication node configuring a wireless communication network.

FIG. 5 is a diagram illustrating a communication node configuring a wireless communication network. A communication node 500 may be the base station, the terminal, or the like that are described in the present specification.

In the exemplary embodiment of FIG. 5, the communication node 500 may include at least one processor 510 and a transmitting/receiving apparatus 520 connected to a network to perform communications, and a memory 530. Further, the communication node 500 may further include a storage apparatus 540, an input interface apparatus 540, an output interface apparatus 560, or the like. Each of the components included in the communication node 500 may be connected to each other by a bus 570 to communication with each other.

The processor 510 may run a program command that is stored in at least one of the memory 530 and the storage apparatus 540. The processor 510 may mean a central processing unit (CPU), a graphics processing unit (GPU), or an exclusive process that performs method according to exemplary embodiments of the present invention. The processor 510 may be configured to implement the procedures, the functions, and the methods described with reference to the exemplary embodiment of the present invention. The processor 510 may control each of the components of the communication node 500.

The memory TN130 and the storage apparatus 540 may each store various information associated with the operation of the processor 510. The memory 530 and the storage apparatus 540 may each be configured of at least one of a volatile storage medium and a non-volatile storage medium. For example, the memory 530 may be configured of at least one of a read only memory (ROM) and a random access memory (RAM).

The transmitting/receiving apparatus 520 may transmit or receive a wired signal or a wireless signal. Further, the communication node 500 may have a single antenna or a multiple antenna.

Meanwhile, the communication node may be operated as follows in the wireless communication network. Even when a method (e.g., transmission or reception of a signal) performed by a first communication node among the communication nodes is described, a second communication node corresponding to the first communication node may perform a method (e.g., reception or transmission of a signal) corresponding to the method performed by the first communication node. That is, when an operation of the terminal is described, the base station corresponding to the terminal may perform an operation corresponding to the operation of the terminal. On the contrary, when the operation of the base station is described, the terminal corresponding to the base station may perform an operation corresponding to the operation of the base station.

Hereinafter, a method of configuring a sounding reference signal (SRS) using two or more time domain symbols (e.g., SC-FDMA symbols) within a transmission time interval (TTI) of 1 ms will be described. Further, hereinafter, a method for transmitting an SRS in a plurality of SC-FDMA symbol intervals during a period other than a downlink pilot time slot (DwPTS) in a TTI or a method for transmitting an SRS depending on a period and symbol position information configured (set) in a terminal will be described.

Further, hereinafter, a method of configuring (setting) an SRS in a terminal depending on an SC-FDMA symbol index will be described.

Further, hereinafter, a method of transmitting an SRS depending on trigger information of downlink control information (DCI) will be described. When the DCI is used, the DCI may be DCI of a UE-specific physical downlink control channel (PDCCH) or DCI of a common PDCCH for an unlicensed band cell. In this specification, the time domain symbol may be an OFDM symbol, an OFDMA symbol, or an SC-FDMA symbol or the like, according to the multiple access scheme. For example, in the present specification, when the OFDM symbol is used, the OFDM symbol may be replaced by the SC-FDMA symbol, and vice versa.

1. Configuration of Unlicensed Band Cell

The unlicensed band cell is operated by the carrier aggregation (CA) with the licensed band cell. Configuration, add, modify, or release of the unlicensed band cell is performed by RRC signaling (for example, RRCConnectionReconfiguration message). The associated RRC message is transferred from the licensed band cell to the terminal. The RRC message may include information required for the maintenance and operation of the unlicensed band cell.

2. Structure of Downlink Control Channel

In a downlink (DL), one subframe consists of two time slots. Each slot consists of seven or six time domain symbols (e.g., OFDM symbols). The maximum three or four OFDM symbols configured in a head part of a subframe include control channels. The downlink control channel of the licensed band cell may include, for example, a physical control format indicator channel (PCFICH), a physical downlink control channel (PDCCH), a physical hybrid automatic repeat request indicator channel (PHICH), or the like. A physical downlink shared channel (PDSCH), which is a data channel for a data transmission, is basically allocated to the remaining part of the subframe and an enhanced physical downlink control channel (EPDCCH) may be allocated to some resource blocks (RBs).

The first OFDM symbol in the subframe includes the PCFICH for transmitting information on the number of OFDM symbols used for a transmission of a control channel. Further, the control channel region may include the PHICH transmitting a hybrid automatic repeat reQuest (HARQ) acknowledgment/negative-acknowledgement (ACK/NACK) signal that is response information to an uplink transmission. The control information DCI is transmitted through the PDCCH and the ePDCCH. The DCI may include resource allocation information or resource control information for a terminal and a plurality of terminal groups. For example, the DCI may include uplink scheduling information downlink scheduling information, an uplink transmit power control command, or the like.

The DCI that is control information transmitted through the PDCCH or the ePDCCH has different formats depending on a kind and the number of information fields, the number of bits of each information field, or the like. DCI formats 0, 3, and 3A are defined for the uplink. DCI formats 1, 1A, 1B, 1C, 1D, 2, 2A, 2B, 2C, and the like may be defined for the downlink. Each DCI format selectively includes information of a carrier indicator field (CIF), RB assignment, a modulation coding scheme (MCS), a redundancy version (RV), a new data indicator (NDI), a transmit power control (TPC), a HARQ process number, precoding matrix indicator (PMI) confirmation, a hopping flag, a flag field, or the like depending on a format. Therefore, a size of the control information suited for the DCI format may be altered. Further, the same DCI format may be used for transmission of at least two kinds of control information. In this case, the control information is divided by a DCI format flag field. The following Table 1 summarizes some of the information contained in each DCI format.

TABLE 1

| DCI Format | Information |
|---|---|
| Format 0 | Resource grants for the PUSCH transmissions (uplink) |
| Format 1 | Resource assignments for single codeword PDSCH transmissions (transmission modes 1, 2 and 7) |
| Format 1A | Compact signaling of resource assignments for single codeword PDSCH (all modes) |
| Format 1B | Compact resource assignments for PDSCH using rank-1 closed loop precoding (mode 6) |
| Format 1C | Very compact resource assignments for PDSCH (e.g. paging/broadcast system information) |
| Format 1D | Compact resource assignments for PDSCH using multi-user MIMO (mode 5) |
| Format 2 | Resource assignments for PDSCH for closed-loop MIMO operation (mode 4) |
| Format 2A | Resource assignments for PDSCH for open-loop MIMO operation (mode 3) |
| Format 3/3A | Power control commands for PUCCH and PUSCH with 2-bit/1-bit power adjustments |

The PDCCH (or ePDCCH) is transmitted through an aggregation of one or a plurality of consecutive control channel elements (or enhanced CCEs (eCCEs)). In the specification, the PDCCH or the ePDCCH is referred to as (e) PDCCH and the CCE or the eCCE is referred to as (e) CCE.

The (e)CCE is a logical allocation unit and consists of a plurality of resource element groups (REGs). The number of bits transmitted through the (e)PDCCH is determined on the basis of a relationship between the number of (e)CCEs and a code rate provided by the (e)CCE.

The control information transmitted through the (e)PDCCH according to the DCI format is attached with a cyclic redundancy check (CRC) for error detection. The CRC is masked with an identifier radio network temporary identifier (RNTI) according to a (e) PDCCH reception target (e.g., terminal, etc.) or a (e) PDCCH reception usage. Specifically, the scrambled CRC based on the RNTI is attached to the control information transmitted through the (e)PDCCH.

Kinds and a value of RNTIs may be summarized in the following Table 2.

TABLE 2

| Value (hexadecimal) | RNTI |
|---|---|
| 0000 | N/A |
| 0001-003C | RA-RNTI, C-RNTI, Semi-Persistent Scheduling C-RNTI, Temporary C-RNTI, eIMTA-RNTI, TPC-PUCCH-RNTI, TPC-PUSCH-RNTI and SL-RNTI |
| 003D-FFF3 | C-RNTI, Semi-Persistent Scheduling C-RNTI, eIMTA-RNTI, Temporary C-RNTI, TPC-PUCCH-RNTI, TPC-PUSCH-RNTI and SL-RNTI |
| FFF4-FFFC | Reserved for future use |
| FFFD | M-RNTI |
| FFFE | P-RNTI |
| FFFF | SI-RNTI |

The usage for each RNTI is shown in the following Table 3.

TABLE 3

| RNTI | Usage |
|---|---|
| P-RNTI | Paging and System Information change notification |
| SI-RNTI | Broadcast of System Information |
| M-RNTI | MCCH Information Change notification |
| RA-RNTI | Random Access Response |
| eIMTA-RNTI | eIMTA TDD UL/DL Configuration Notification |
| Temporary C-RNTI | Contention Resolution (when no valid C-RNTI is available) |
| Temporary C-RNTI | Msg3 transmission |
| C-RNTI | Dynamically scheduled unicast transmission (uplink or downlink) |
| C-RNTI | Triggering of PDCCH ordered random access |
| Semi-Persistent Scheduling C-RNTI | Semi-Persistently scheduled unicast transmission(activation, reactivation and retransmission) |
| Semi-Persistent Scheduling C-RNTI | Semi-Persistently scheduled unicast transmission (deactivation) |
| TPC-PUCCH-RNTI | Physical layer uplink power control |
| TPC-PUSCH-RNTI | Physical layer uplink power control |
| SL-RNTI | Dynamically scheduled sidelink transmission |

3. Uplink

A plurality of terminals simultaneously access the uplink through the SC-FDMA scheme. According to a cyclic prefix (CP), a slot of 0.5 ms consists of SC-FDMA symbols of six SC-FDMA symbols (for example, when an extended CP is used) or seven SC-FDMA symbols (when a normal CP is used). Two slots configure one subframe.

The uplink subframe may consist of a physical random access channel (PRACH) for an initial access (e.g., random access), a physical uplink shared channel (PUSCH) for a data transmission, a physical uplink control channel (PUCCH) for an uplink control information transmission, a demodulation reference signal (DMRS), and a sounding reference signal (SRS).

The DRMS and the SRS that are an uplink reference signal (RS) of LTE are composed of a Zadoff-Chu sequence. The sequence $r_{u,v}^{(\alpha)}(n)$ of the two uplink reference signals is defined as the following Equation 1 depending on a cyclic shift a applied to a basis sequence $\bar{r}_{u,v}(n)$.

$$r_{u,v}^{(\alpha)}(n) = e^{j\alpha n} \bar{r}_{u,v}(n), 0 \leq n < M_{SC}^{RS} \quad \text{(Equation 1)}$$

In the above Equation 1, $M_{SC}^{RS}$ is $mN_{SC}^{RB}$ and represents a multiple (m) of a subcarriers set $N_{SC}^{RB}$ per resource block (RB). The value m may range from 1 to the number of RBs allocated to the uplink. Depending on α applied to one basic sequence, several reference signals may be generated.

The basic sequence signal $\bar{r}_{u,v}(n)$ is divided into a total of 30 groups, and a group number is defined as $u \in \{0, 1, 2, \ldots, 29\}$.

Each group has one or two basic sequences depending on a length corresponding to $M_{SC}^{RS}$, which is defined as value v. Here, v=0 or (v=0, 1). Specifically, if $M_{SC}^{RS}$ is $mN_{SC}^{RB}$ in which m ranges from 1 to 5, one basic sequence signal is defined, and if $M_{SC}^{RS}$ is $mN_{SC}^{RB}$ in which m is equal to or more 6, two basic sequence signals are defined.

Values of u and v are changed in a time domain. u is defined as the following Equation 2 based on 17 different group hopping patterns $f_{gh}(n_s)$ and 30 different sequence shift patterns $f_{ss}$ defined for each slot $$u = (f_{gh}(n_s) + f_{ss}) \bmod 30 \quad \text{(Equation 2)}$$

The group hopping pattern may determine whether to use group hopping in the entire cell according to a 'Group-hopping-enable' parameter provided by a higher layer. However, even if group hopping is used for the entire cell, a specific terminal may not perform hopping depending on a higher layer parameter called 'disable-sequence-group-hopping'.

The group hopping pattern may be defined differently for the reference signal for the PUSCH, the reference signal for the PUCCH, and the SRS. If the hopping is not used, a value of $f_{gh}$ ($n_s$) becomes zero. When the hopping is used, the hopping pattern is defined as the following Equation 3.

$$f_{gh}(n_s) = \left(\sum_{i=0}^{7} c(8n_s + i) \cdot 2^i\right) \bmod 30 \quad \text{(Equation 3)}$$

In the Equation 3, ns represents a slot number (index). In the above Equation 3, c (i) is a pseudo-random sequence and is generated by the following Equation 4 that is applied to a gold sequence of length 31.

$c(n)=(x_1(n+N_C)+x_2(n+N_C)) \bmod 2$ $x_1(n+31)=(x_1(n+3)+x_1(n)) \bmod 2$ $x_2(n+31)=(x_2(n+3)+x_2(n+2)+x_2(n+1)+x_2(n)) \bmod 2$ (Equation 4)

In the above Equation (4), an initial value of a primary m-sequence is defined as $x_1$ 0=1 and $x_1(n)$=0 (n=1, 2, ..., 30). In the Equation 4, a secondary m-permutation is defined as an initial value of $$c_{init} = \sum_{i=0}^{30} x_2(n) \cdot 2^i$$

corresponding to $c_{init}$ considered for a permutation generation. In the above Equation 4, $N_C$=1600.

The initial value of a pseudo-random noise (PN) permutation generation for the group hopping may be defined as $$c_{init} = \left\lfloor \frac{n_{ID}^{RS}}{30} \right\rfloor,$$

and is initialized every time a radio frame starts. Here, $n_{ID}^{RS}$ uses a value (for example, value $n_{ID}^{PUCCH}$ associated with the PUSCH or $n_{ID}^{PUCCH}$ associated with the PUCCH) designated by the higher layer. If the value designated by the higher layer is not defined or in the case of the SRS, $n_{ID}^{RS}=N_{ID}^{cell}$. Here, $N_{ID}^{cell}$ means a physical cell ID.

The sequence hopping is performed only under the condition in which $M_{SC}^{RS} \geq 6N_{SC}^{RB}$. When $M_{SC}^{RS} < 6N_{SC}^{RB}$, v=0. Under the condition in which $M_{SC}^{RS} \geq 6N_{SC}^{RB}$, v is defined as the following Equation 5.

$$v = \begin{cases} c(n_s) & \text{if group hopping is disable and sequence is enable} \\ 0 & \text{otherwise} \end{cases} \quad \text{(Equation 5)}$$

The initial value of the pseudo-random noise (PN) permutation generation associated with the PUSCH may be defined as $$c_{init} = \left\lfloor \frac{n_{ID}^{RS}}{30} \right\rfloor \cdot 2^5 + f_{ss}^{PUSCH},$$

and is initialized every time the radio frame starts. Here, $f_{ss}^{PUSCH}$ is defined as $f_{ss}^{PUSCH}=(N_{ID}^{cell}+\Delta_{ss})$. $\Delta_{ss} \in \{0, 1, 2, ..., 29\}$.

The initial value of the pseudo-random noise (PN) permutation generation associated with the SRS may be defined as $$c_{init} = \left\lfloor \frac{n_{ID}^{RS}}{30} \right\rfloor \cdot 2^5 + \left(n_{ID}^{RS} + \Delta_{ss}\right) \bmod 30,$$

and is initialized every time the radio frame starts.

The SRS permutation $r_{SRS}^{(\tilde{p})}(n)=r_{u,v}^{(\alpha_{\tilde{p}})}(n)$ is defined depending on the following Equation 6.

$$\alpha_{\tilde{p}} = 2\pi \frac{n_{SRS}^{cs,\tilde{p}}}{8} \quad \text{(Equation 6)}$$

$$n_{SRS}^{cs,\tilde{p}} = \left[n_{SRS}^{cs} + \frac{8\tilde{p}}{N_{ap}}\right] \bmod 8$$

$$\tilde{p} \in \{0, 1, \ldots, N_{ap} + 1\}$$

$$n_{SRS}^{cs} = \{0, 1, 2, 3, 4, 5, 6, 7\}$$

In above Equation 6, $n_{SRS}^{cs}$ is separately configured into a periodic SRS or an aperiodic SRS depending on a 'cyclicShift' parameter and a 'cyclicShift-ap' parameter, which are higher layer parameters. In the above Equation 6, $N_{ap}$ represents the number of antenna ports used for the SRS transmission.

The SRS permutation is transmitted while being allocated to RE (k, l) that are frequency and time resources as the following Equation (7) for an antenna port p, considering $\beta_{SRS}$ as an amplitude factor. The RE (k, l) represent a resource element (RE) corresponding to a frequency index k and a time index l.

$$a_{2k'+k_0^{(p)},l}^{(p)} = \begin{cases} \frac{1}{\sqrt{N_{ap}}} \beta_{SRS} r_{SRS}^{(\tilde{p})}(k'), & k' = 0, 1, 2, \ldots, M_{sc,b}^{RS} - 1 \\ 0, & \text{otherwise} \end{cases} \quad \text{(Equation 7)}$$

In the above Equation 7, $k_0^{(p)}$ represents a frequency domain start position of the SRS. In the above Equation 7, $b=B_{SRS}$. In the above equation 7, $M_{sc,b}^{RS}$ represents the length of the SRS permutation and is defined as the following Equation 8.

$$M_{sc,b}^{RS} = m_{SRS,b} N_{SC}^{RB}/2 \quad \text{(Equation 8)}$$

In the above Equation 8, $m_{SRS,b}$ may be obtained from values defined as the following Table 4 ($6 \leq N_{RB}^{UL} \leq 40$), the following Table 5 ($40 < N_{RB}^{UL} \leq 60$), the following Table 6 ($60 < N_{RB}^{UL} \leq 80$), and the following Table 7 ($80 < N_{RB}^{UL} \leq 110$), depending on $N_{RB}^{UL}$ that is an uplink bandwidth.

TABLE 4

| SRS bandwidth configuration | SRS-Bandwidth $B_{SRS}=0$ | | SRS-Bandwidth $B_{SRS}=1$ | | SRS-Bandwidth $B_{SRS}=2$ | | SRS-Bandwidth $B_{SRS}=3$ | |
|---|---|---|---|---|---|---|---|---|
| $C_{SRS}$ | $m_{SRS,0}$ | $N_0$ | $m_{SRS,1}$ | $N_1$ | $m_{SRS,2}$ | $N_2$ | $m_{SRS,3}$ | $N_3$ |
| 0 | 36 | 1 | 12 | 3 | 4 | 3 | 4 | 1 |
| 1 | 32 | 1 | 16 | 2 | 8 | 2 | 4 | 2 |
| 2 | 24 | 1 | 4 | 6 | 4 | 1 | 4 | 1 |
| 3 | 20 | 1 | 4 | 5 | 4 | 1 | 4 | 1 |
| 4 | 16 | 1 | 4 | 4 | 4 | 1 | 4 | 1 |
| 5 | 12 | 1 | 4 | 3 | 4 | 1 | 4 | 1 |
| 6 | 8 | 1 | 4 | 2 | 4 | 1 | 4 | 1 |
| 7 | 4 | 1 | 4 | 1 | 4 | 1 | 4 | 1 |

TABLE 5

| SRS bandwidth configuration | SRS-Bandwidth $B_{SRS}=0$ | | SRS-Bandwidth $B_{SRS}=1$ | | SRS-Bandwidth $B_{SRS}=2$ | | SRS-Bandwidth $B_{SRS}=3$ | |
|---|---|---|---|---|---|---|---|---|
| $C_{SRS}$ | $m_{SRS,0}$ | $N_0$ | $m_{SRS,1}$ | $N_1$ | $m_{SRS,2}$ | $N_2$ | $m_{SRS,3}$ | $N_3$ |
| 0 | 48 | 1 | 24 | 2 | 12 | 2 | 4 | 3 |
| 1 | 48 | 1 | 16 | 3 | 8 | 2 | 4 | 2 |
| 2 | 40 | 1 | 20 | 2 | 4 | 5 | 4 | 1 |
| 3 | 36 | 1 | 12 | 3 | 4 | 3 | 4 | 1 |
| 4 | 32 | 1 | 16 | 2 | 8 | 2 | 4 | 2 |
| 5 | 24 | 1 | 4 | 6 | 4 | 1 | 4 | 1 |
| 6 | 20 | 1 | 4 | 5 | 4 | 1 | 4 | 1 |
| 7 | 16 | 1 | 4 | 4 | 4 | 1 | 4 | 1 |

TABLE 6

| SRS bandwidth configuration | SRS-Bandwidth $B_{SRS}=0$ | | SRS-Bandwidth $B_{SRS}=1$ | | SRS-Bandwidth $B_{SRS}=2$ | | SRS-Bandwidth $B_{SRS}=3$ | |
|---|---|---|---|---|---|---|---|---|
| $C_{SRS}$ | $m_{SRS,0}$ | $N_0$ | $m_{SRS,1}$ | $N_1$ | $m_{SRS,2}$ | $N_2$ | $m_{SRS,3}$ | $N_3$ |
| 0 | 72 | 1 | 24 | 3 | 12 | 2 | 4 | 3 |
| 1 | 64 | 1 | 32 | 2 | 16 | 2 | 4 | 4 |
| 2 | 60 | 1 | 20 | 3 | 4 | 5 | 4 | 1 |
| 3 | 48 | 1 | 24 | 2 | 12 | 2 | 4 | 3 |
| 4 | 48 | 1 | 16 | 3 | 8 | 2 | 4 | 2 |
| 5 | 40 | 1 | 20 | 2 | 4 | 5 | 4 | 1 |
| 6 | 36 | 1 | 12 | 3 | 4 | 3 | 4 | 1 |
| 7 | 32 | 1 | 16 | 2 | 8 | 2 | 4 | 2 |

TABLE 7

| SRS bandwidth configuration | SRS-Bandwidth $B_{SRS}=0$ | | SRS-Bandwidth $B_{SRS}=1$ | | SRS-Bandwidth $B_{SRS}=2$ | | SRS-Bandwidth $B_{SRS}=3$ | |
|---|---|---|---|---|---|---|---|---|
| $C_{SRS}$ | $m_{SRS,0}$ | $N_0$ | $m_{SRS,1}$ | $N_1$ | $m_{SRS,2}$ | $N_2$ | $m_{SRS,3}$ | $N_3$ |
| 0 | 96 | 1 | 48 | 2 | 24 | 2 | 4 | 6 |
| 1 | 96 | 1 | 32 | 3 | 16 | 2 | 4 | 4 |
| 2 | 80 | 1 | 40 | 2 | 20 | 2 | 4 | 5 |
| 3 | 72 | 1 | 24 | 3 | 12 | 2 | 4 | 3 |
| 4 | 64 | 1 | 32 | 2 | 16 | 2 | 4 | 4 |
| 5 | 60 | 1 | 20 | 3 | 4 | 5 | 4 | 1 |
| 6 | 48 | 1 | 24 | 2 | 12 | 2 | 4 | 3 |
| 7 | 48 | 1 | 16 | 3 | 8 | 2 | 4 | 2 |

$C_{SRS} \in \{0,1,2,3,4,5,6,7\}$ that is a cell-specific parameter 'srs-BandwidthConfig' value and $B_{SRS} \in \{0,1,2,3\}$ that is a UE-specific parameter 'srs-BandwidthConfig' value are given by the higher layer.

The SRS is transmitted while being allocated to an even index or an odd index (or per every two REs) and a ½ element is included in Equation (8).

In the case of UpPTS, a resource for the PRACH channel needs to be considered. $M_{SRS,0}$ in the UpPTS is defined as $m_{SRS,0}{}^{max}=m_{c \in C}\{m_{SRS,0}{}^{c}\} \leq (N_{RB}{}^{UL}-6N_{RA})$ when the cell specific parameter 'srsMaxUpPTS' is enabled by the higher layer. That is, the SRS bandwidth may be defined as a maximum possible size among the remaining resources other than a resource $6N_{RA}$ by the number of PRACH format 4 ($N_{RA}$) in an uplink entire resource $N_{RB}{}^{UL}$.

When a cell specific parameter 'srsMaxUpPTS' is not enabled by the higher layer, $m_{SRS,0}{}^{max}=m_{SRS,0}$ depending on the defined value c.

In the frequency domain, the start position $k_0^{(p)}$ of the SRS depends on the following Equation 9.

$$k_0^{(p)} = \bar{k}_0^{(p)} + \sum_{b=0}^{B_{SRS}} 2M_{SC,b}^{RS} n_b \quad \text{(Equation 9)}$$

In the above Equation 9, $\bar{k}_0^{(p)}$ depends on the following Equation 10 in the case of the normal uplink subframe and depends on the following Equation 11 in the case of the UpPTS. In the above Equation 9, $n_b$ represents a frequency position index.

$$\bar{k}_0^{(p)} = \left(\left\lfloor\frac{N_{RB}^{UL}}{2}\right\rfloor - \frac{m_{SRS,0}}{2}\right) N_{SC}^{RB} + k_{TC}^{(p)}$$

$$\bar{k}_0^{(p)} = \begin{cases} (N_{RB}^{UL} - m_{SRS,0})N_{SC}^{RB} + k_{TC}^{(p)}, & \text{if } ((n_f \bmod 2) \cdot (2 - N_{SP}) + n_{hf}) \bmod 2 = 0 \\ k_{TC}^{(p)}, & \text{otherwise} \end{cases} \quad \text{(Equation 11)}$$

In the above Equation 10 or 11, $k_{TC}^{(p)}$ is defined as the following Equation 12. In the above Equation 11, of represents a system frame number and $N_{SP}$ represents the change frequency (for example, 1 or 2) from the downlink to the uplink (or vice versa) during the predetermined number (for example, 10) of subframes. In the above Equation 11, $n_f$ has a value of 0 when the UpPTS is positioned in subframe Nos. 0 to 4, and has a value of 1 when UpPTS is positioned in subframes Nos. 5 to 9.

In the above Equation 12, $\bar{k}_{TC}$ is defined as a value of 0 or 1 by the higher layer.

$$k_{TC}^{(p)} = \begin{cases} 1 - \bar{k}_{TC}, & \text{if } n_{SRS}^{cs} \in \{4, 5, 6, 7\} \text{ and } \\ & \tilde{p} \in \{1, 3\} \text{ and } N_{ap} = 4 \\ \bar{k}_{TC}, & \text{otherwise} \end{cases} \quad \text{(Equation 12)}$$

The frequency hopping of the SRS follows the 'srs-HoppingBandwidth' parameter $b_{hop} \in \{0,1,2,3\}$ defined by the higher layer. For reference, the aperiodic SRS transmission does not support the hopping.

If the hopping is not used, $n_b = \lfloor 4n_{RRC}/m_{SRS,b} \rfloor \bmod N_b$. Here, $N_b$ may have one of values 1, 2, 3, 4, and 5 and is defined in a standard specification as the Table depending on the SRS bandwidth $B_{SRS}$ and the 'SRS bandwidth configuration' value. The $n_{RRC}$ is a higher parameter of 'freqDomainPosition' and 'freqDomainPosition-ap' and is given depending on the periodic transmission or the aperiodic transmission.

If the hopping is supported, $n_b$ follows the following Equation 13.

$$n_b = \begin{cases} \lfloor 4n_{RRC}/m_{SRS,b} \rfloor \bmod N_b, & b \leq b_{hop} \\ F_b(n_{SRS}) + \lfloor 4n_{RRC}/m_{SRS,b} \rfloor \bmod N_b, & \text{otherwise} \end{cases} \quad \text{(Equation 13)}$$

In the above Equation 13, the $b_{hop}$ may have one of values 0, 1, 2 and 3 and may be defined by the higher parameter 'srs-HoppingBandwidth'. In the above Equation 13, $F_b(n_{SRS})$ follows the following Equation 14.

(Equation 14)

$$F_b(n_{SRS}) = \begin{cases} (N_b/2)\left\lfloor\frac{n_{SRS}\bmod \prod_{b'=b_{hop}}^{b} N_{b'}}{\prod_{b'=b_{hop}}^{b-1} N_{b'}}\right\rfloor + \left\lfloor\frac{n_{SRS}\bmod \prod_{b'=b_{hop}}^{b} N_{b'}}{2\prod_{b'=b_{hop}}^{b-1} N_{b'}}\right\rfloor & \text{if } N_b \text{ even} \\ \lfloor N_b/2 \rfloor \lfloor n_{SRS}/\prod_{b'=b_{hop}}^{b-1} N_{b'} \rfloor & \text{if } N_b \text{ odd} \end{cases}$$

In the above equation 14, $N_{b_{hop}}$ has a value of 1 regardless of $N_b$. In the above Equation 14, $n_{SRS}$ follows the following Equation 15.

(Equation 15)

$$n_{SRS} = \begin{cases} 2N_{SP}n_f + 2(N_{SP}-1)\left\lfloor\frac{n_s}{10}\right\rfloor + \left\lfloor\frac{T_{offset}}{T_{offset\_max}}\right\rfloor, & \text{for 2 msSRS periodicity of frame structure type 2} \\ \lfloor(n_f \times 10 + \lfloor n_s/2\rfloor)/T_{SRS}\rfloor, & \text{otherwise} \end{cases}$$

In above Equation 15, $T_{SRS}$ represents a UE-specific SRS transmission period, $T_{offset}$ represents an SRS subframe offset, and $T_{offset\_max}$ represents an SRS subframe maximum offset.

In a normal subframe, the UpPTS is transmitted in the last time domain symbol of the subframe.

The cell-specific subframe for the SRS transmission is defined depending on period $T_{SFC}$ and offset $\Delta_{SFC}$. The $T_{SFC}$ and $\Delta_{SFC}$ are defined as shown in the following Table 8 or Table 9 depending on the value of the 'srs-SubframeConfig' parameter of the higher layer.

TABLE 8

| srs-SubframeConfig | Binary | Configuration Period $T_{SFC}$ (subframes) | Transmission offset $\Delta_{SFC}$ (subframes) |
| --- | --- | --- | --- |
| 0 | 0000 | 1 | {0} |
| 1 | 0001 | 2 | {0} |
| 2 | 0010 | 2 | {1} |
| 3 | 0011 | 5 | {0} |
| 4 | 0100 | 5 | {1} |
| 5 | 0101 | 5 | {2} |
| 6 | 0110 | 5 | {3} |
| 7 | 0111 | 5 | {0, 1} |
| 8 | 1000 | 5 | {2, 3} |
| 9 | 1001 | 10 | |
| 10 | 1010 | 10 | {1} |
| 11 | 1011 | 10 | {2} |
| 12 | 1100 | 10 | {3} |
| 13 | 1101 | 10 | {0, 1, 2, 3, 4, 6, 8} |
| 14 | 1110 | 10 | {0, 1, 2, 3, 4, 5, 6, 8} |
| 15 | 1111 | reserved | reserved |

The above Table 8 shows frame structure type 1.

TABLE 9

| srs-SubframeConfig | Binary | Configuration Period $T_{SFC}$ (subframes) | Transmission offset $\Delta_{SFC}$ (subframes) |
| --- | --- | --- | --- |
| 0 | 0000 | 5 | {1} |
| 1 | 0001 | 5 | {1, 2} |
| 2 | 0010 | 5 | {1, 3} |
| 3 | 0011 | 5 | {1, 4} |
| 4 | 0100 | 5 | {1, 2, 3} |
| 5 | 0101 | 5 | {1, 2, 4} |
| 6 | 0110 | 5 | {1, 3, 4} |
| 7 | 0111 | 5 | {1, 2, 3, 4} |
| 8 | 1000 | 10 | {1, 2, 6} |
| 9 | 1001 | 10 | {1, 3, 6} |
| 10 | 1010 | 10 | {1, 6, 7} |
| 11 | 1011 | 10 | {1, 2, 6, 8} |
| 12 | 1100 | 10 | {1, 3, 6, 9} |
| 13 | 1101 | 10 | {1, 4, 6, 7} |
| 14 | 1110 | reserved | reserved |
| 15 | 1111 | reserved | reserved |

The above Table 9 shows frame structure type 2. In the frame structure type 2, the SRS may be configured to be transmitted only in the uplink or the UpPTS.

A method for triggering the SRS transmission is classified into two. One is a method (trigger type 0) based on higher layer signaling and the other is a method (trigger type 1) based on the DCI. DCI format 0, 4, or 1A for the method (trigger type 1) based on DCI may be used in frequency division duplexing (FDD) and time division duplexing (TDD) and DCI formats 2B, 2C, or 2D for the method (trigger type 1) based on the DCI applies only to the TDD.

Meanwhile, an LTE-based wireless communication system may form the uplink and the downlink based on the frame structure type 1 (or frame type 1) and the frame structure type 2 (or frame type 2) for the licensed band cell. The wireless communication system may configure the uplink and the downlink based on frame structure type 3, for the unlicensed band cell.

The frame structure type 3 (or frame type 3) includes a normal downlink subframe, a starting downlink partial subframe consisting of only a second slot, and an ending downlink partial subframe consisting of only a DwPTS, and an uplink subframe. A continuous set of downlink subframes (e.g., starting downlink partial subframe+normal downlink subframe+ending downlink partial subframe) is referred to as a downlink transmission burst herein. The continuous set of uplink subframes is referred to herein as an uplink transmission burst herein.

In the frame structure type 3, the base station or the terminal may perform a procedure (e.g., clear channel assessment (CCA)) for confirming the channel occupancy state before the signal transmission.

4. SRS Resource

In the frame structure type 3, the uplink transmission may be the normal uplink subframe transmission, the normal UpPTS transmission, or the SRS transmission having a length corresponding to one or more SC-FDMA symbol. In the specification, a set including at least one SC-FDMA symbol for the SRS transmission is referred to as an 'SRS symbol set'. The SRS symbol set may include the PRACH.

The resource for the SRS symbol set may be a subframe consisting of only the SRS symbol set. Alternatively, a resource for the SRS symbol set may be configured at the last SC-FDMA symbol interval after the uplink PUSCH. Alternatively, the resource for the SRS symbol set may be a time domain symbol set configured at the end of the subframe after the partial subframe in the last subframe of the downlink transmission burst.

Alternatively, the resource for the SRS symbol set may be the last time domain symbol of the subframe in which only the discovery reference signal (DRS) for the unlicensed band cell is transmitted.

Referring to FIGS. 6 to 10, an example of the SRS symbol set will be described. In FIGS. 6 to 10, N may be 1 or a constant greater than 1.

FIG. 6 is a diagram illustrating an SRS symbol set configured after a last partial subframe included in a downlink transmission burst, according to an exemplary embodiment of the present invention. Specifically, FIG. 6 illustrates a case where the SRS symbol set is configured at the end of the subframe after the partial subframe in the last subframe of the downlink transmission burst.

The subframe illustrated in FIG. 6 includes the partial subframe and the SRS symbol set.

The SRS symbol set including N (N=1, 2, 3, . . . ) time domain symbols may be set at the end of the subframe after a partial subframe within a subframe (1 ms). Here, the partial subframe is included at the end of the downlink transmission burst and has a DwPTS length.

Figure 7:
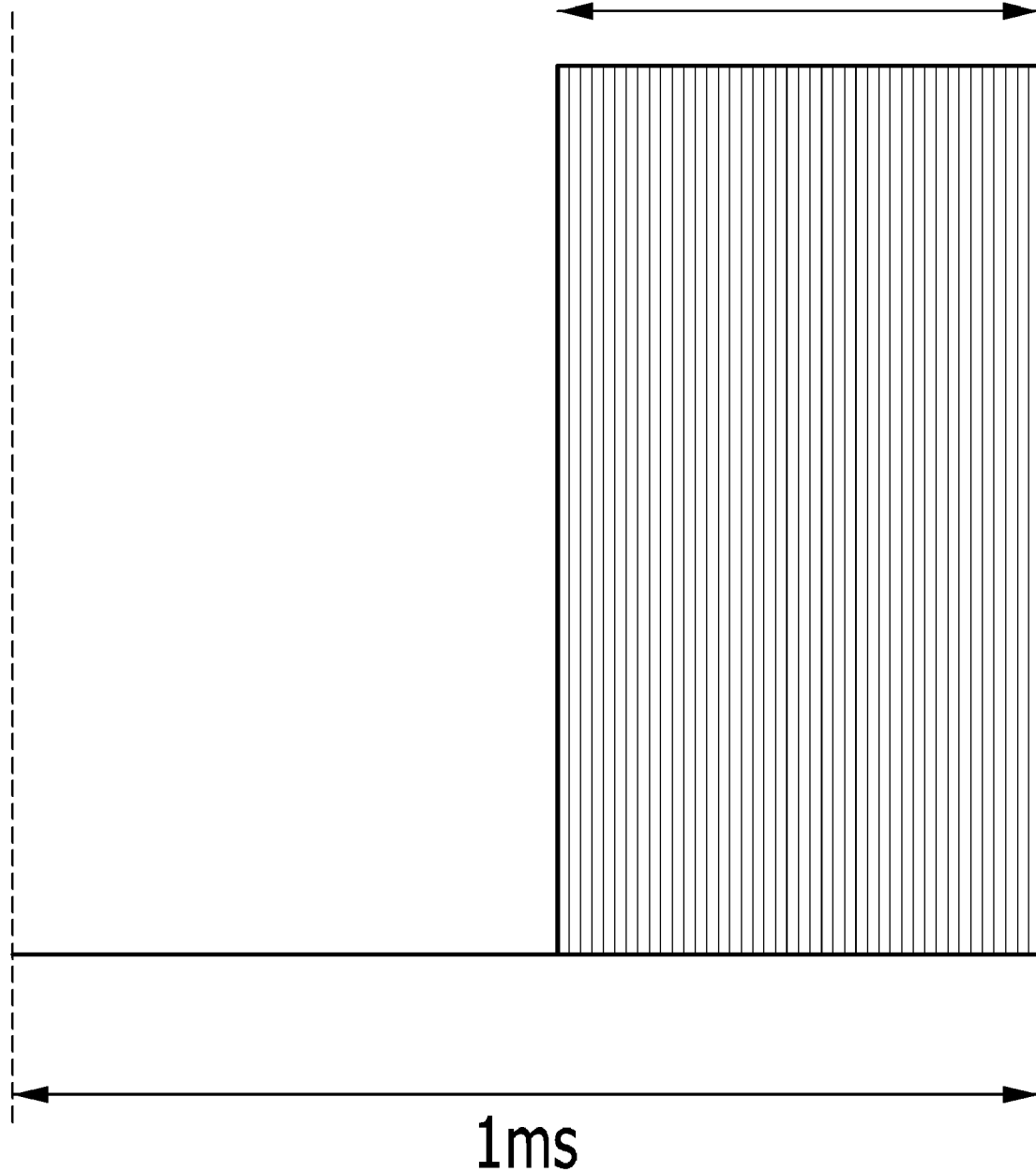
FIG. 7 is a diagram illustrating an SRS symbol set configured at an end of the subframe, according to the exemplary embodiment of the present invention.

FIG. 7 is a diagram illustrating an SRS symbol set configured at an end of the subframe, according to the exemplary embodiment of the present invention.

Specifically, the subframe (1 ms) illustrated in FIG. 7 includes only the SRS symbol set.

The SRS symbol set including N (N=1, 2, 3, . . . ) time domain symbols may be set at the end of a subframe.

Figure 8:
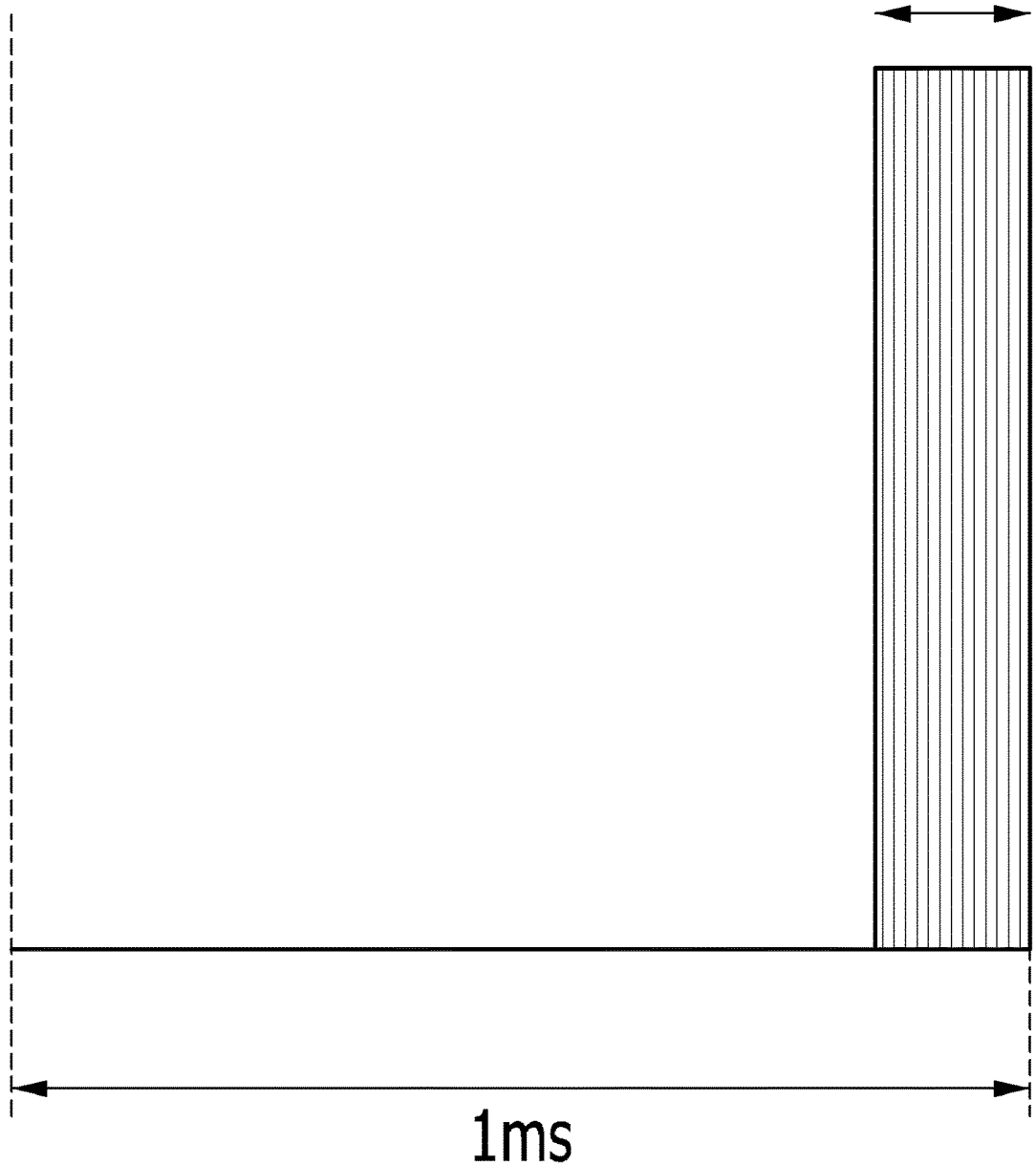
FIG. 8 is a diagram illustrating a subframe consisting of only the SRS symbol set corresponding to one time domain symbol, according to an exemplary embodiment of the present invention.

FIG. 8 is a diagram illustrating a subframe consisting of only the SRS symbol set corresponding to one time domain symbol, according to an exemplary embodiment of the present invention.

Specifically, the subframe (1 ms) illustrated in FIG. 8 includes only the SRS symbol set.

The SRS symbol set including only one time domain symbol may be set at the end of the subframe.

Figure 9:
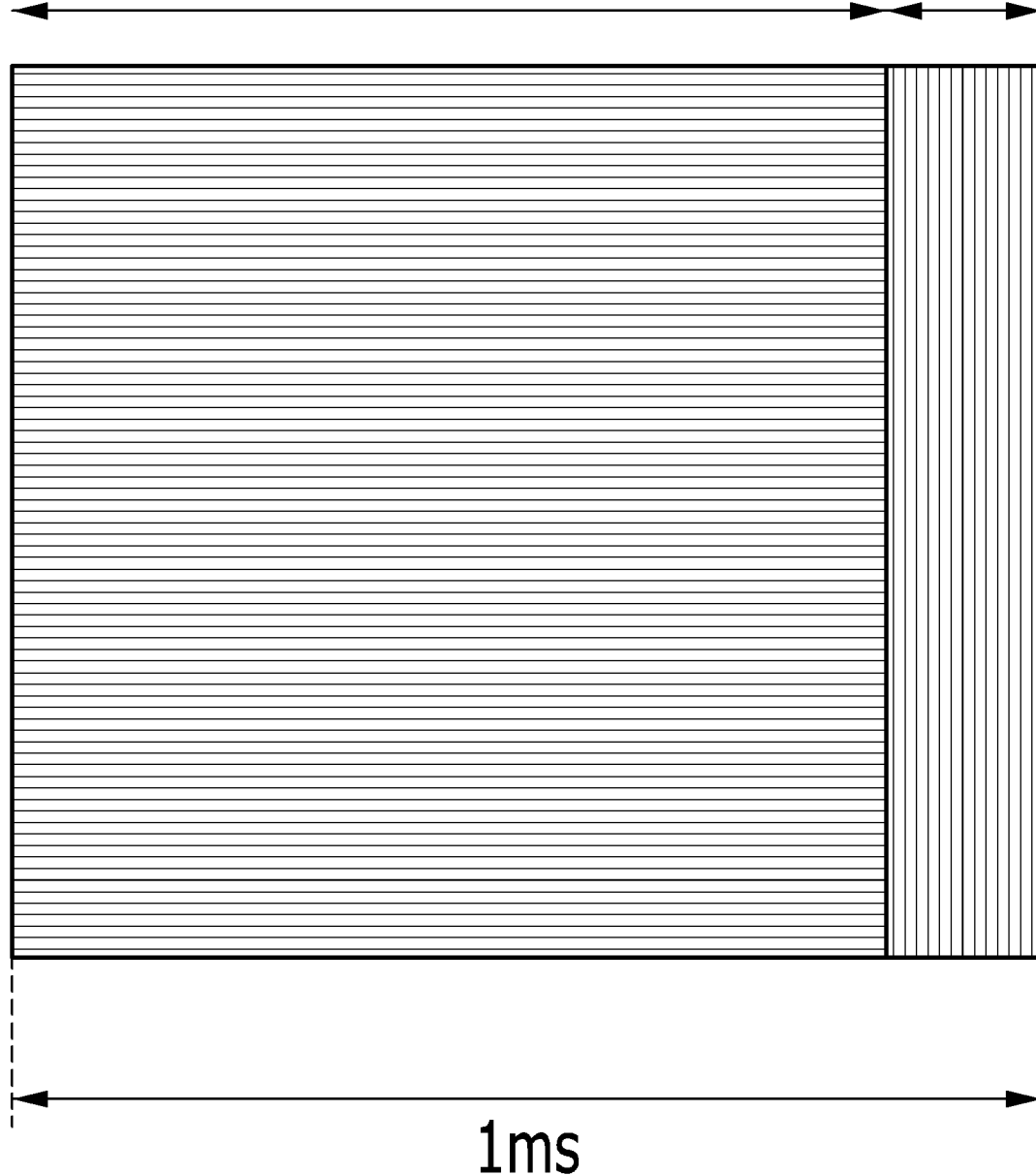
FIG. 9 is a diagram illustrating the SRS symbol set configured through a time division for a physical uplink shared channel (PUSCH) and an SRS, according to an exemplary embodiment of the present invention.

FIG. 9 is a diagram illustrating the SRS symbol set configured through a time division for a physical uplink shared channel (PUSCH) and an SRS, according to an exemplary embodiment of the present invention.

Specifically, the subframe (1 ms) illustrated in FIG. 9 includes the PUSCH and the SRS symbol set.

The SRS symbol set including N (for example, N=1) time domain symbols may be set after the interval for the PUSCH within the subframe. For example, the SRS symbol set may be set at the end of the subframe.

In this case, the PUSCH and the SRS are transmitted through time division in one subframe.

Figure 10:
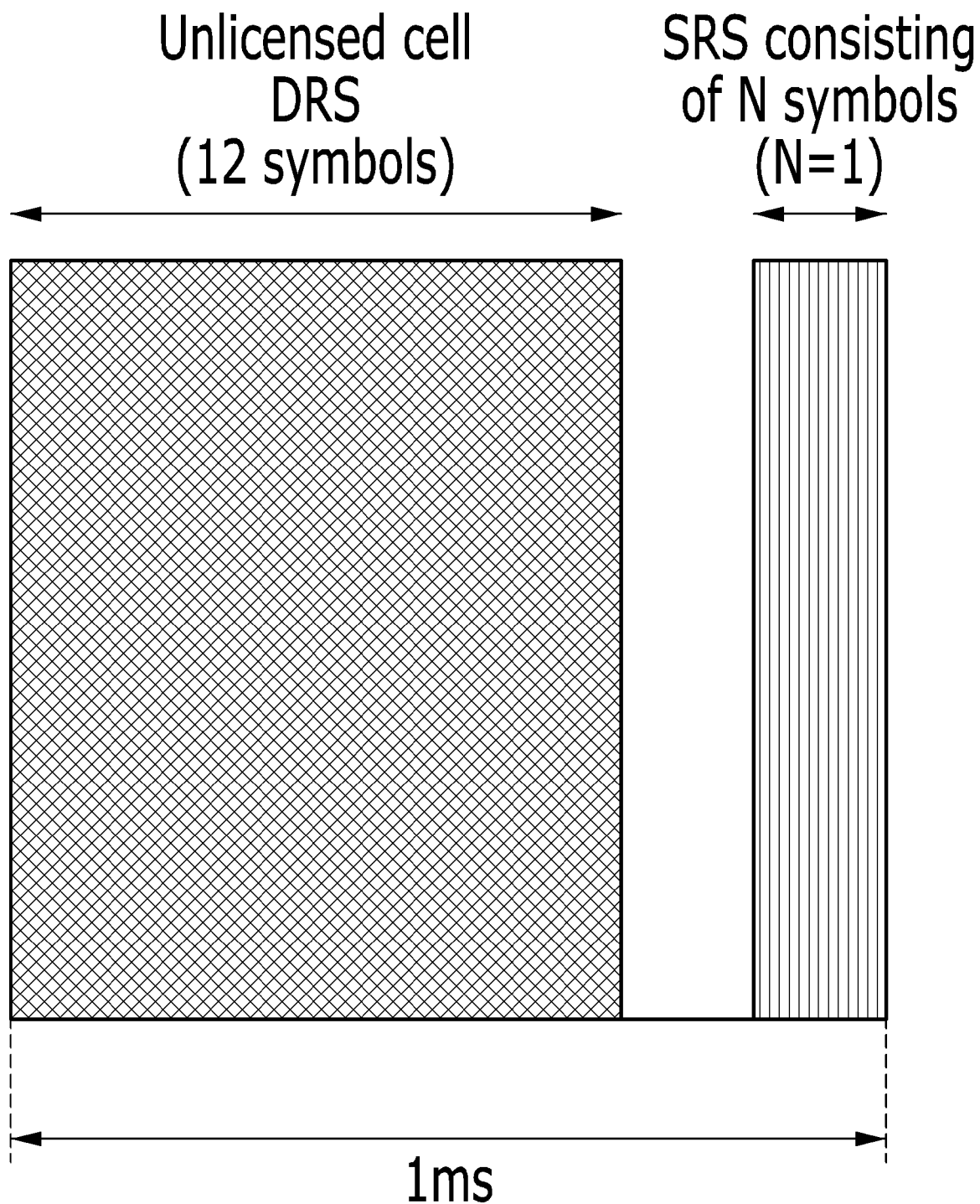
FIG. 10 is a diagram illustrating a case where the SRS symbol set is configured in a last time domain symbol of the subframe including a discovery reference signal (DRS) of an unlicensed band cell, according to an exemplary embodiment of the present invention.

FIG. 10 is a diagram illustrating a case where the SRS symbol set is configured in the last time domain symbol of the subframe including a discovery reference signal (DRS) of an unlicensed band cell, according to an exemplary embodiment of the present invention.

In the case where the DRS is transmitted without multiplexing with the PDCCH, the EPDCCH, or the PDSCH in the unlicensed band cell (or unlicensed cell), the downlink transmission is not made in the last two time domain symbols of the subframe.

In this case, the last two time domain symbols of the subframe may be used for the SRS transmission.

FIG. 10 illustrates that the last time domain symbol of the two unused time domain symbols of the subframe is used for the SRS transmission.

In other words, one subframe (1 ms) includes the SRS symbol set including an interval for the DRS (for example, corresponding to 12 time domain symbols) of the unlicensed band cell and N (for example, N=1) time domain symbols.

The SRS symbol set may be set after the interval for DRS in the subframe. For example, the SRS symbol set may be set at the end of the subframe.

Meanwhile, a resource having a length shorter than that of a time domain symbol (e.g., SC-FDMA symbol) within the subframe including the PUSCH may be configured (set) for the SRS transmission. In the present specification, the SRS having a length shorter than one time domain symbol is referred to as 'Shortened SRS'.

The shortened SRS may not be an SRS consisting of two RE intervals but may be an SRS consisting of two or more resource elements (RE) intervals. For example, when SRS is configured at four RE intervals, a repetitive pattern appears in a time domain for a time domain symbol (e.g., SC-FDMA symbol) and the shortened SRS transmits only 1, 2, or 3 repetitive patterns among four repetitive patterns. Further, the remaining intervals (e.g., remaining repetitive patterns) may be used for the CCA. At least one subframe including the CCA and the shortened SRS may be included in the uplink transmission burst.

5. 'srs-SubframeConfig' Parameter

In the frame structure type 3, the downlink subframe and the uplink subframe may be dynamically configured. Further, the length of the uplink subframe may also be dynamically configured. Therefore, the 'srs-SubframeConfig' parameter of the frame structure type 1 and the 'srs-SubframeConfig' parameter of the frame structure type 2 may be configured in the frame structure type 3. The 'srs-SubframeConfig' parameter is cell-specific information transmitted from the higher layer, and all terminals may know the corresponding information. 16 'srs-SubframeConfig' parameters consisting of a total of four bits are defined in the frame structure type 1 and the frame structure type 2. Each 'srs-SubframeConfig' parameter is defined as the subframe period $T_{SFC}$ and the transmission offset $\Delta_{SFC}$ that are configured for the SRS transmission.

Unlike the licensed band, in the case of the unlicensed band, the uplink is not continuously configured but is opportunistically configured. Therefore, defining the 'srs-SubframeConfig' parameter at different offsets of the same period may be ineffective because there may be cases in which transmission opportunities are not acquired.

Therefore, the higher layer informs an arbitrary offset value or the offset may be fixedly defined in the standard. For example, by considering the DRS transmission of the unlicensed band and a primary synchronization signal (PSS) and a secondary synchronization signal (SSS) transmission in 0th and 5th subframes, an offset value may be defined to a value of at least 1.

The SRS transmission period may be defined as 1, 2, 5, and 10 in the case of the frame structure type 1, and may be defined as 5 and 10 in the case of the frame structure type 2. However, in the case of the frame structure type 3 of the unlicensed band, there is a limitation on the maximum channel occupancy time and the like, and therefore if the SRS is configured every 10 subframe periods, the probability that the SRS is to be actually transmitted is low. Rather, the SRS transmission period needs to be defined as 3 or 4. Therefore, the Table defining the 'srs-SubframeConfig' parameter of the frame structure type 3 may include an SRS transmission period of 3, 4, or the like. Further, the length of the SRS symbol set may be different, and therefore the maximum configurable number of time domain symbols may be defined by the higher layer Therefore, the 'srs-SubframeConfig' parameter signaled in the higher layer may consist of three or four bit information. At this point, the 'srs-SubframeConfig' parameter may not include the transmission offset ($\Delta$SFC) information. The 'srs-SubframeConfig' parameter may include a value of 3 or 4 as the SRS subframe configuration period. Here, the SRS subframe or the SRS transmission subframe indicates a subframe in which the SRS transmission can be made. Therefore, the SRS transmission period for the frame structure type 3 may consist of at least one of values 1, 2, 3, 4, 5, and 10.

In the frame structure type 3, if the SRS subframe configuration period (transmission period) is long, the chance to transmit the SRS may be low in the unlicensed band. In this case, a plurality of terminals may transmit only the SRS without the PUSCH, and at least one time domain symbols may be configured to increase the SRS transmission capacity The number of configurable SRS transmission symbols or the maximum configurable number $N_{SFC}$ of time domain symbols in one subframe may be included in the Table defining the 'srs-SubframeConfig' parameter ('srs-SubframeConfig' signaling Table) or may be separately signaled by the higher layer.

As another method for the case where the SRS subframe configuration (transmission period) period is long, there is to a method for specifying a plurality of subframe offset values.

In the case where a plurality of sub-frame offsets or transmission periods are short in order to increase the SRS transmission opportunity, the PUSCH time length for the data transmission is reduced due to the resource configuration for the SRS transmission, and therefore the spectrum efficiency may be degraded Therefore, in the frame structure type 3, a method for transmitting PUSCH or PUCCH without transmitting SRS in a subframe (subframe defined as a SRS subframe configuration) corresponding to an SRS subframe configuration through a combination of scheduling or trigger (one or more combinations) may be used. An exemplary embodiment of the present invention associated with the SRS configuration discard (e.g., SRSconfigDiscard) will be described below.

Figure 11:
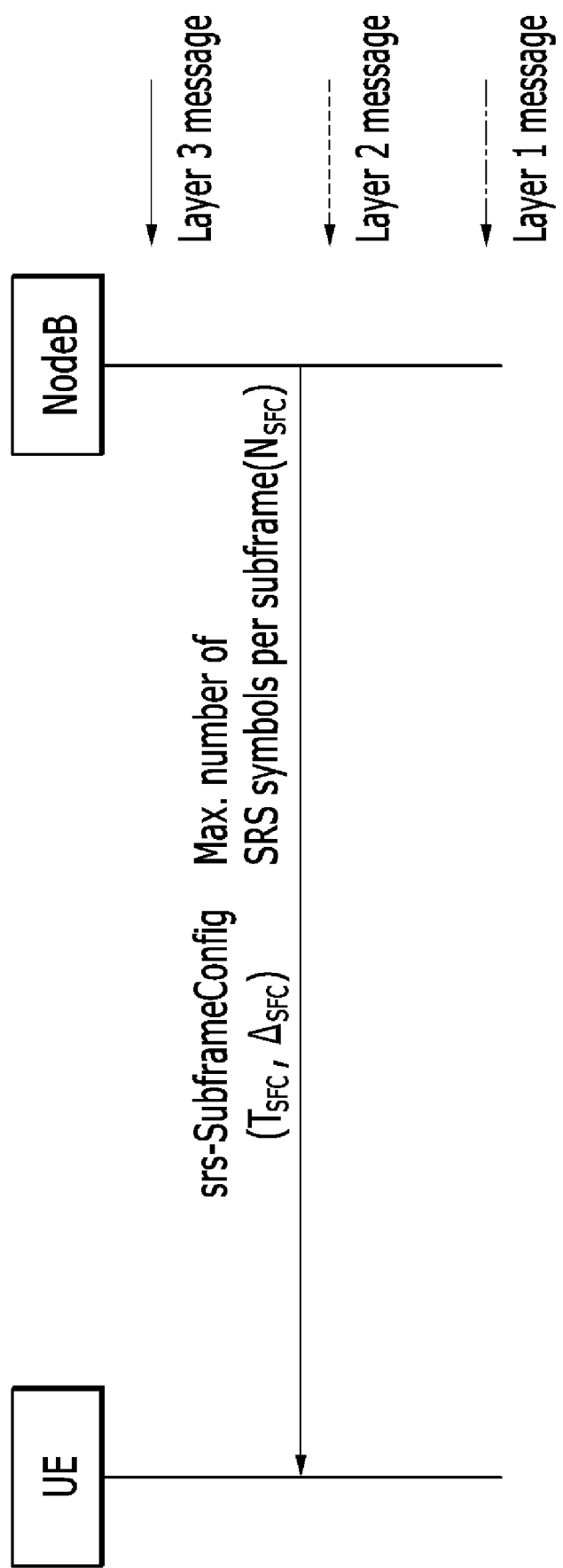
FIG. 11 is a diagram illustrating a case where a 'srs-subframeConfig' parameter and the maximum configurable number of SRS symbols per subframe are transmitted through different fields of a radio resource control (RRC) message, according to an exemplary embodiment of the present invention.

FIG. 11 is a diagram illustrating a case where a 'srs-subframeConfig' parameter and the maximum configurable number of SRS symbols per subframe are transmitted through different fields of a radio resource control (RRC) message, according to an exemplary embodiment of the present invention.

The RRC message may correspond to a message of layer 3 among layer 1, layer 2, and layer 3.

As illustrated in FIG. 11, the base station may transmit the 'srs-subframeConfig' parameters (eg, $T_{SFC}$, $\Delta_{SFC}$) to the terminal through a field of the RRC message. Further, the base station may transmit the maximum number (e.g., $N_{SFC}$) of time domain symbols that can be used for the SRS transmission among the time domain symbols of the subframe to the terminal, through another field of the RRC message. The SRS symbol means a time domain symbol that can be used (configured) for the SRS transmission.

Figure 12:
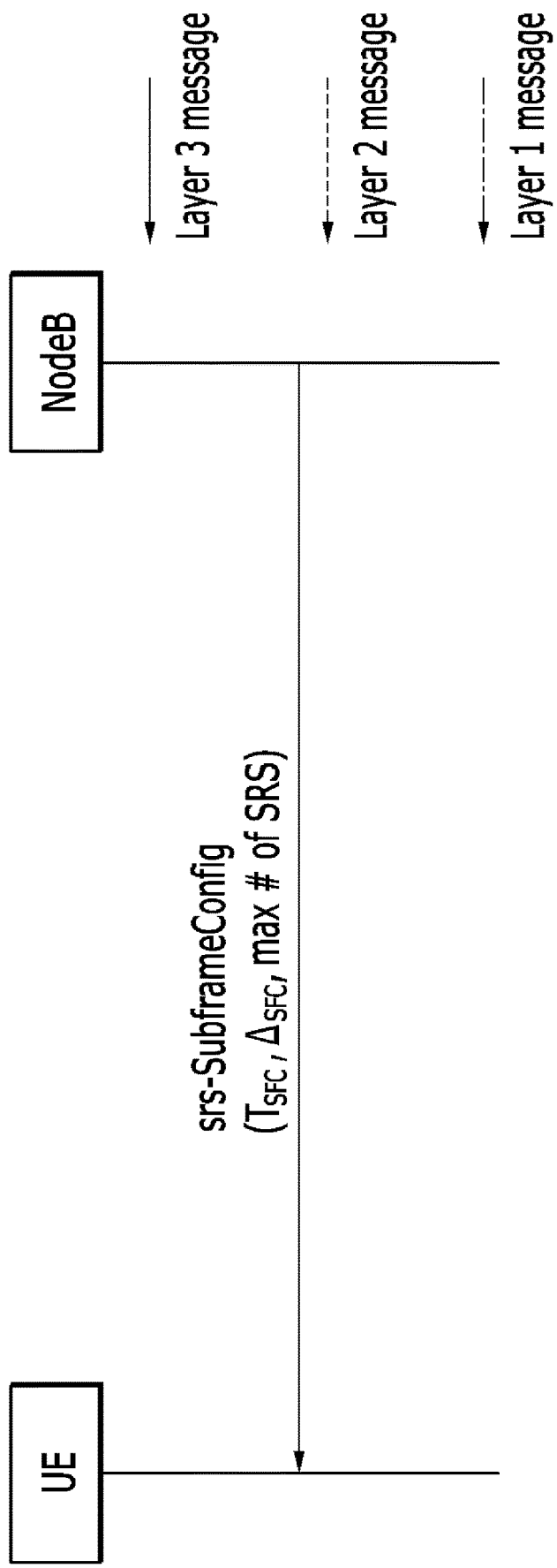
FIG. 12 is a diagram illustrating a case where the maximum configurable number of SRS symbols is included in a parameter specified by the 'srs-subframeConfig' parameter and thus the 'srs-subframeConfig' parameter and the maximum configurable number of SRS symbols per subframe are transmitted through one field of an RRC message, according to the exemplary embodiment of the present invention.

FIG. 12 is a diagram illustrating a case where the maximum configurable number of SRS symbols are included in a parameter specified by the 'srs-subframeConfig' parameter and thus the 'srs-subframeConfig' parameter and the maximum configurable number of SRS symbols per subframe are transmitted through one field of an RRC message, according to the exemplary embodiment of the present invention.

The RRC message may correspond to a message of layer 3 among layer 1, layer 2, and layer 3.

As illustrated in FIG. 12, the base station may transmit the subframe period $T_{SFC}$ and the transmission offset $\Delta_{SFC}$ corresponding to the 'srs-subframeConfig' parameter and the maximum configurable number (e.g., $N_{SFC}$) of SRS symbols per subframe to the terminal through one field of the RRC message.

Hereinafter, Tables (Table 10, Table 11, Table 12, Table 13 and Table 14) defining parameters and values thereof that are specified (or indicated) by the 'srs-SubframeConfig' parameter signaled by the higher layer will be described.

Subframe indices 0 and 5 may be excluded from the SRS transmission. This is because there are the possibility that the DRS will be transmitted in subframe Nos. 0 and 5 and the probability that the downlink subframe including the PSS and the SSS will be transmitted.

The following Table 10 shows the case where the transmission offset $\Delta_{SFC}$ is fixed to a value of 1 or more and is defined in the standard or signaled by the higher layer. Specifically, the following Table 10 shows the case where the maximum number of SRS symbols transmitted in the subframe is defined to be fixed to 1 or the desired value is separately signaled by the higher layer. The following Table 10 shows the case where a total number of bits representing the SRS subframe configuration period (or transmission period) $T_{SFC}$ is 3. For example, the SRS subframe configuration period $T_{SFC}$ may represent one of 1, 2, 3, 4, 5, and 10.

TABLE 10

| srs-SubframeConfig | Binary | Configuration Period $T_{SFC}$ (subframes) |
| --- | --- | --- |
| 0 | 000 | One of 1, 2, 3, 4, 5, 10, |
| 1 | 001 | and 'reserved' |
| 2 | 010 | corresponds to each row |
| 3 | 011 | |
| 4 | 100 | |
| 5 | 101 | |
| 6 | 110 | |
| 7 | 111 | |

The following table 11 shows the case where the transmission offset $\Delta_{SFC}$ is fixed to a value of 1 or more and is defined in the standard or signaled by the higher layer.

Specifically, the following Table 11 shows the case where the maximum number $N_{SFC}$ of SRS symbols transmitted in the subframe is included in the 'srs-SubframeConfig' parameter. The following Table 11 shows the case where the total number of bits representing the SRS subframe configuration period $T_{SFC}$ and the maximum number $N_{SFC}$ of SRS symbols is three. For example, the SRS subframe configuration period (or transmission period) $T_{SFC}$ may represent one of 1, 2, 3, 4, 5, and 10. For example, the maximum number $N_{SFC}$ of SRS symbols may indicate one of 1, 2, 3, and 4.

TABLE 11

| srs-SubframeConfig | Binary | Configuration Period $T_{SFC}$ (subframes) | max. number of SRS symbols per subframe $N_{SFC}$ |
| --- | --- | --- | --- |
| 0 | 000 | One of 1, 2, 3, 4, 5, 10, and 'reserved' corresponds to each row | One of 1, 2, 3, 4, and 'reserved' corresponds to each row |
| 1 | 001 | | |
| 2 | 010 | | |
| 3 | 011 | | |
| 4 | 100 | | |
| 5 | 101 | | |
| 6 | 110 | | |
| 7 | 111 | | |

The following Table 12 shows the case where the transmission period $T_{SFC}$, the transmission offset $\Delta_{SFC}$, and the maximum configurable number $N_{SFC}$ of SRS symbols per subframe are defined. The following Table 12 shows the case where the total number of bits representing the SRS subframe configuration period $T_{SFC}$, the transmission offset $\Delta_{SFC}$, and the maximum number $N_{SFC}$ of SRS symbols is 4. For example, the SRS subframe configuration period $T_{SFC}$ may represent one of 1, 2, 3, 4, 5, and 10. For example, the transmission offset $\Delta_{SFC}$ may represent one of {0}, {1}, . . . , {9}, and {combinations of 0 to 9}. For example, the maximum number $N_{SFC}$ of SRS symbols may indicate one of 1, 2, 3, and 4.

TABLE 12

| srs-SubframeConfig | Binary | Configuration Period $T_{SFC}$ (subframes) | Transmission offset $\Delta_{SFC}$ (subframes) | max. number of SRS symbols per subframe $N_{SFC}$ |
|---|---|---|---|---|
| 0 | 0000 | One of 1, 2, 3, 4, 5, 10, and 'reserved' corresponds to each row | One of {0}, {1}, ... , {9}, {combination of 0 to 9 }, and 'reserved' corresponds to each row | One of 1, 2, 3, 4, 'reserved' corresponds to each row |
| 1 | 0001 | | | |
| 2 | 0010 | | | |
| 3 | 0011 | | | |
| 4 | 0100 | | | |
| 5 | 0101 | | | |
| 6 | 0110 | | | |
| 7 | 0111 | | | |
| 8 | 1000 | | | |
| 9 | 1001 | | | |
| 10 | 1010 | | | |
| 11 | 1011 | | | |
| 12 | 1100 | | | |
| 13 | 1101 | | | |
| 14 | 1110 | | | |
| 15 | 1111 | | | |

The following Table 13 configuring the 'srs-SubframeConfig' parameter, indicates the case where the SRS subframe configuration period (transmission period) $T_{SFC}$ is fixed to 10 and the actual SRS subframe is configured depending on values of various subframe transmission offsets $\Delta_{SFC}$. The following Table 13 shows the case where the total number of bits representing the SRS subframe configuration period TSFC and the transmission offset $\Delta_{SFC}$ is four. For example, the SRS subframe configuration period $T_{SFC}$ may be fixed to 10. For example, the transmission offset $\Delta_{SFC}$ may represent one of {0}, {1}, . . . , {9}, and {combinations of 0 to 9}.

TABLE 13

| srs-SubframeConfig | Binary | Configuration Period $T_{SFC}$ (subframes) | Transmission offset $\Delta_{SFC}$ (subframes) |
|---|---|---|---|
| 0 | 0000 | One of 10 and 'reserved', corresponds to each row | One of {0}, {1}, . . . , {9}, {combinations of 0 to 9} and 'reserved' corresponds to each row |
| 1 | 0001 | | |
| 2 | 0010 | | |
| 3 | 0011 | | |
| 4 | 0100 | | |
| 5 | 0101 | | |
| 6 | 0110 | | |
| 7 | 0111 | | |
| 8 | 1000 | | |
| 9 | 1001 | | |
| 10 | 1010 | | |
| 11 | 1011 | | |
| 12 | 1100 | | |
| 13 | 1101 | | |
| 14 | 1110 | | |
| 15 | 1111 | | |

The following Table 14 configuring the 'srs-SubframeConfig' parameter, indicates the case where the SRS subframe configuration period (transmission period) $T_{SFC}$ is fixed to 10 and the actual SRS subframe is configured depending on values of various subframe transmission offsets $\Delta_{SFC}$. The following Table 14 shows the case where the total number of bits representing the SRS subframe configuration period $T_{SFC}$, the transmission offset $\Delta_{SFC}$, and the maximum number $N_{SFC}$ of SRS symbols is four. For example, the SRS subframe configuration period $T_{SFC}$ may be fixed to 10. For example, the transmission offset $\Delta_{SFC}$ may represent one of {0}, {1}, . . . , {9}, and {combinations of 0 to 9}. For example, the maximum number $N_{SFC}$ of SRS symbols may indicate one of 1, 2, 3, and 4.

TABLE 14

| srs-SubframeConfig | Binary | Configuration Period $T_{SFC}$ (subframe) | Transmission offset $\Delta_{SFC}$ (subframes) | max.number of SRS symbols per subframe $N_{SFC}$ |
|---|---|---|---|---|
| 0 | 0000 | One of 10 and 'reserved' corresponds to each row | One of {0}, {1}, . . . , {9}, 'reserved' corresponds to each row | One of 1, 2, 3, 4, and 'reserved' combination to each row |
| 1 | 0001 | | | |
| 2 | 0010 | | | |
| 3 | 0011 | | | |
| 4 | 0100 | | | |
| 5 | 0101 | | | |
| 6 | 0110 | | | |
| 7 | 0111 | | | |
| 8 | 1000 | | | |
| 9 | 1001 | | | |
| 10 | 1010 | | | |
| 11 | 1011 | | | |
| 12 | 1100 | | | |
| 13 | 1101 | | | |
| 14 | 1110 | | | |
| 15 | 1111 | | | |

When the periodic transmission based on trigger type 0 is possible in the frame structure type 3, each terminal may perform the SRS transmission depending on the SRS subframe configuration and the UE-specific 'SRSconfixIndex' parameter.

With respect to the aperiodic SRS transmission such as trigger type 1 in the frame structure type 3 or a new trigger type considering the unlicensed band, an SRS transmission method to be described below may be defined.

The SRS transmission method to be described below includes an SRS configuration discard (e.g., SRSconfigDiscard). Here, the SRS configuration discard (e.g. SRSconfigDiscard) indicates that the terminal may transmit the PUSCH or the PUCCH in a subframe included in (corresponding to) the SRS subframe configuration or in a time domain symbol for the SRS transmission.

In the frame structure type 1 and the frame structure type 2, when the terminal that wants to transmit data through the PUSCH in the subframe corresponding to the SRS transmission subframe does not receive an SRS transmission trigger request, the last time domain symbol of the subframe is empty for the SRS transmission of other terminals.

The SRS configuration and the SRS transmission for the frame structure type 2 will be described with reference to FIG. 13.

Figure 13:
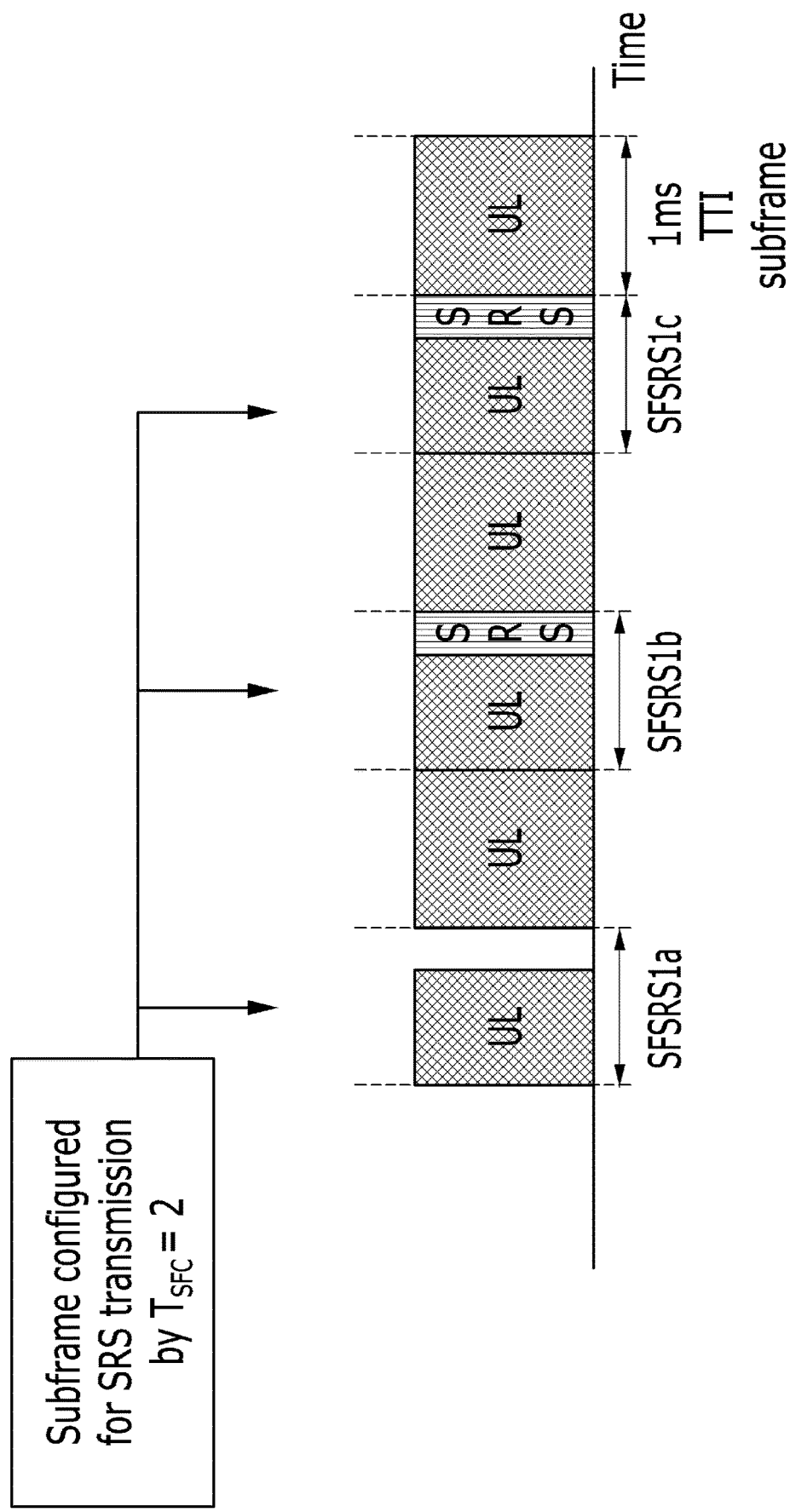
FIG. 13 is a diagram illustrating a method for configuring and transmitting an SRS for frame structure type 2, according to an exemplary embodiment of the present invention.

FIG. 13 is a diagram illustrating a method for configuring and transmitting an SRS for frame structure type 2, according to an exemplary embodiment of the present invention.

In detail, FIG. 13 illustrates the case where the SRS subframe configuration period $T_{SFC}$ is 2. That is, the intervals between SRS subframes SFSRS1a, SFSRS1b, and SFSRS1c may correspond to two subframes 2×1 ms.

As illustrated in FIG. 13, when the SRS transmission is not triggered in the subframe included in the SRS subframe configuration, the time domain symbol for the SRS transmission may be empty without any signal transmission. For example, the time domain symbols for the SRS transmission among the time domain symbols of the SRS subframe SFSRS1a are empty without the SRS transmission.

Meanwhile, in the frame structure type 3, the signaling to the terminal can be performed so as to leave the last time domain symbol without the signal transmission for the listen-before-talk (LBT). Therefore, if the terminal receives the grant (scheduling) for the PUSCH transmission in the subframe configured for the SRS transmission but the aperiodic SRS transmission trigger is not requested, the terminal may transmit the PUSCH until the SRS transmission period.

That is, unlike the frame structure type 1 and the frame structure type 2, in the frame structure type 3, even if the subframe in which the aperiodic SRS transmission is not triggered corresponds to the SRS subframe configuration, the terminal may transmit the PUSCH or the PUCCH without leaving the time domain symbol of the corresponding subframe (e.g., SRSconfigDiscard). This is because another system can occupy the corresponding channel in the unlicensed band when the time domain symbol for the SRS transmission is not occupied. In particular, this may be more effective when the transmission period of the SRS subframe configuration is configured to be small in order to increase the transmission probability of the SRS in the unlicensed band based on an opportunistic channel access and an opportunistic signal transmission. This will be described with reference to FIG. 14.

Figure 14:
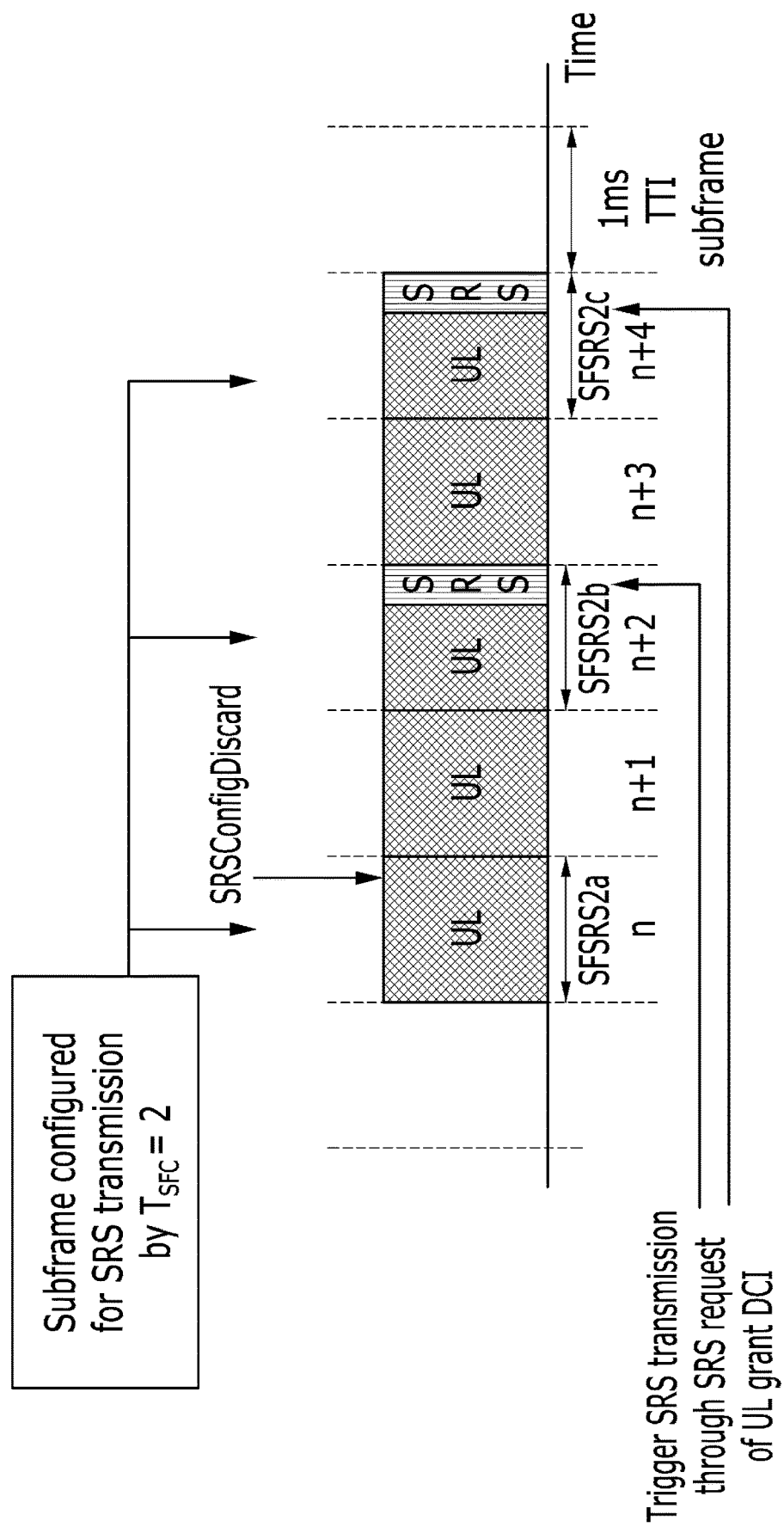
FIG. 14 is a diagram illustrating a method for configuring and transmitting an SRS for frame structure type 3 or discarding an SRS configuration, according to an exemplary embodiment of the present invention.

FIG. 14 is a diagram illustrating a method for configuring and transmitting an SRS for frame structure type 3 or discarding an SRS configuration, according to an exemplary embodiment of the present invention.

In detail, FIG. 14 illustrates the case where the SRS subframe configuration period $T_{SFC}$ is 2. That is, the intervals between SRS subframes SFSRS2a, SFSRS2b, and SFSRS2c may correspond to two subframes 2×1 ms.

Specifically, FIG. 14 illustrates a case where the SRS request is triggered together with an uplink grant (UL grant), for two SRS subframes SFSRS2b and SFSRS2c) among three SRS subframes SFSRS2a, SFSRS2b, and SFSRS2c. That is, the SRS transmission may be triggered through an SRS request field of the uplink grant DCI for the two SRS subframes SFSRS2b and SFSRS2c. For example, the trigger for the SRS transmission of the SRS subframe (SFSRS2b) and the trigger for the SRS transmission of the SRS subframe (SFSRS2c) may be performed through different DCIs. The terminal may transmit the UL and the SRS including at least the PUSCH in one of the two subframes SFSRS2b and SFSRS2c.

FIG. 14 illustrates the case where the subframe SFSRS2a is included in the SRS subframe configuration but the SRS request is not triggered at the time of the uplink grant for the subframe SFSRS2a. The terminal receiving the uplink grant for the subframe SFSRS2a may discard the SRS transmission in the subframe SFSRS2a and configure the subframe SFSRS2a to include at least the PUSCH (e.g., SRS configuration discard (SRSconfigDiscard)).

Meanwhile, when uplink multiple subframes are granted, only one SRS request field may exist in a DCI for the grant of the multiple subframes. In this case, at least one SRS transmission subframe may be configured in the scheduled uplink multiple subframe period. The terminal that receives scheduling of multiple subframes may transmit SRS in all subframes in which the SRS transmission can be performed. In this case, the base station may perform a trigger request for the aperiodic SRS transmission to the terminal that has been scheduled for a single sub-frame so that other terminals that receives a grant (scheduling) of an uplink single subframe transmit SRS in multiple sub-frames. This will be described with reference to FIG. 15.

Figure 15:
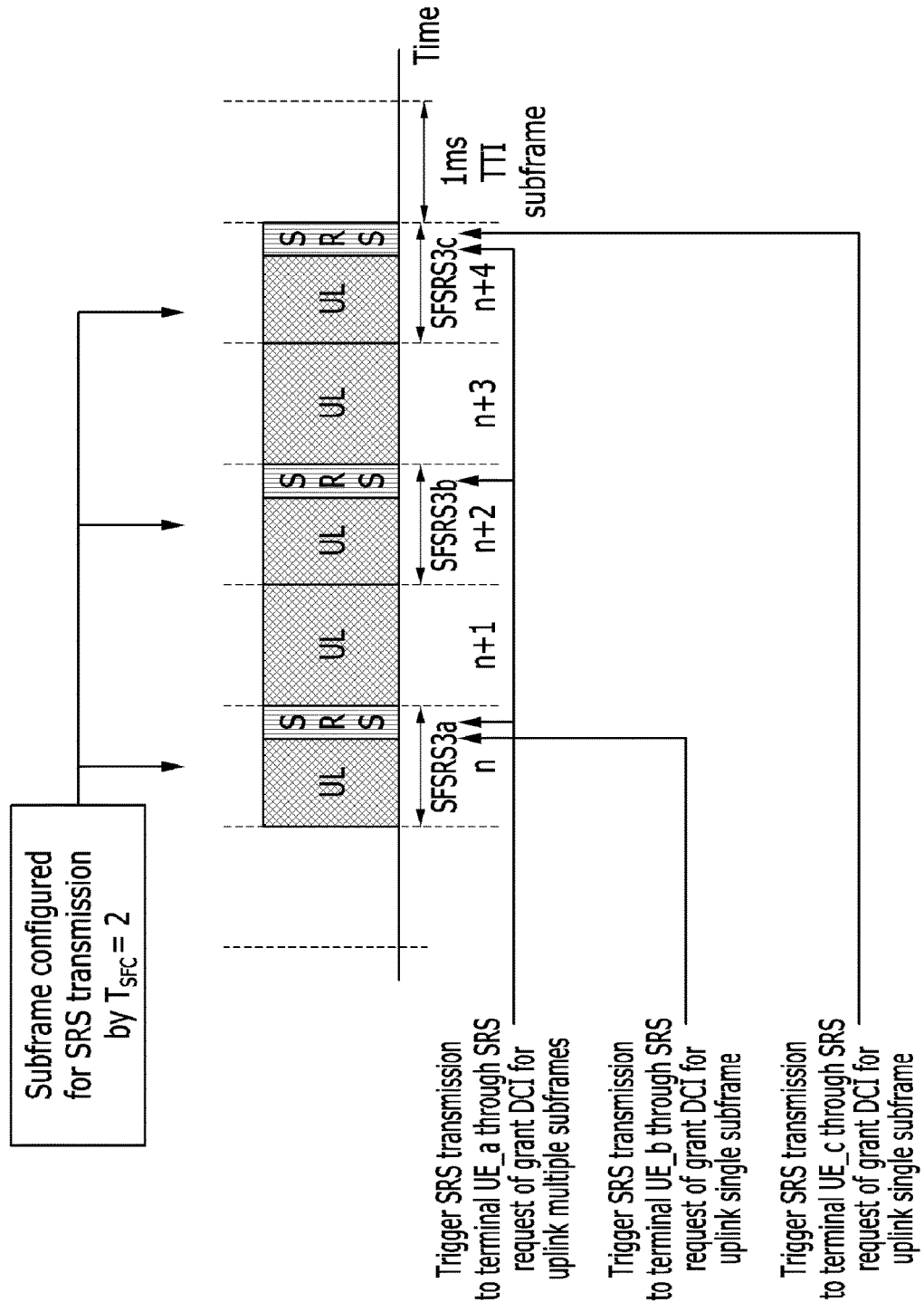
FIG. 15 is a diagram illustrating a method of transmitting an SRS in all subframes corresponding to the SRS subframe configuration when a grant for uplink multiple subframes and an SRS transmission are triggered, according to an exemplary embodiment of the present invention.

FIG. 15 is a diagram illustrating a method of transmitting an SRS in all subframes corresponding to the SRS subframe configuration when a grant for uplink multiple subframes and an SRS transmission are triggered, according to an exemplary embodiment of the present invention. In detail, FIG. 15 illustrates the case where the SRS subframe configuration period $T_{SFC}$ is 2. That is, the intervals between SRS subframes SFSRS3a, SFSRS3b, and SFSRS3c may correspond to two subframes 2×1 ms.

Specifically, FIG. 15 illustrates a case where a terminal UE_a receives a grant of uplink multiple subframes n, n+1, n+2, . . . , n+4 from the base station and terminals UE_b and UE_c each receive a grant of n-th and n+4-th single uplinks (single subframe) from the base station.

For the terminal UE_a, the base station may trigger the SRS transmission in the SRS subframes SFSRS3a, SFSRS3b, and SFSRS3c through the SRS request field of the uplink grant DCI for the uplink multiple subframes n, n+1, n+2, . . . , n+4.

For a terminal UE_b, the base station may trigger the aperiodic SRS transmission in the SRS subframe SFSRS3a through the SRS request field of the uplink grant DCI for the uplink single subframe SFSRS3a.

For a terminal UE_c, the base station may trigger the SRS transmission in the SRS subframe SFSRS3c through the SRS request field of the uplink grant DCI for the uplink single subframe SFSRS3c.

Meanwhile, in the multiple subframe scheduling, if the terminal does not transmit SRS in at least one subframe among the subframes configured for the SRS transmission, the terminal may transmit the SRS to meet the previously defined condition (hereinafter, referred to as a 'first SRS transmission condition').

Here, a first SRS transmission condition may include the case where the terminal transmits the SRS only in the first configured SRS transmission subframe (first SRS subframe) among the uplink multiple subframe periods. This has an advantage in which it is possible to start the same LBT when the uplink multiple subframes are granted (scheduled) to the terminal and the first subframe of the uplink multiple subframes are granted (scheduled) to other terminals as a single subframe.

Accordingly, a plurality of terminals that receive the grant (scheduling) of the uplink multiple subframes according to the scheduling transmit the SRS in the first subframe among the SRS subframes corresponding to the SRS subframe configuration.

In this case, the base station may perform the trigger request for the aperiodic SRS transmission to terminals that receive the grant of the single subframe so that other terminals that receive the grant (scheduling) of the uplink single subframe transmit SRS in the first subframe of the multiple subframe. The base station does not perform the trigger request for the terminals receiving the grant of the single subframe for the remaining subframes other than the first subframe among the subframes corresponding to the SRS subframe configuration.

When the PUSCH transmission is scheduled for the uplink single subframe but the trigger for the SRS is not requested, the terminal does not transmit the SRS in the corresponding single subframe but may transmit the PUSCH by configuring the PUSCH up to the last time domain symbol of the corresponding single subframe even if the corresponding single subframe corresponds to the SRS subframe configuration. This will be described with reference to FIG. 16.

Figure 16:
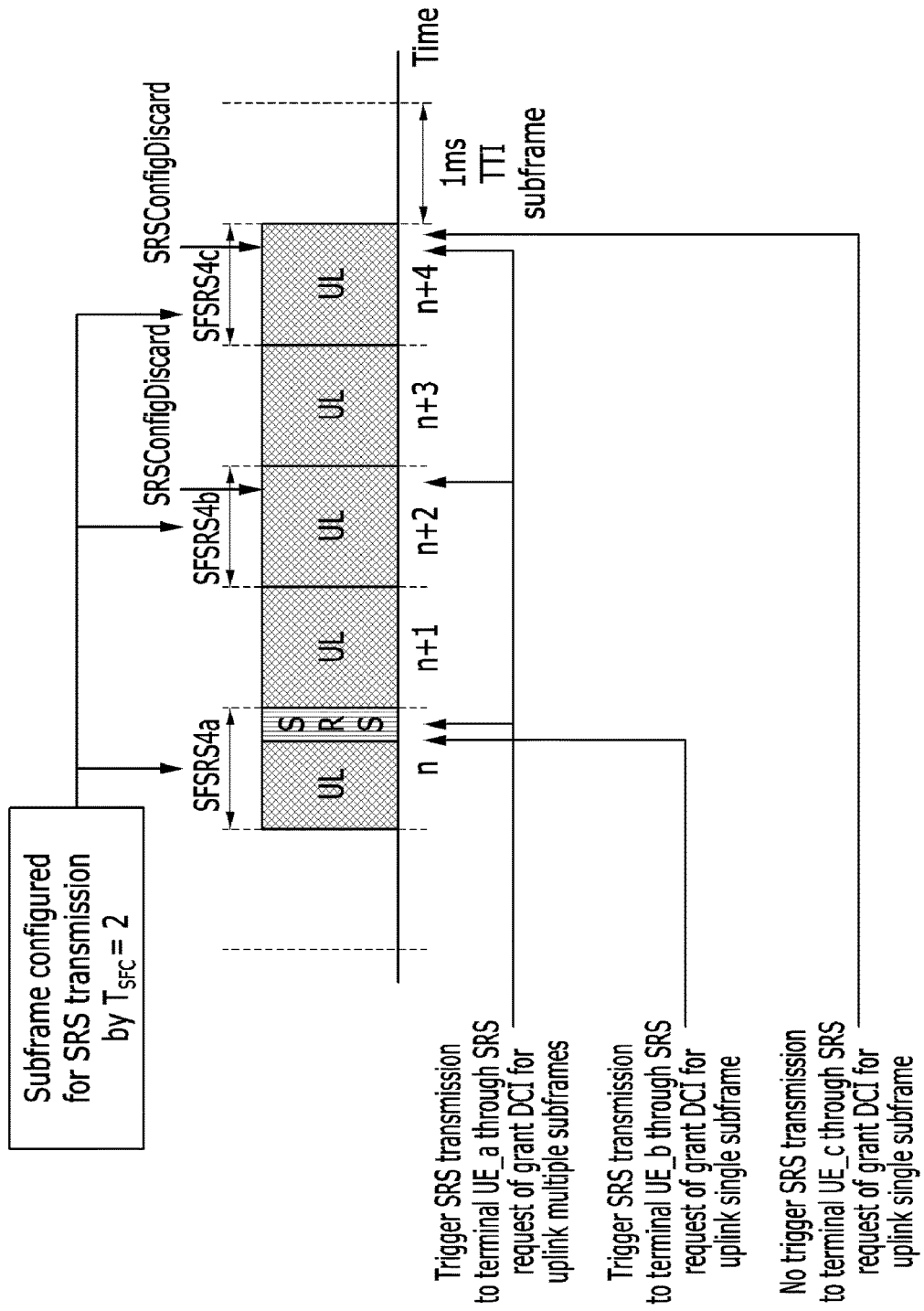
FIG. 16 is a diagram illustrating a method of transmitting an SRS only in the headmost subframe among SRS subframes corresponding to the SRS subframe configuration when the grant for the uplink multiple subframes and the SRS transmission are triggered, according to an exemplary embodiment of the present invention.

FIG. 16 is a diagram illustrating a method of transmitting an SRS only in the headmost subframe among SRS subframes corresponding to the SRS subframe configuration when the grant for the uplink multiple subframes and the SRS transmission are triggered, according to an exemplary embodiment of the present invention. In detail, FIG. 16 illustrates the case where the SRS subframe configuration period $T_{SFC}$ is 2. That is, the intervals between SRS subframes SFSRS4a, SFSRS4b, and SFSRS4c may correspond to two subframes 2×1 ms.

Specifically, FIG. 16 illustrates a case where the terminal UE_a receives a grant of the multiple subframes n, n+1, n+2, . . . , n+4 and the terminals UE_b and UE_c each receive the grant of the n-th and n+4-th single uplinks (single subframe).

FIG. 16 illustrates the case where the SRS transmission is triggered through the SRS request field of the uplink grant DCI for the uplink multiple subframes n, n+1, . . . , n+4. Specifically, the base station triggers the SRS transmission in the headmost SRS subframe SFSRS4a of the plurality of SRS subframes SFSRS4a, SFSRS4b, and DeletedTexts for the terminal UE_a and does not trigger the SRS transmission in the remaining SRS subframes SFSRS4b and SFSRS4c. The terminal UE_a transmits the SRS only in the first subframe SFSRS4a in which the SRS can be transmitted among the granted multiple subframes n, n+1, . . . , n+4 and does not transmit the SRS in the remaining SRS subframes SFSRS4b and SFSRS4c.

FIG. 16 illustrates the case where the SRS transmission is triggered through the SRS request field of the uplink grant DCI for the single subframe SFSRS4a, for the terminal UE_b. Specifically, the terminal UE_b transmits the SRS in the subframe SFSRS4a.

FIG. 16 illustrates the case where the SRS transmission is not triggered through the SRS request field of the uplink grant DCI for the single subframe SFSRS4a, for the terminal UE_c. Specifically, the terminal UE_c does not transmit the SRS in the subframe SFSRS4c but may transmit the PUSCH.

Consequently, no SRS is transmitted in the SRS subframes SFSRS4b and SFSRS4c (e.g., SRS configuration discard (SRSconfigDiscard)). The PUSCH may be configured in the last time domain symbol of the SRS subframes SFSRS4b and SFSRS4c.

Meanwhile, the first SRS transmission condition may include the case where the terminal transmits the SRS only in the SRS transmission subframe (last SRS subframe) latest configured among the uplink multiple subframe periods. This is because uplink transmission in the subframe configured in front of multiple subframes may not be performed according to the LBT result. If the terminal transmits the SRS only in the last possible subframe, the transmission possibility of the SRS is increased.

Accordingly, the plurality of terminals that receive the grant (scheduling) of the uplink multiple subframes according to the scheduling transmit the SRS in the last possible subframe among the SRS subframes corresponding to the SRS subframe configuration.

In this case, the base station may perform the trigger request for the aperiodic SRS transmission to terminals that receive the grant of the single subframe so that other terminals that receive the grant (scheduling) of the uplink single subframe transmit SRS in the last subframe in which the SRS transmission may be performed among the multiple subframes. Further, the base station does not perform the trigger request for the terminals receiving the grant of the single subframe for the remaining SRS subframes other than the last SRS subframe among the subframes in which the SRS transmission of the multiple subframes may be performed.

When the PUSCH transmission is scheduled for the uplink single subframe but the trigger for the SRS is not requested, the terminal does not transmit the SRS in the corresponding single subframe but may transmit the PUSCH by configuring the PUSCH up to the last time domain symbol of the corresponding single subframe even if the corresponding single subframe corresponds to the SRS subframe configuration. This will be described with reference to FIG. 17.

Figure 17:
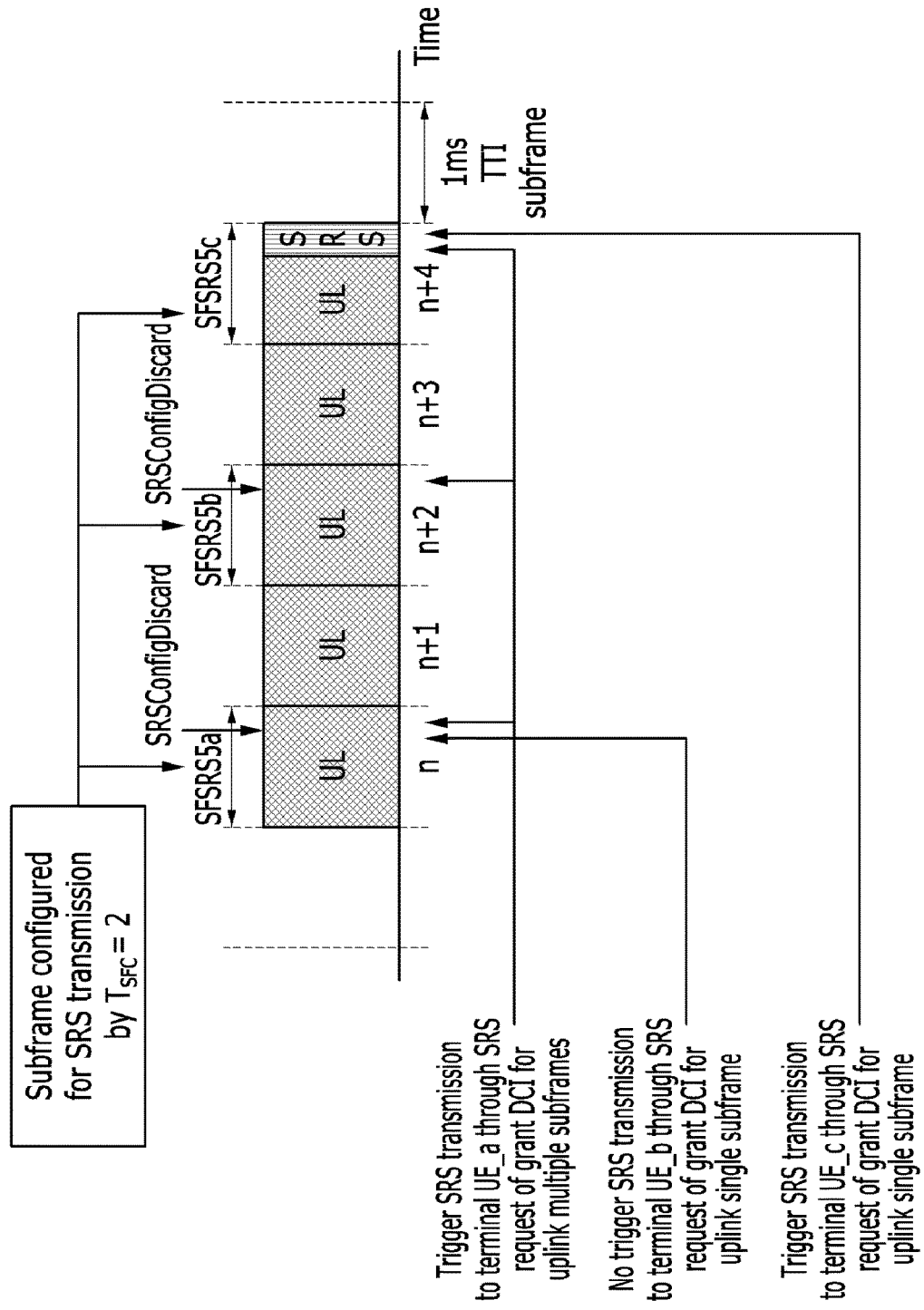
FIG. 17 is a diagram illustrating a method of transmitting an SRS only in a last subframe among SRS subframes corresponding to the SRS subframe configuration when the grant for the uplink multiple subframes and the SRS transmission are triggered, according to an exemplary embodiment of the present invention.

FIG. 17 is a diagram illustrating a method of transmitting an SRS only in a last subframe among SRS subframes corresponding to the SRS subframe configuration when the grant for the uplink multiple subframes and the SRS transmission are triggered, according to an exemplary embodiment of the present invention. In detail, FIG. 17 illustrates the case where the SRS subframe configuration period $T_{SFC}$ is 2. That is, the intervals between SRS subframes SFSRS5a, SFSRS5b, and SFSRS5c may correspond to two subframes 2×1 ms.

Specifically, FIG. 17 illustrates a case where the terminal UE_a receives a grant of the uplink multiple subframes n, n+1, n+2, . . . , n+4 and the terminals UE_b and UE_c each receive the grant of the n-th and n+4-th single uplinks (single subframe).

FIG. 17 illustrates the case where the SRS transmission is triggered through the SRS request field of the uplink grant DCI for the uplink multiple subframes n, n+1, . . . , n+4.

Specifically, the base station triggers the SRS transmission in the SRS subframe SFSRS5c that is the last subframe among the plurality of SRS subframes SFSRS5a, SFSRS5b, and SFSRS5c, for the UE_a and does not trigger the SRS transmission the remaining SRS subframes SFSRS5a and SFSRS5b. The UE_a transmits the SRS only in the last SRS subframe SFSRS5c in which the SRS can be transmitted among the granted multiple subframes n, n+1, . . . , n+4 and does not transmit the SRS in the remaining SRS subframes SFSRS5a and SFSRS5b.

FIG. 17 illustrates the case where the SRS transmission is not triggered through the SRS request field of the uplink grant DCI for the uplink single subframe SFSRS5a, for the terminal UE_b. Specifically, the terminal UE_b does not transmit the SRS in the subframe SFSRS5a but may transmit the PUSCH.

FIG. 17 illustrates the case where the SRS transmission is triggered through the SRS request field of the uplink grant DCI for the uplink single subframe SFSRS5c, for the terminal UE_c. Specifically, the terminal UE_c transmits the SRS in the subframe SFSRS5c.

Consequently, no SRS is transmitted in the SRS subframes SFSRS5a and SFSRS5b (e.g., SRS configuration discard (SRSconfigDiscard)). The PUSCH may be configured in the last time domain symbol of the SRS subframes SFSRS5a and SFSRS5b.

Meanwhile, in order to limit a specific subframe among the uplink multiple subframes to the subframe for the SRS transmission, in addition to a method for defining a condition in advance (for example, first SRS transmission condition), a method for notifying terminal of it through higher layer signaling (e.g., RRC message) may be used. For example, a method for including position information of a subframe for actually transmitting an SRS among multiple subframes in a table defining a 'srs-SubframeConfig' parameter and notifying terminal of it, by considering the maximum configurable number of uplink multiple subframes may be used.

Alternatively, in order to limit a specific subframe among the uplink multiple subframes to the subframe for the SRS transmission, in addition to a method for previously defining a condition (for example, first SRS transmission condition), a method for transmitting an SRS transmission position by including the SRS transmission position in a DCI granting multiple subframes may be used. This will be described with reference to FIG. 18.

Figure 18:
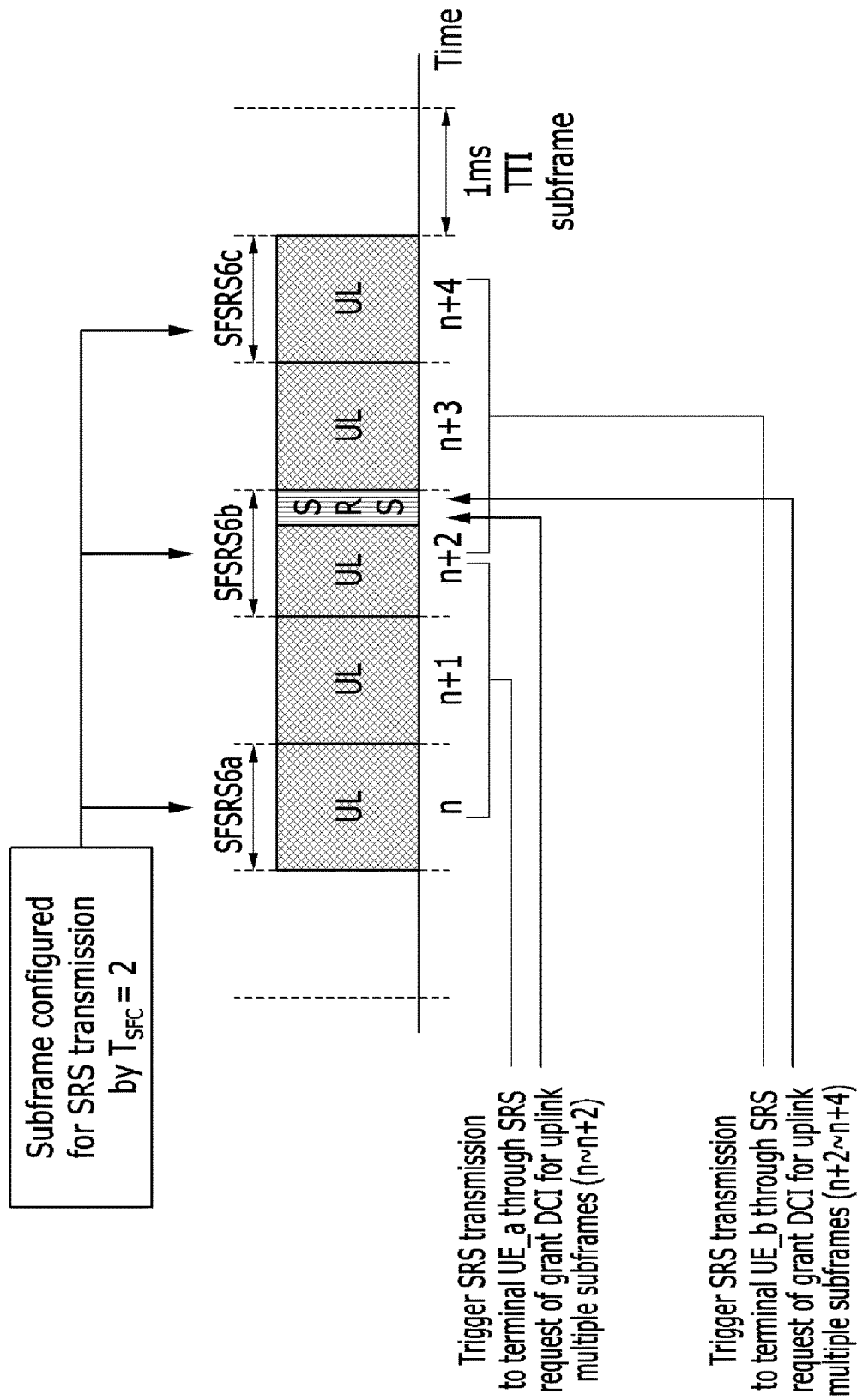
FIG. 18 is a diagram illustrating a method for specifying an SRS transmission position through downlink control information (DCI) granting multiple subframes, according to an exemplary embodiment of the present invention.

FIG. 18 is a diagram illustrating a method for specifying an SRS transmission position through downlink control information (DCI) granting multiple subframes, according to an exemplary embodiment of the present invention. In detail, FIG. 18 illustrates the case where the SRS subframe configuration period $T_{SFC}$ is 2. That is, the intervals between SRS subframes SFSRS6a, SFSRS6b, and SFSRS6c may correspond to two subframes 2×1 ms.

Specifically, FIG. 18 illustrates the case where the terminal UE_a receives a grant of three subframes (from an n-th subframe to a n+2-th subframe) as the multiple subframes and the terminal UE_b receives a grant of three subframes (from n+2-th subframe to n+4-th subframe) as the multiple subframes.

When the SRS subframe configuration period $T_{SFC}$ is 2, two subframes (n-th subframe and n+2-th subframe) of the multiple subframes for the terminal UE_a are configured as the SRS transmission subframe and two subframes (n+2-th subframe and n+4-th subframe) of the multiple subframes for the terminal UE_b are configured as the SRS transmission subframe. The SRS transmission timings of the two terminals UE_a and UE_b may need to match each other.

As illustrated in FIG. 18, start positions of the granted multiple subframes may differ from a terminal to a terminal. For example, the start positions of multiple subframes for the UE_a are the n-th subframe and the start positions of multiple subframes for the UE_b is the n+2-th subframe. In this case, since the terminal UE_a and the terminal UE_b need to be able to transmit the SRS in the same subframe position (e.g., n+2-th subframe), the information on the SRS transmission subframe may be included in the DCI.

FIG. 18 illustrates the case where the base station may trigger the SRS transmission in the SRS subframe SFSRS6b through the SRS request field of the uplink grant DCI for the uplink multiple subframes n, n+1, and n+2, for the terminal UE_a. Further, FIG. 18 illustrates the case where the base station may trigger the SRS transmission in the SRS subframe SFSRS6b through the SRS request field of the uplink grant DCI for the uplink multiple subframes n+2, n+3, and n+4, for the terminal UE_b. The SRS is not transmitted in the SRS subframes SFSRS6a and SFSRS6c.

Meanwhile, when the information on the SRS transmission subframe is included in the DCI granting the uplink multiple subframe, the number of bits configuring the information on the SRS transmission subframe and the information on the SRS transmission subframe transmitted may be determined depending on the maximum configurable number of multiple subframes or the maximum number of subframes that may be configured for the SRS transmission among the multiple subframes.

When the number of subframes in which the SRS is transmitted among the multiple subframes is limited to one, the number of bits and the bit values may be defined to designate (or indicate) the position of the SRS transmission subframe. For example, when the number of subframes configurable as the multiple subframes is 4 and the number of subframes corresponding to the SRS subframe configuration is up to 4, the base station may notify the terminal of the SRS transmission position using two bits. That is, the terminal determines a subframe for the SRS transmission that the terminal itself can use, among the granted uplink multiple subframes, on the basis of the SRS transmission position information (2 bits) received from the base station. Further, the terminal transmits the SRS in the determined subframe As another example, when the number of subframes configurable as the multiple subframes is 4 and the number of subframes corresponding to the SRS subframe configuration is up to 2, the base station may notify the terminal of the SRS transmission position using one bit.

When the number of subframes in which the SRS is transmitted among the multiple subframes is configured in plural, the base station may designate (or instruct) the SRS transmission position using a bitmap.

Meanwhile, for up to 4 configurable multiple subframes, DCI format 0B may use an SRS triggering bit and an additional 1 bit and DCI format 4B may use an SRS triggering field of 2 bits. The DCI format 0B is a multiple subframe uplink scheduling format for a single layer transmission and the DCI format 4B is a multiple subframe uplink scheduling format for a two layer transmission. The base station may indicate, to the terminal, the case where the SRS is not transmitted, the case where the SRS is configured in the first subframe, the case where the SRS is configured in a second subframe, and the case where the SRS is configured in the last subframe, by using the two bits.

Meanwhile, when the number of time domain symbols configurable for SRS transmission in the higher layer is one or more, the terminal may determine the number of time domain symbols for the SRS transmission according to the trigger condition. For example, when the SRS transmission is triggered by the 'SRS request' field (or parameter) of the DCI allocating the uplink PUSCH (e.g., DCI format 0, DCI format for multiple subframe allocation, DCI format 4, etc.), the terminal may determine the number of time domain symbols for the SRS transmission to be one. That is, the aperiodic SRS transmission by the DCI performing the uplink grant is triggered and the corresponding subframe is configured as the subframe for the SRS transmission, and thus when the PUSCH and the SRS are temporally multiplexed, the SRS may be transmitted through one time domain symbol.

Meanwhile, when the PUSCH transmission is not granted for the subframe in which the SRS transmission is configured, the terminal may expect that at least one time domain symbol existing in the end of the corresponding subframe is configured for the SRS transmission. The information (hereinafter, 'SRS symbol position information') on the position of the time domain symbol for the SRS transmission may be included in the UE-specific SRS configuration parameters signaled by the higher layer. Alternatively, the SRS symbol position information may be included in the DCI for triggering the SRS transmission. That is, the terminal determines the time domain symbol for the SRS transmissions that the terminal itself can use, among the time domain symbols of the subframe, on the basis of the UE-specific SRS configuration parameters or the SRS symbol position information included in the DCI.

Trigger methods (method $M_{100}$, method $M_{200}$, method $M_{300}$) for requesting only an SRS transmission without the PUSCH in terms of a terminal is as follows.

The method M100 is a method of triggering an SRS transmission through an 'SRS Request' field (or parameter) included in a UE-specific DCI format for a downlink grant.

The method M200 is a method of triggering an SRS transmission through an 'SRS Request' field (or parameter) included in a UE-specific DCI format for an uplink grant. The method M200 is used for the case where the subframe in which the PUSCH will be transmitted and the subframe in which the SRS transmission can be performed are different from each other, depending on the uplink grant.

The method M300 is a method of triggering an SRS transmission through an 'SRS Request' field (or parameter) included in an unlicensed band cell-specific common DCI format.

The method M100 is a method of triggering an aperiodic SRS transmission through an 'SRS request' field of a downlink grant DCI. The terminal determines a subframe for an SRS transmission among subframes after a predetermined number (e.g., 4) of subframes based on timing (e.g., n-th subframe) granted by the base station and may transmit the SRS in the subframe in which the SRS transmission can be first transmitted among the determined SRS transmission subframes.

The method M200 is a method of triggering an aperiodic SRS transmission through an 'SRS request' field of an uplink grant DCI. When the PUSCH transmission subframe and the SRS transmission subframe are different from each other, the method M200 is used. If the n+4-th subframe does not correspond to the SRS subframe configuration based on the timing (for example, n-th subframe) when the uplink is granted by the base station, the terminal may transmit only the PUSCH in the n+4-th subframe, determine the subframe configured for the SRS transmission among the subframes after the n+4-th subframe, and transmit the SRS in the subframe in which the SRS transmission can be first transmitted among the determined SRS transmission subframes.

Meanwhile, for the case where the uplink transmission of the terminal is not actually fixed, a two-step uplink scheduling method may be used. Here, the two-step uplink scheduling method is a method for scheduling an uplink (first step) and performing an uplink transmission by a downlink subframe including scheduling information after a predetermined number (for example, 4) of subframes (second step).

Figure 19:
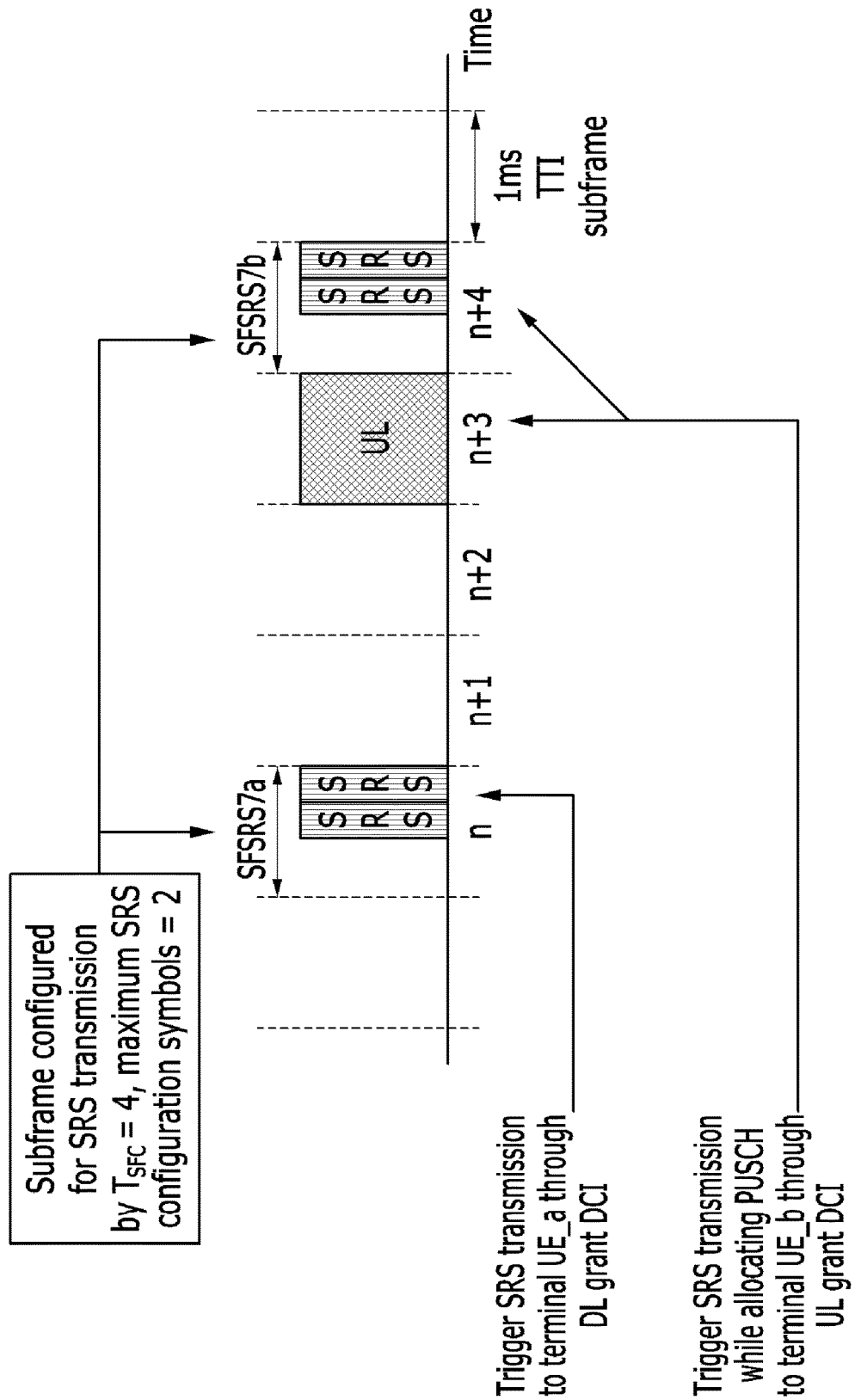
FIG. 19 is a diagram illustrating a method for transmitting only an SRS, according to an exemplary embodiment of the present invention.

FIG. 19 is a diagram illustrating a method for transmitting only an SRS, according to an exemplary embodiment of the present invention. Specifically, FIG. 19 illustrates the two methods (e.g., method M100, method M200) for transmitting only an SRS. FIG. 19 illustrates the case where the SRS subframe configuration period TSFC is 4 and the maximum configurable number of time domain symbols for the SRS transmission is 2. That is, an interval between SRS subframes SFSRS7a and SFSRS7b among the plurality of subframes n, n+1, . . . , n+4 may correspond to four subframes (4×1 ms).

For example, when the SRS transmission is triggered through the 'SRS request' field of the DCI being downlink granted to the terminal UE_a, the terminal UE_a may transmit the SRS in the n-th subframe depending on the SRS parameter signaled from the higher layer.

In another example, the terminal UE_b transmits the PUSCH in the subframe (e.g., n+3-th subframe) defined by the uplink grant but the corresponding subframe does not correspond to the SRS subframe structure and therefore may transmit the SRS in the n+4-th subframe. FIG. 19 illustrates the case where the PUSCH is allocated to the terminal UE_b via the uplink grant DCI and the SRS transmission is triggered.

Meanwhile, the method M300 may simultaneously trigger a plurality of terminals included in the terminal group using the 'SRS Request' field. The number of terminal groups including a plurality of terminals may be one or more and the number of related information bits is determined to meet the maximum configurable number of terminal groups. The Information on the SRS transmission terminal group together with the 'SRS request' field may be included in the DCI, and specifically, may be transmitted by being included in the common DCI of the unlicensed band cell.

When the SRS transmission for the terminal group is triggered through the common DCI (common DCI in the unlicensed band cell) where the CRC based on the CC-RNTI is masked, the terminal belonging to the corresponding terminal group may transmit the SRS. The information on the terminal group to which the terminal belongs may be notified to the terminal during the unlicensed band cell configuration or the cell reconfiguration.

Figure 20:
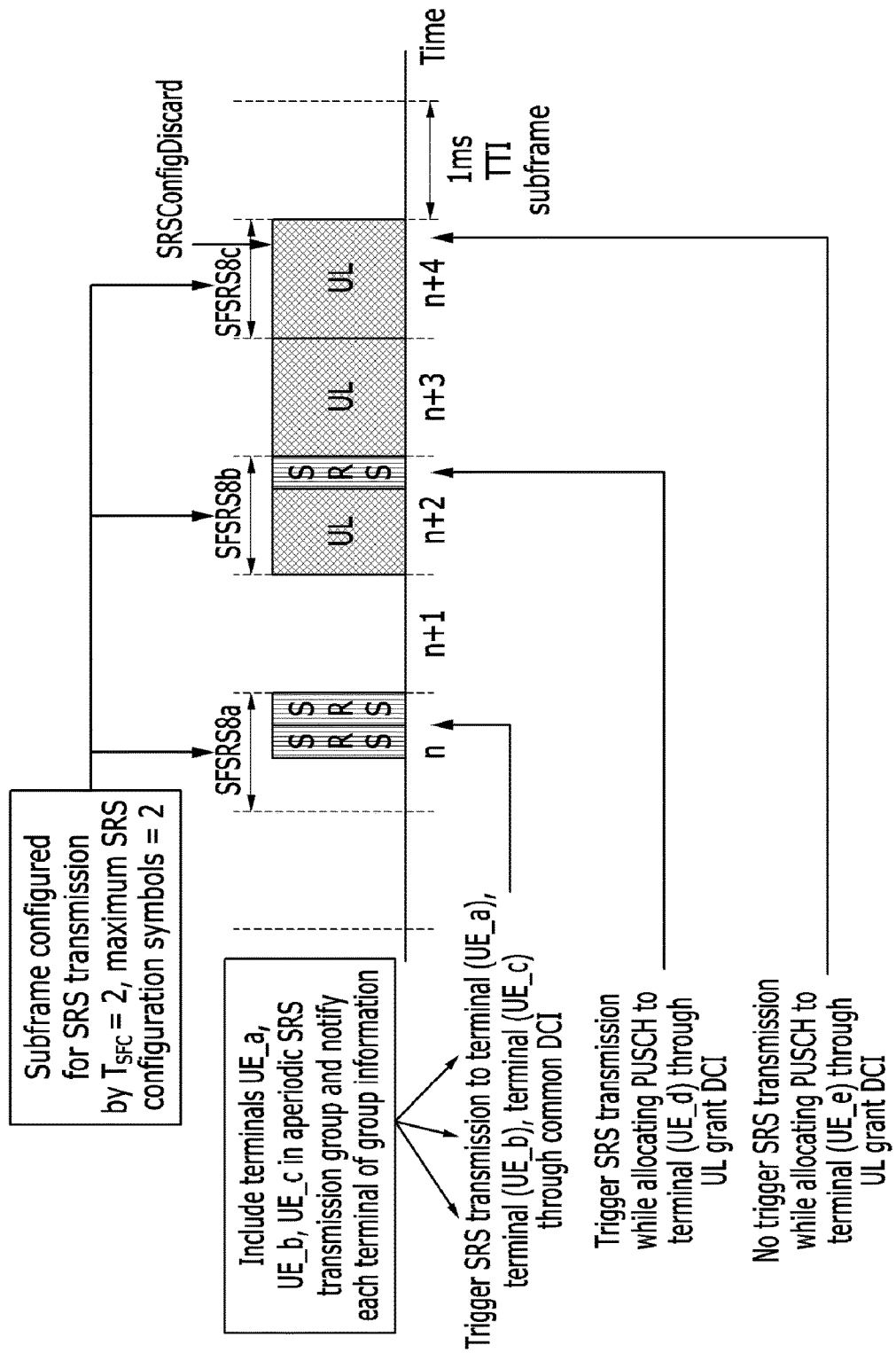
FIG. 20 is a diagram illustrating a method of transmitting an SRS when the maximum configurable number of SRS symbols is 2, according to an exemplary embodiment of the present invention.

FIG. 20 is a diagram illustrating a method of transmitting an SRS when the maximum configurable number of SRS symbols is 2, according to an exemplary embodiment of the present invention. FIG. 20 illustrates the case where the SRS subframe configuration period TSFC is 2 and the maximum configurable number of time domain symbols for the SRS transmission is 2. That is, an interval between SRS subframes SFSRS8a, SFSRS8b, and SFSRS8c among the plurality of subframes n, n+1, . . . , n+4 may correspond to two subframes (2×1 ms).

Specifically, FIG. 20 illustrates the case where the SRS transmission is triggered for the terminals UE_a, UE_b, and UE_c through the 'SRS request' field of the common DCI and the terminal UE_a, the terminal UE_b, and the terminal UE_c transmit only the SRS in the subframe (e.g., SFSRS8a) capable of performing the SRS transmission. That is, FIG. 20 illustrates the example in which the terminal UE_a, the terminal UE_b, and the terminal UE_c already confirm the terminal group information through the higher layer message and then the SRS transmission for the terminal group is triggered. That is, the terminal UE_a, the terminal UE_b, and the terminal UE_c are included in the terminal group for the aperiodic SRS transmission and the information on the terminal group is known to each the terminals UE_a, UE_b, and UE_c.

FIG. 20 illustrates the case where the SRS transmission is triggered while the PUSCH is allocated to a terminal UE_d via the uplink grant DCI. The maximum configurable number of SRS symbols is 2, but the uplink granted UE_d may decide to use one time domain symbol of the subframe (e.g., SFSRS 8b) for the SRS transmission. That is, the terminal UE_d does not transmit the PUSCH and the SRS in the subframe SFSRS8b.

FIG. 20 illustrates the case where the PUSCH is allocated to a terminal UE_e via the uplink grant DCI but the SRS transmission is not triggered. If the SRS is not triggered while the uplink is granted, the UE_e discards the SRS transmission (e.g., SRS configuration discard (SRSconfigDiscard)) and configures the PUSCH up to the last time domain symbol of the corresponding subframe (e.g., SFSRS8c).

Meanwhile, when the terminal detects a common reference signal (CRS) of the downlink subframe in the subframe in which the SRS can be transmitted according to the SRS subframe configuration information or receives the PDCCH, the terminal discards the SRS transmission of the same subframe. However, if the downlink subframe is a downlink partial subframe of a DwPTS length, the terminal may transmit the SRS.

Meanwhile, the aperiodic SRS transmission described above is performed according to the SRS subframe configuration information defined by the higher layer. The terminal expects the position where the SRS can be transmitted according to the SRS subframe configuration information which is the cell-specific information.

When there is no SRS subframe configuration information for the aperiodic SRS transmission, if the SRS transmission is triggered via the 'SRS request' field of the uplink grant DCI, the terminal may transmit the SRS together with the PUSCH in the granted subframe. If the SRS transmission is triggered via the 'SRS request' field of the DCI (e.g., downlink grant DCI or common DCI of the unlicensed band cell) of the n-th sub-frame, the terminal may transmit the SRS in an n+4+b-th subframe. Here, b may be previously defined according to the standard, signaled by the higher layer, or included in the DCI.

Meanwhile, when the terminal transmits the SRS without the PUSCH, the terminal may transmit the SRS after performing the channel access procedure. Here, the channel access procedure may perform a single LBT of 25 μs or an LBT having a random back-off.

The LBT method that the terminal needs to perform may be determined by the information field included in the DCI. If the LBT scheme to be performed by the terminal to which the SRS is to be transmitted is not defined in the DCI, the terminal may determine the LBT scheme by checking whether the partial subframe of the DwPTS length is included in the subframe for the SRS transmission.

If the terminal confirms the partial subframe information in the common DCI between the n-th partial subframe and the n−1-th normal subframe (1 ms), the single LBT of 25 μs may be performed in the n-th subframe SRS and then the SRS may be transmitted. In the case of the above condition, only when the n-th sub-frame (n-th sub-frame including the partial sub-frame) needs to be included in the downlink maximum occupancy time after the base station occupies the channel through a category 4 LBT having the random back-off, the base station may request the SRS transmission to the terminal.

If the partial subframe information is not confirmed in the common DCI between the n-th partial subframe and the n−1-th normal subframe (1 ms), the terminal may perform the category 4 LBT having the random backoff and if it is determined that the channel is empty as a result of performing the LBT, the terminal may transmit the SRS. In the case where the terminal transmits the SRS without the PUSCH, in determining the LBT scheme by the terminal, a signal for triggering the SRS transmission may be included in the downlink grant DCI. If the downlink grant performs self-scheduling in the unlicensed band cell, 1 bit is added to a downlink subframe grant DCI format, and it may be signaled whether the terminal performs a single LBT of 25 μs or the category 4 LBT is performed. In this case, the corresponding bit may not be configured in the downlink subframe grant DCI format of the licensed band cell. Therefore, the terminal may expect that an information bit size of the downlink subframe grant that may trigger the SRS transmission in the unlicensed band cell is different from that of the DL subframe grant that may trigger the SRS transmission in the license band cell. The terminal may expect that at least one bit in the unlicensed band cell can be configured for the SRS LBT. Therefore, if the terminal receiving the downlink subframe grant DCI in the licensed band triggers the SRS transmission through the DCI, the terminal may perform the LBT by the LBT method predefined in advance and then transmit the SRS. Here, one LBT method defined in advance may be the category 4 LBT. Since the terminal receives the SRS trigger information from the licensed band cell that may transmit the signal without the LBT, the terminal can occupy the channel by performing the category 4 LBT before the SRS transmission For example, the SRS transmission may be triggered by the 'SRS request' information of downlink subframe grant DCI format 1A and 1 bit indicating an SRS LBT method may be added to the DCI format 1A transmitted in the unlicensed band cell.

As another method for confirming, by a terminal, an LBT scheme, there is a method for transmitting an SRS after the terminal performs a single LBT of 25 μs when a subframe for transmitting the SRS by the terminal is included in a maximum channel occupancy time by signaling of the base station. The common DCI may include the 'remaining number of subframes to the maximum channel occupancy time'. Alternatively, the PHICH may not be used for ACK/NACK feedback, but may be utilized for information (hereinafter, the 'remaining subframe information') on the 'remaining number of subframes to the maximum channel occupancy time'. The remaining subframe information included in the common DCI and the PHICH means the remaining number of subframes including the current subframe or the remaining number of subframes not including the current subframe If the subframe for the SRS transmission is not included within the maximum channel occupancy time, the terminal performs the category 4 LBT and then transmits the SRS. The terminal may select a random backoff value according to the following Table 15 (parameter of priority class 1 of the category 4 LBT).

TABLE 15

| LBT priority class | Minimum collision window | Maximum collision window | K | Maximum occupancy time | Collision window size |
|---|---|---|---|---|---|
| 1 | 3 | 7 | 1 | 2m | {3, 7} |
| 2 | 7 | 15 | 1 | 3m | {7,15} |
| 3 | 15 | 63 | 3 | 10 m or 8 ms or 6 ms | {15, 31, 63} |
| 4 | 15 | 1023 | 7 | 10 m or 8 ms or 6 ms | {15, 31, 63, 127, 255, 511, 1023} |

Since the terminal does not receive the transmission success or failure of the SRS through the response message, the terminal may use a collision window for selecting the random backoff by fixing the collision window to 3 or 7. That is, even if a collision occurs in the actual transmission, the terminal need not increase the collision window twice. In this case, only one of values 3 and 7 may be used or the value signaled by the RRC message among the values 3 and 7 may be used.

The terminal may differently configure and use a backoff counter engine for the SRS transmission and a backoff counter engine for PUSCH transmission. That is, the backoff counter for the SRS transmission and the backoff counter for the PUSCH transmission can be managed differently. The backoff counter engine for the SRS transmission can be utilized like the backoff counter engine for the PRACH transmission or the PUSCH transmission The backoff counter value for the SRS transmission may be newly selected at the moment the SRS transmission is triggered. If the SRS is not transmitted in the designated subframe, the backoff counter may be initialized.

The backoff counter value for the SRS transmission may be reduced by 1 in each slot (e.g., LBT slot) interval when the channel is empty before the SRS transmission. If the back-off counter value becomes 0 before the SRS transmission is designated, the terminal may perform a 'self-deferal' operation. Here, the 'self-deferal' operation means that the channel detection is further performed for one LBT slot (for example, 9 μs) immediately before transmission without changing the backoff counter value. Accordingly, when the backoff counter value becomes 0 beforehand, the terminal may perform the 'self-deferal operation' to further detect the channel for one LBT slot immediately before the SRS transmission and then transmit the SRS.

When the PUSCH is scheduled without a time gap after the SRS transmission, the backoff counter engine for the PUSCH can be used as described above. Since the PUSCH is transmitted immediately after the SRS transmission, the overlapping channel access procedure may be avoided and the terminal may identically follow the channel access procedure for the PUSCH transmission longer than the SRS symbol length.

Meanwhile, after the SRS transmission, the terminal may newly select the random backoff value and then perform the LBT for the normal uplink transmission or the SRS transmission.

If the terminal transmits the SRS without the channel access procedure, the SRS needs to be transmitted within 16 μs after the downlink partial subframe of the DwPTS length. In this case, the terminal may in advance perform the SRS transmission, differently from a timing advance (TA) value for determining the uplink transmission timing. The terminal may determine whether to transmit the SRS and the SRS transmission timing by demodulating the partial subframe information included in the common DCI of the n-th partial subframe and the n−1-th normal subframe (1 ms). If the n-th subframe corresponds to the SRS subframe configuration and the SRS can be transmitted in the n-th subframe and if the sum of the number of time domain symbols in the partial subframe of the DwPTS length and the number of time domain symbols for the SRS transmission is 13, the terminal may actually transmit the SRS.

Figure 21:
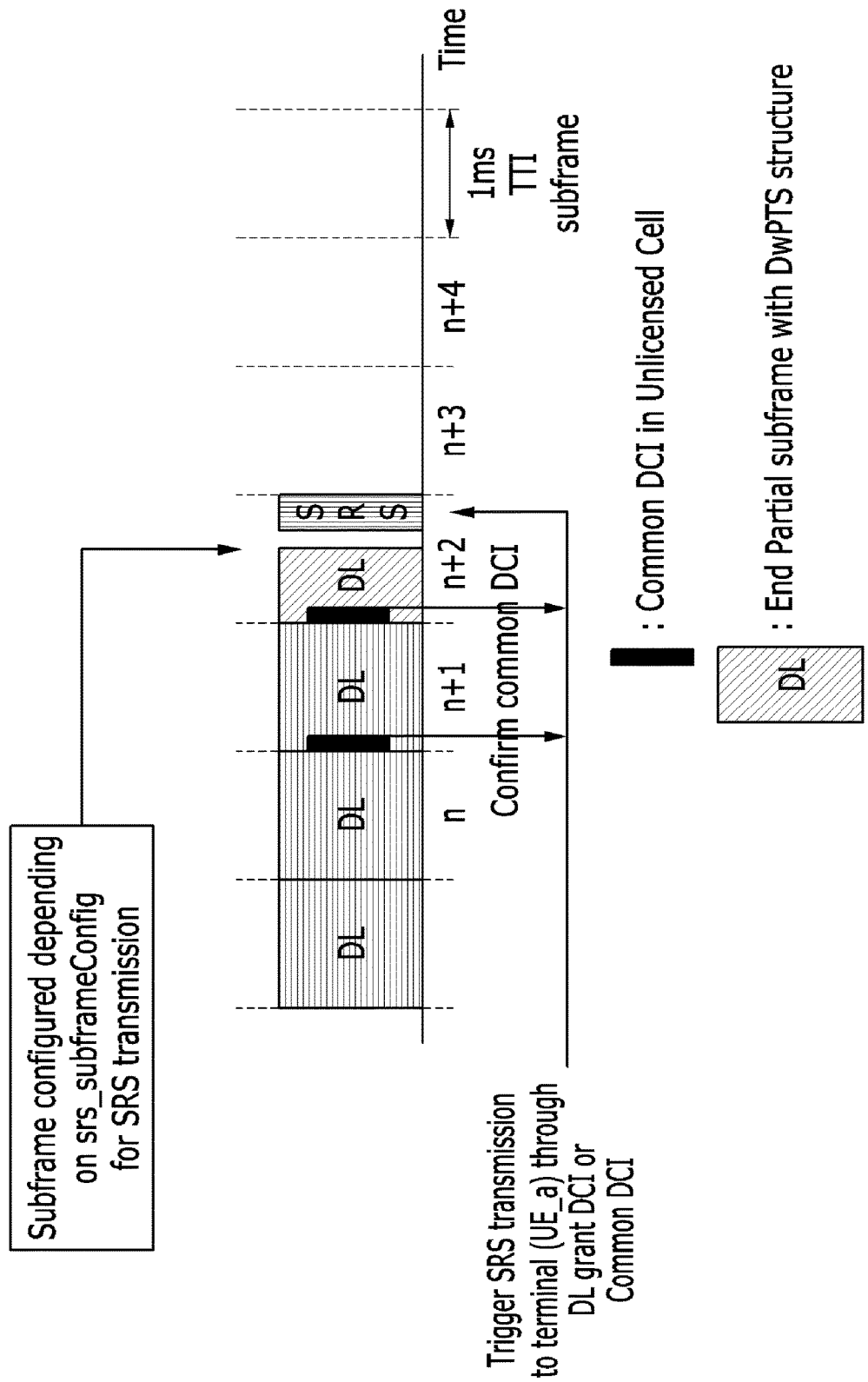
FIG. 21 is a diagram illustrating a method for aperiodically transmitting an SRS after a downlink partial subframe, according to an exemplary embodiment of the present invention.

FIG. 21 is a diagram illustrating a method for aperiodically transmitting an SRS after a downlink partial subframe, according to an exemplary embodiment of the present invention.

Specifically, FIG. 21 illustrates the case where the SRS transmission is triggered through the downlink grant DCI or the common DCI for the terminal UE_a and the common DCI information on the downlink subframe (downlink partial subframe) in the n+1-th subframe and the n+2-th subframe for the SRS transmission is identified. Here, the n+2-th subframe among the plurality of subframes n, n+1, . . . , n+4 is a subframe configured depending on the 'srs-subframeConfig' parameter for the SRS transmission and includes the ending downlink partial subframe of the DwPTS length.

When the common DCI information is confirmed, the terminal UE_a transmits SRS in the n+2-th subframe. At this time, the terminal UE_a may transmit the SRS after performing a single LBT of 25 μs depending on the number of time domain symbols of the ending downlink partial subframe of the DwPTS length or may transmit the SRS within 16 μs after the downlink without the LBT.

6. Trigger Type 2

The uplink resource may be configured according to the opportunistic connection in the unlicensed band, and therefore the trigger type of the unlicensed band cell may be defined. When the trigger type 2 is used, the SRS transmission may be triggered by the message included in the DCI of the UE-specific search space (e)PDCCH like the trigger type 1 or the SRS transmission may be triggered by the message included in the DCI of the common search space PDCCH of the unlicensed band cell downlink subframe 7. SRS Transmission Timing The transmission timing of the SRS transmitted by the terminal may be different from the uplink transmission timing of the cell group. The terminal may transmit the SRS at timing earlier than the normal uplink transmission timing by $TA_{SRS}$. The terminal may receive a $TA_{SRS}$ from the base station, in which the $TA_{SRS}$ may be signaled via a higher layer message (e.g., an RRC message) or included in the DCI message for the SRS configuration.

Meanwhile, in the resource configuration for the unlicensed band SRS transmission, the UpPTS may be extended. The extended UpPTS may include the time domain symbols (e.g., SC-FDMA symbols) that configure the ending downlink partial subframe of the unlicensed band and the remaining time interval of 1 ms TTI.

The number of time domain symbols of the ending downlink partial subframe of the downlink that may be configured to be the same length as the DwPTS may be one of a set of {3, 6, 9, 10, 11, 12}. That is, the ending downlink partial subframe may have a length corresponding to one of three time domain symbols, six time domain symbols, nine time domain symbols, ten time domain symbols, eleven time domain symbols, and twelve time domain symbols.

The extended UpPTS may consist of the remaining number of time domain symbols obtained by subtracting the number of time domain symbols of the ending partial subframe of the DwPTS length from the total number of time domain symbols of the subframe, in which the extended UpPTS may be configured to be spaced by a predetermined interval (for example, length corresponding to one time domain symbol or more) from the ending partial subframe of the DwPTS length. For example, the number of time domain symbols of the extended UpPTS may be one value of a set of {10, 7, 4, 3, 2, 1}. The slot parameter values required for the SRS sequence generation and resource configuration in the extended UpPTS may be replaced with values mapped by the time domain symbol index of the UpPTS.

Figure 22:
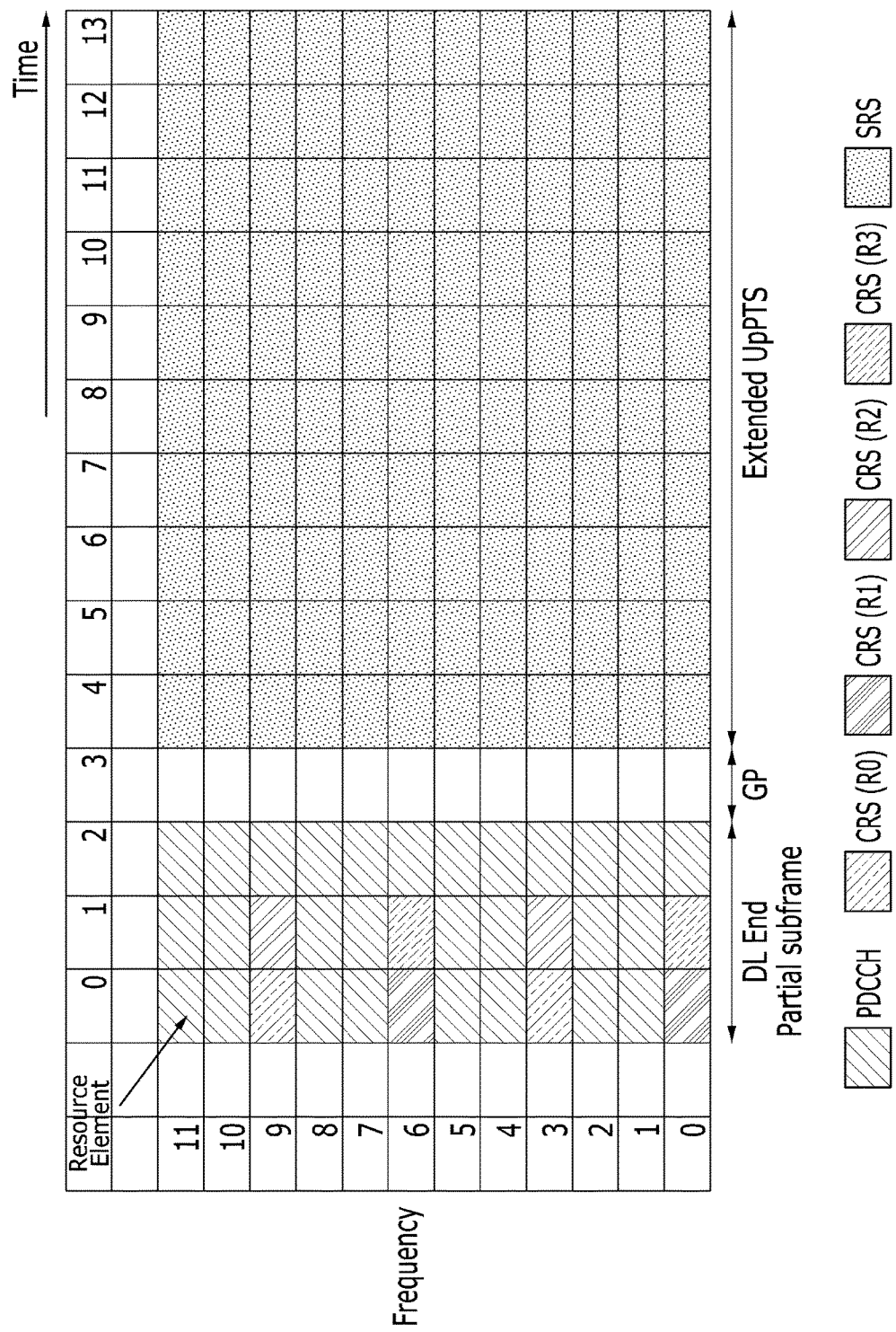
FIG. 22 is a diagram illustrating an extended uplink pilot time slot (UpPTS) consisting of 10 time domain symbols, according to an exemplary embodiment of the present invention.

FIG. 22 is a diagram illustrating an extended uplink pilot time slot (UpPTS) consisting of 10 time domain symbols, according to an exemplary embodiment of the present invention.

Specifically, FIG. 22 illustrates the case where the extended UpPTS exists after a guard period (GP) and includes 10 time domain symbols (Nos. 4 to 13). Here, the guard period GP for transmission/reception switching and propagation delay exists after the ending downlink partial subframe (time domain symbols Nos. 0 to 2) and may correspond to one time domain symbol.

In the extended UpPTS, several terminals may transmit the SRS using the same or different time domain symbols (e.g., SC-FDMA symbols).

The following Table 16 shows a case where time domain symbol No. 4 among time domain symbols (Nos. 4 to 13) included in the extended UpPTS of FIG. 22 are mapped to subframe No. 0 and slot 1. In the following Table 16, a symbol index represents a time domain symbol index, Sf_Index represents a subframe index, and $n_s$ represents a slot index.

TABLE 16

| Symbol Index | 4 | 5 | 6 | 7 | 8 | 9 | 10 | 11 | 12 | 13 |
|---|---|---|---|---|---|---|---|---|---|---|
| $n_s$ | 1 | 3 | 5 | 7 | 9 | 11 | 13 | 15 | 17 | 19 |
| Sf_Index | 0 | 1 | 2 | 3 | 4 | 5 | 6 | 7 | 8 | 9 |

As described above, the transmission timing of the SRS transmitted by the terminal may be different from the uplink transmission timing of the cell group. The terminal may transmit the SRS earlier than the normal uplink transmission timing by $TA_{SRS}$. Here, the $TA_{SRS}$ may be signaled through the higher layer message or may be included in the DCI message for the SRS configuration. Alternatively, the terminal may arbitrarily determine the $TA_{SRS}$ so that the SRS is transmitted within 16 μs after the downlink transmission is completed.

Figure 23:
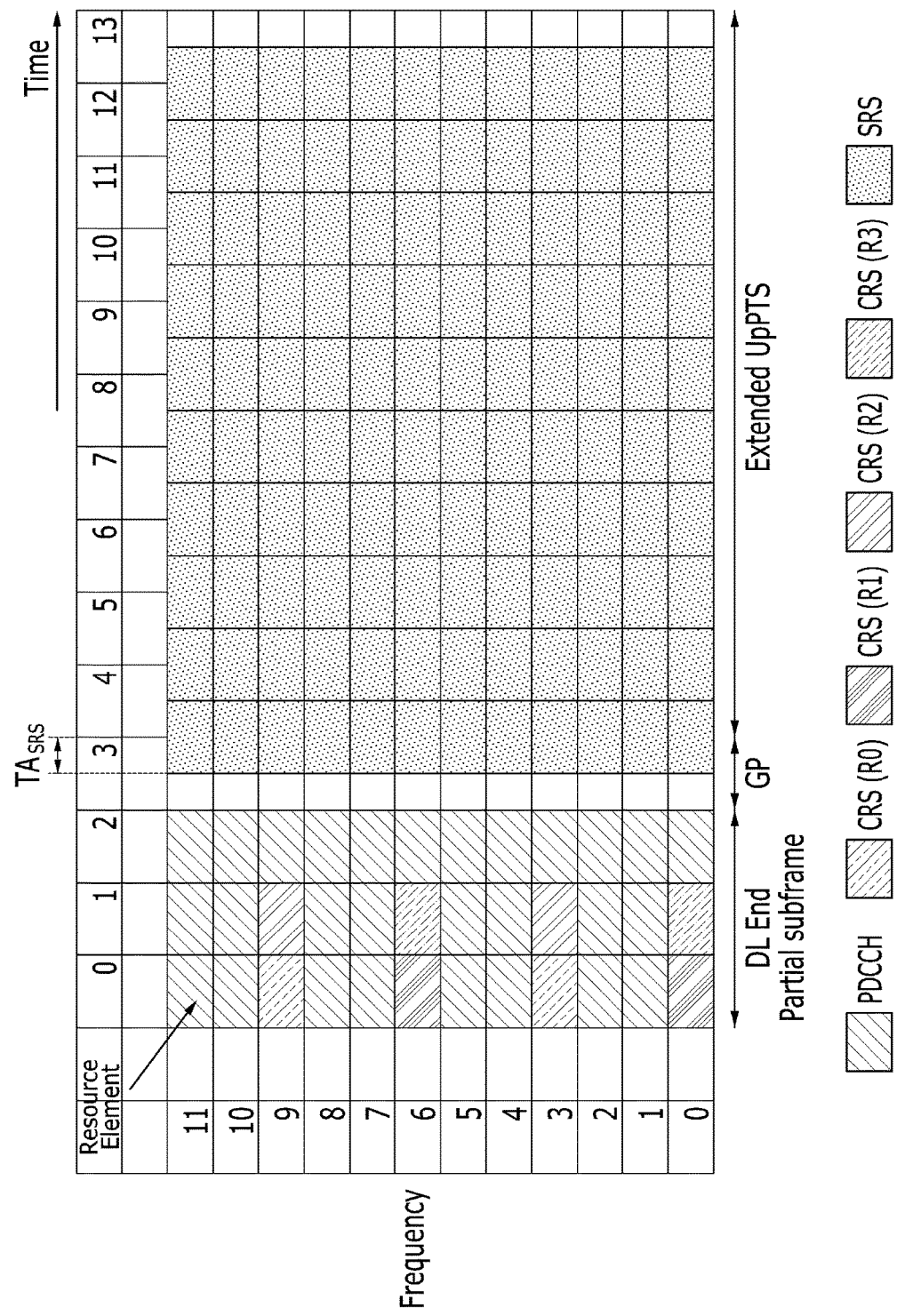
FIG. 23 is a diagram illustrating timing when a base station receives the SRS when the extended UpPTS of FIG. 22 is used, according to an exemplary embodiment of the present invention.

FIG. 23 is a diagram illustrating timing when a base station receives the SRS when the extended UpPTS of FIG. 22 is used, according to an exemplary embodiment of the present invention.

The result of the case where the SRS transmission resource is configured and each terminal transmits SRS as much as the $TA_{SRS}$ earlier than the transmission timing of the cell group as illustrated in FIG. 22 is illustrated in FIG. 23.

The effect of the result illustrated in FIG. 23 is that other wireless devices may be prevented from occupying the channel for the transmission length (for example, about 70 μs) from the downlink of the DwPTS length to the SRS transmission timing.

Further, the time (e.g., about 70 μs) from the downlink to the SRS transmission timing of the DwPTS length may be used as a channel occupancy state confirmation time. Here, the channel occupancy state confirmation time is a time required for the uplink subframe transmission or the downlink subframe transmission that is continuously configured after the SRS transmission.

Meanwhile, the information on the extended UpPTS may be signaled to the terminal. Here, the signaling may be transmitted through the RRC message of the higher layer. The signaling configuration information may include at least one of set information on a candidate length of the extended UpPTS, CCA related parameters for the SRS transmission of the extended UpPTS, time domain symbol information (e.g., time domain symbol offset, time domain symbol bundle) on the extended UpPTS mapped to the subframe index information associated with the SRS generation, and SRS hopping information.

At least one of the sequence generation parameter of the SRS to be transmitted by each terminal, a frequency domain resource to be transmitted by each terminal, and a time domain symbol resource to be transmitted by each terminal among the resources of the extended UpPTS may be signaled to the terminal. The signaling may consist of the RRC message in the higher layer, may be defined by information transmitted via the DCI of the unlicensed band common PDCCH, or may be included in each UE-specific DCI If the terminal confirms that the n-th subframe is the last subframe of the downlink, it is possible to transmit the SRS using the signaled information.

The method of confirming the SRS transmission timing of the terminal may include a method of signaling a DCI of an unlicensed band common PDCCH or a DCI of a UE-specific PDCCH to a terminal so that the terminal transmits an SRS in an n-th subframe. This signaling may include the configuration information on the SRS. The SRS configuration information may include the number of time domain symbols, the time domain symbol index to be used by each terminal, etc.

The method of confirming the SRS transmission time of the terminal may include a method of using SRS transmission period information configured by a terminal. Here, the SRS transmission period information may be configured for the UE-specific or may be commonly to all terminals as the cell-specific. The corresponding configuration information (e.g., SRS transmission period information) may be signaled to the terminal through the RRC of the higher layer Therefore, the terminal may also determine the SRS transmission timing based on the combination of the SRS transmission period information and the DCI information used in the method of confirming the SRS transmission timing of the terminal.

The method of confirming the SRS transmission time of the terminal may include a method for transmitting, by the terminal, an SRS by detecting an ending downlink partial subframe of an unlicensed band through a DCI of an unlicensed band common PDCCH included in a n-k-th subframe (for example, n−1-th subframe).

Figure 24:
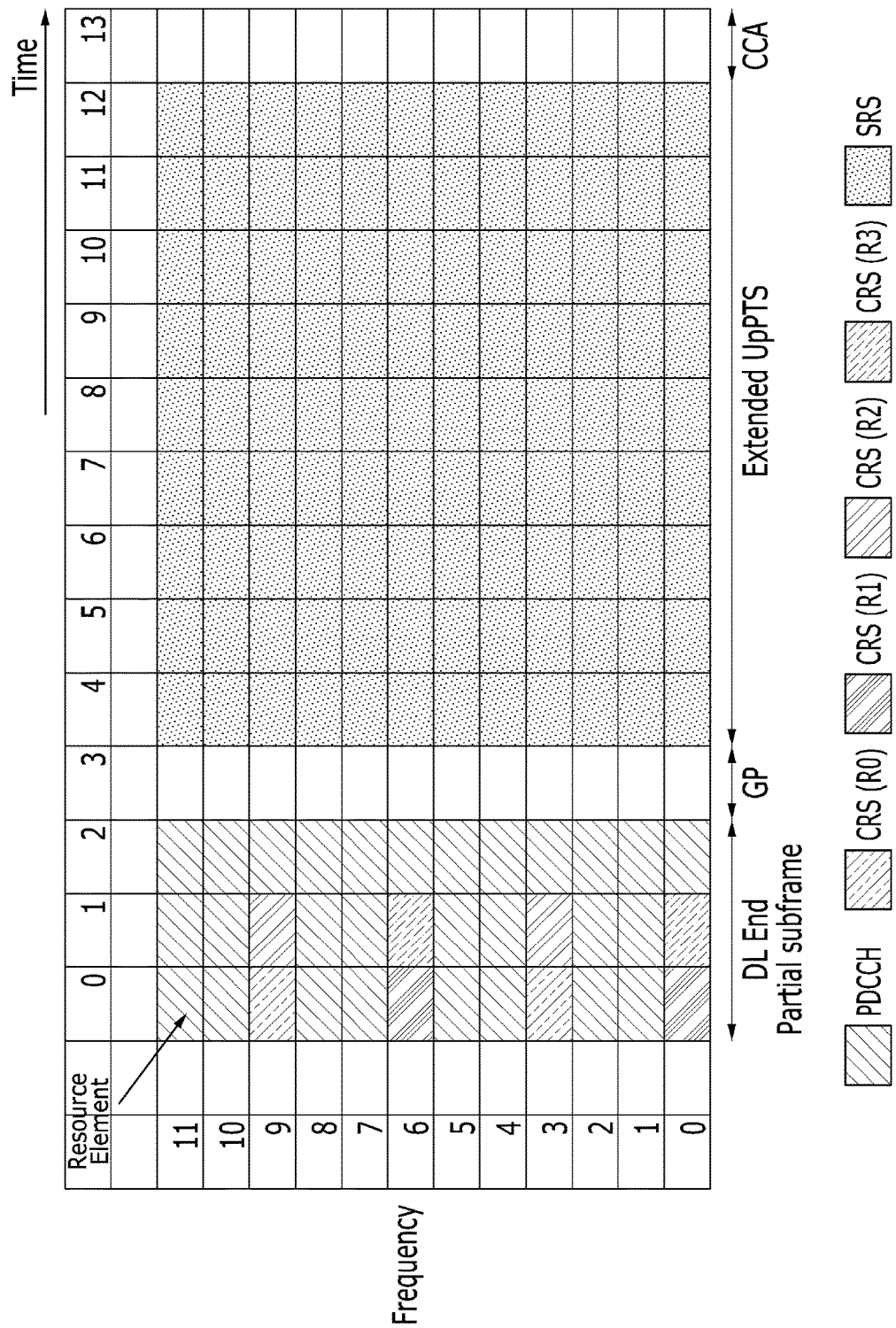
FIG. 24 is a diagram illustrating the extended UpPTS that does not include a last one time domain symbol, according to an exemplary embodiment of the present invention.

Meanwhile, if the extended UpPTS is used, for the CCA after the UpPTS, at least the last time domain symbol may be configured not to be used for the SRS transmission FIG. 24 is a diagram illustrating the extended UpPTS that does not include a last one time domain symbol, according to an exemplary embodiment of the present invention.

Specifically, FIG. 24 illustrates the case where the extended UpPTS is configured so that the last time domain symbol (for example, No. 13) of the subframe including the extended UpPTS is not used for the SRS transmission. The extended UpPTS illustrated in FIG. 24 includes nine time domain symbols (e.g., Nos. 4 to 12).

The CCA (e.g., CCA for the unlicensed band channel) in the last time domain symbol (e.g., No. 13) may be performed by a terminal to transmit the PUSCH or the like in the uplink subframe configured after the UpPTS. Alternatively, the CCA in the last time domain symbol (e.g., No. 13) may be performed by the base station to transmit the downlink subframe after the extended UpPTS configured depending on the SRS transmission period.

Meanwhile, in the resource configuration for the unlicensed band SRS transmission, the method of configuring the SRS transmission subframe may include a method of configuring up to 14 time domain symbols within a 1 ms TTI subframe for an SRS transmission. In this subframe, only the SRS may be transmitted or the SRS and the PRACH may be multiplexed and transmitted. The SRS transmission subframe may be configured independently of other downlink subframes or uplink subframes or may be configured in some or the whole before or after the uplink transmission burst. To meet a limited transmission opportunity (TxOP) length, the SRS transmission subframe may be configured in the first subframe or the last subframe of the uplink transmission burst.

Meanwhile, the number of time domain symbols configured for the actual SRS transmission may be defined by the DCI included in the PDCCH common search period.

Figure 25:
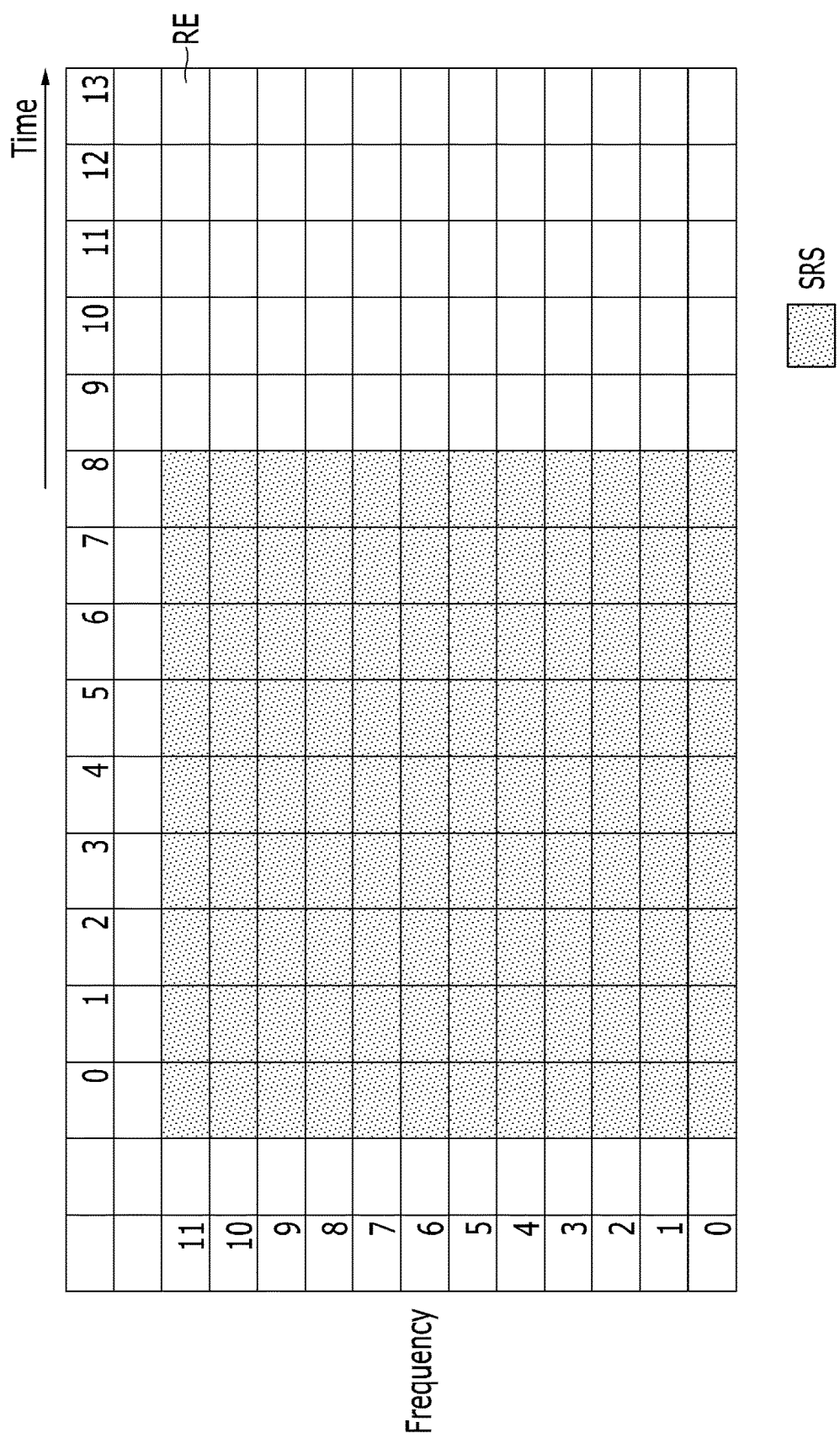
FIG. 25 is a diagram illustrating an SRS transmission subframe in which first nine time domain symbols are configured for an SRS transmission, according to an exemplary embodiment of the present invention.

FIG. 25 is a diagram illustrating an SRS transmission subframe in which first nine time domain symbols are configured for an SRS transmission, according to an exemplary embodiment of the present invention.

Specifically, FIG. 25 illustrates the case where nine time domain symbols (for example, Nos. 0 to 8) existing in a head part of the subframe are configured (usable) for the SRS transmission.

Figure 26:
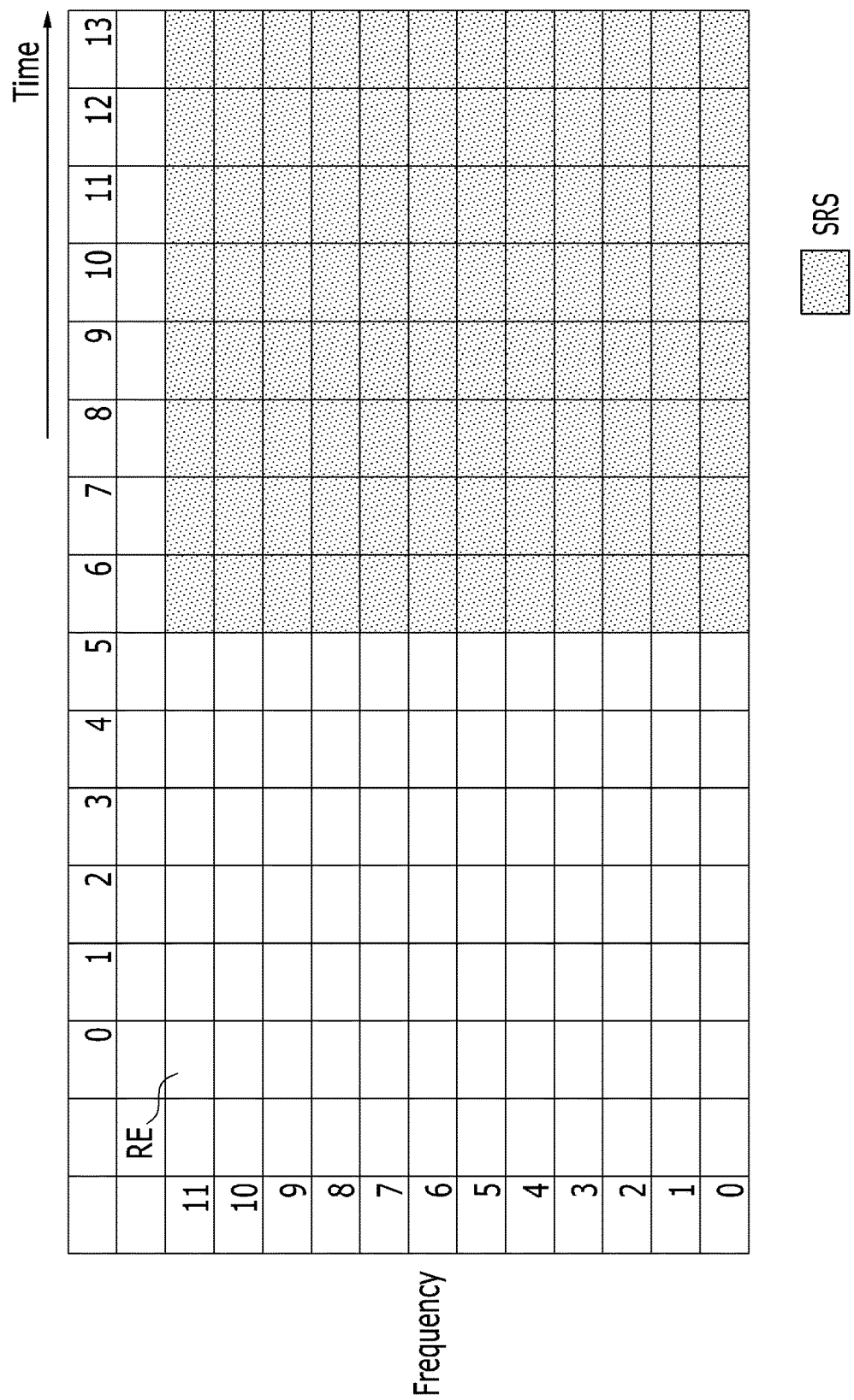
FIG. 26 is a diagram illustrating the SRS transmission subframe in which last eight time domain symbols are configured for the SRS transmission, according to an exemplary embodiment of the present invention.

FIG. 26 is a diagram illustrating the SRS transmission subframe in which last eight time domain symbols are configured for the SRS transmission, according to an exemplary embodiment of the present invention.

Specifically, FIG. 26 illustrates the case where eight time domain symbols (for example, Nos. 6 to 8) existing in a tail part of the subframe are configured (usable) for the SRS transmission.

The following Table 17 (mapping for the exemplary embodiment of FIG. 25) shows the case where the time domain symbol index is mapped to the subframe index and the slot index in the exemplary embodiment of FIG. 25. In the following Table 17, a symbol index represents a time domain symbol index, Sf_Index represents a subframe index, and $n_s$ represents a slot index.

TABLE 17

| Symbol Index | 0 | 1 | 2 | 3 | 4 | 5 | 6 | 7 | 8 |
|---|---|---|---|---|---|---|---|---|---|
| $n_s$ | 1 | 3 | 5 | 7 | 9 | 11 | 13 | 15 | 17 |
| Sf_Index | 0 | 1 | 2 | 3 | 4 | 5 | 6 | 7 | 8 |

The following Table 18 (mapping for the exemplary embodiment of FIG. 26) shows the case where the time domain symbol index is mapped to the subframe index and the slot index in the exemplary embodiment of FIG. 26. In the following Table 18, a symbol index represents a time domain symbol index, Sf_Index represents a subframe index, and $n_s$ represents a slot index.

TABLE 18

| Symbol Index | 6 | 7 | 8 | 9 | 10 | 11 | 12 | 13 |
|---|---|---|---|---|---|---|---|---|
| $n_s$ | 1 | 3 | 5 | 7 | 9 | 11 | 13 | 15 |
| Sf_Index | 0 | 1 | 2 | 3 | 4 | 5 | 6 | 7 |

Meanwhile, for the performance of the CCA, at least one time domain symbol existing in at least the first time domain symbol of the SRS transmission subframe, at least the last time domain symbol in the SRS transmission subframe, or at least one time domain symbol existing in each of the first and last SRS transmission subframes of the SRS transmission subframe may be configured not to be used for the SRS transmission. The slot parameter values required for the SRS sequence generation and resource configuration in the SRS transmission subframe may be replaced with values mapped by the time domain symbol index of the SRS transmission subframe.

Figure 27:
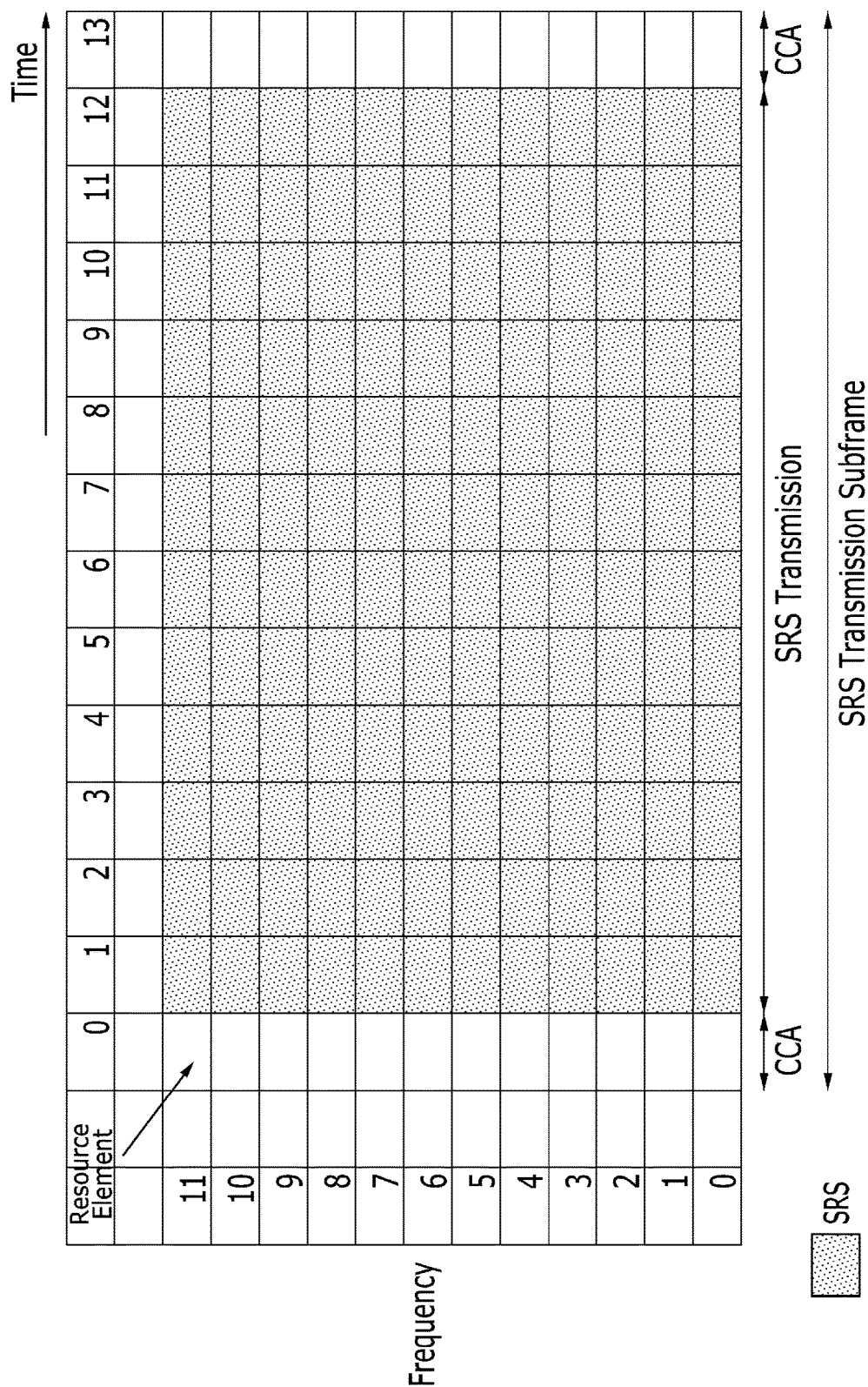
FIG. 27 is a diagram illustrating the SRS transmission subframe in which a first time domain symbol and a last time domain symbol each are not configured for the SRS transmission, according to an exemplary embodiment of the present invention.

FIG. 27 is a diagram illustrating the SRS transmission subframe in which a first time domain symbol and a last time domain symbol each are not configured for the SRS transmission, according to an exemplary embodiment of the present invention.

Specifically, in FIG. 27, twelve time domain symbols (e.g., Nos. 1 to 12) of the time domain symbols of the SRS transmission subframe are configured for the SRS transmission and the remaining time domain symbols (for example, Nos. 0 and 13) are configured not to be used for the SRS transmission. For example, the first time domain symbol (e.g., No. 0) and the last time domain symbol (e.g., No. 13) may be used for the CCA.

The SRS transmission subframe illustrated in FIG. 27 may be configured between downlink subframes in frame structure type 3 for the periodic SRS transmission. Alternatively, the subframe illustrated in FIG. 27 may be configured at the end after the downlink transmission burst. Alternatively, the subframe illustrated in FIG. 27 may be configured between the uplink subframes or at the end after the uplink transmission burst.

The following Table 19 below shows the case where the time domain symbol No. 1 of the SRS transmission subframe is mapped to the subframe No. 0 and the slot No. 1 in the exemplary embodiment of FIG. 27. In the following Table 19, a symbol index represents a time domain symbol index, Sf_Index represents a subframe index, and $n_s$ represents a slot index.

TABLE 19

| Symbol Index | 1 | 2 | 3 | 4 | 5 | 6 | 7 | 8 | 9 | 10 | 11 | 12 |
|---|---|---|---|---|---|---|---|---|---|---|---|---|
| $n_s$ | 1 | 3 | 5 | 7 | 9 | 11 | 13 | 15 | 17 | 19 | 1 | 3 |
| Sf_Index | 0 | 1 | 2 | 3 | 4 | 5 | 6 | 7 | 8 | 9 | 0 | 1 |

In the above Table 19, time domain symbol No. 11 is mapped to subframe No. 0 and slot No. 1 again by a modulo operation. Similarly, in the above Table 19, time domain symbol No. 12 is mapped to subframe No. 1 and slot No. 3 again by the modulo operation. In this case, the SRS may be transmitted in a different resources than the time domain symbol #1. Alternatively, the SRS may be transmitted in another resource by hopping pattern.

Figure 28:
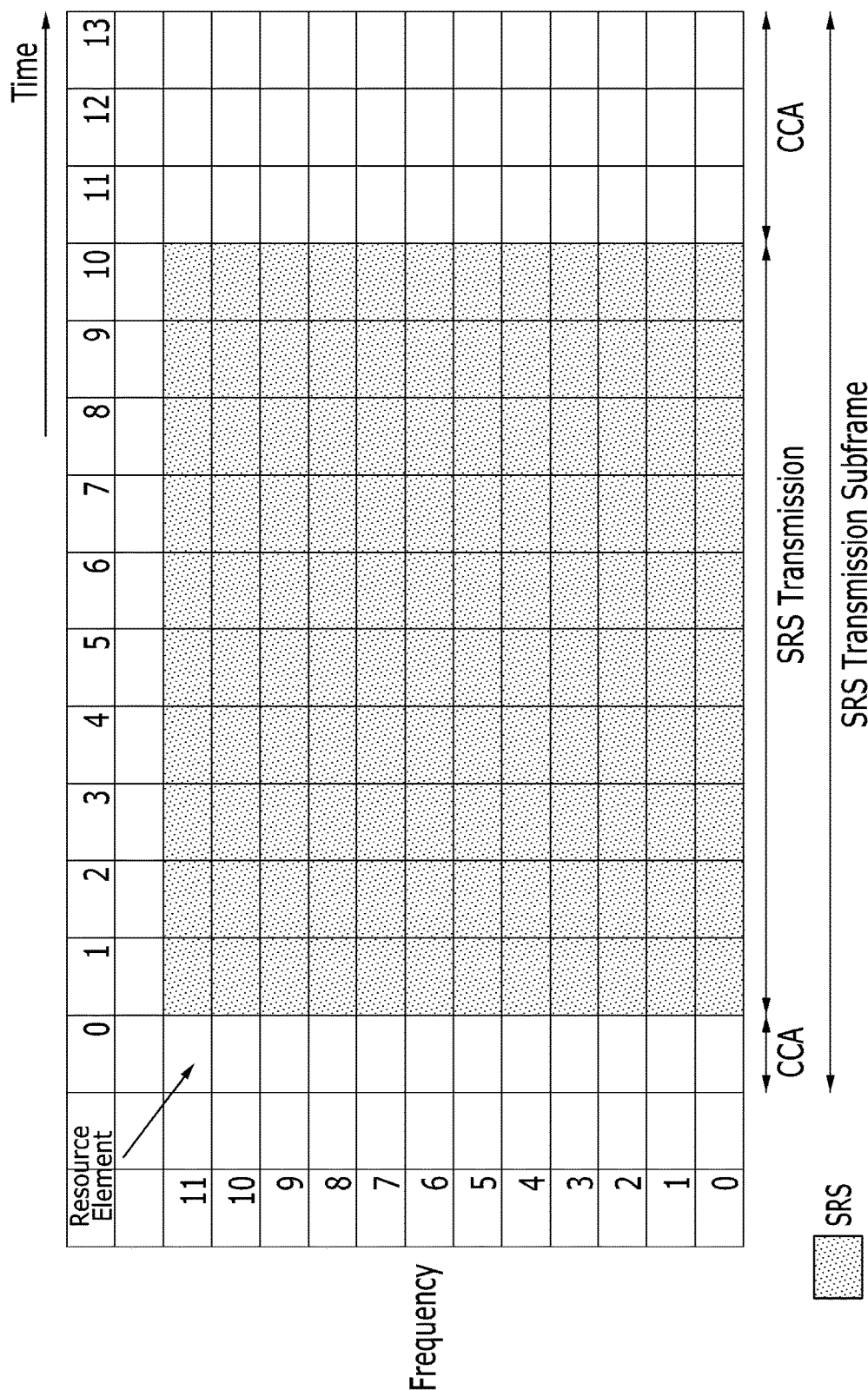
FIG. 28 is a diagram illustrating the SRS transmission subframe in which a first one time domain symbol and last three time domain symbols are not configured for the SRS transmission, according to an exemplary embodiment of the present invention.

FIG. 28 is a diagram illustrating the SRS transmission subframe in which a first one time domain symbol and last three time domain symbols are not configured for the SRS transmission, according to an exemplary embodiment of the present invention.

Specifically, FIG. 28 illustrates the case where the terminal performs the CCA for the first time domain symbol (e.g., No. 0) period and the plurality of terminals transmit the SRS during 10 time domain symbols (e.g., Nos. 1 to 10).

The next three time domain symbols (e.g., Nos. 11 to 13) may not be used. Alternatively, the next three time domain symbols (e.g., Nos. 11 to 13) may be used for at least CCA performance or for a transmission of a channel occupancy signal, prior to the start of a continuous downlink subframe or uplink subframe.

That is, ten time domain symbols (e.g., Nos. 1 to 10) of the time domain symbols of the SRS transmission subframe are configured for the SRS transmission and the remaining time domain symbols (for example, Nos. 0 and 11 to 13) are configured not to be used for the SRS transmission. For example, the remaining time domain symbols (e.g., Nos. 0 and 11 to 13) may be used for the CCA.

The following Table 20 below shows the case where the time domain symbol No. 1 of the SRS transmission subframe is mapped to the subframe No. 0 and the slot No. 1 in the exemplary embodiment of FIG. 28. In the following Table 20, a symbol index represents a time domain symbol index, Sf_Index represents a subframe index, and $n_s$ represents a slot index.

TABLE 20

| Symbol Index | 1 | 2 | 3 | 4 | 5 | 6 | 7 | 8 | 9 | 10 |
|---|---|---|---|---|---|---|---|---|---|---|
| $n_s$ | 1 | 3 | 5 | 7 | 9 | 11 | 13 | 15 | 17 | 19 |
| Sf_Index | 0 | 1 | 2 | 3 | 4 | 5 | 6 | 7 | 8 | 9 |

Figure 29:
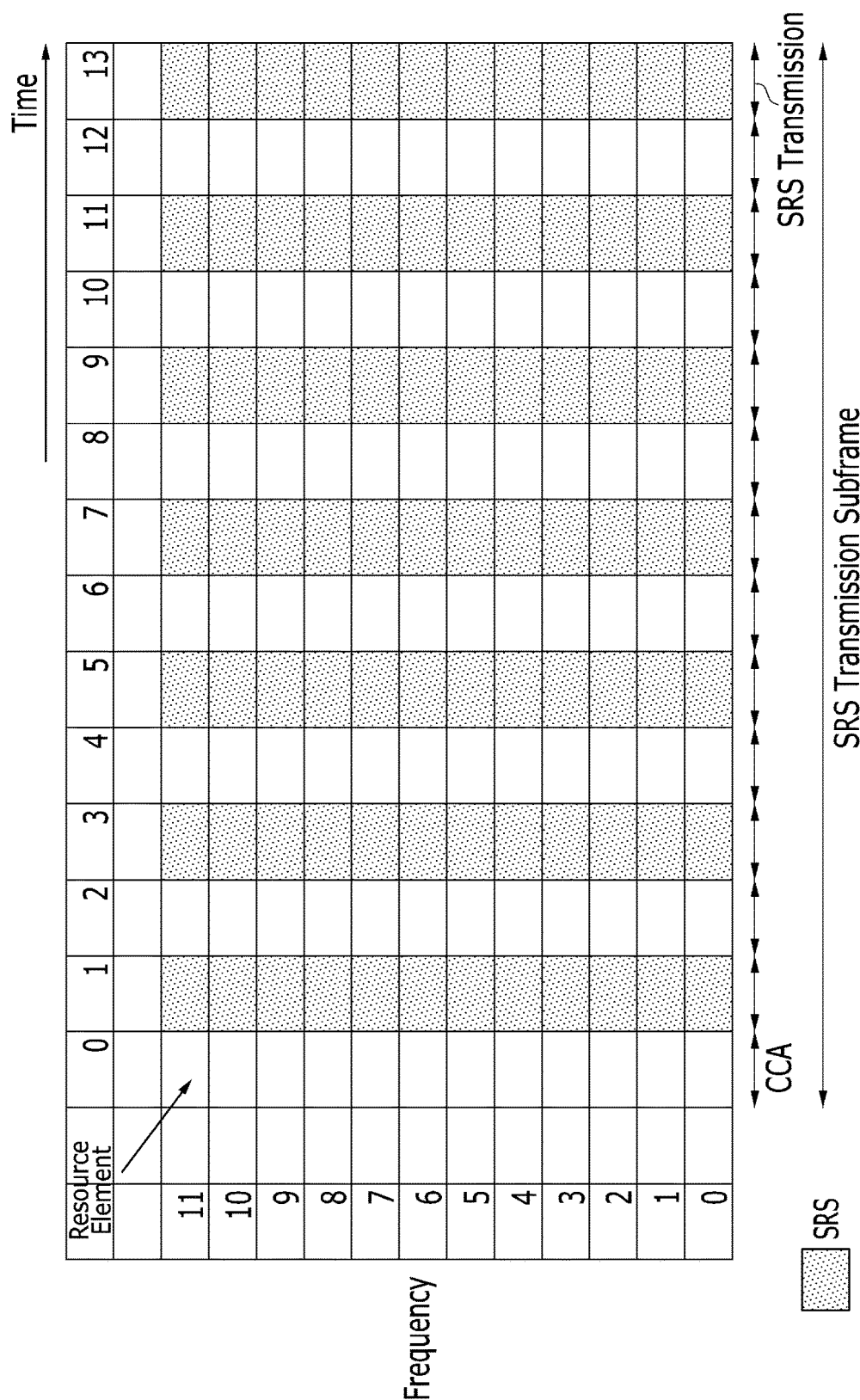
FIG. 29 is a diagram illustrating a case where the SRS is configured in the time domain symbol that is (time domain symbol index mod 2)=1, according to an exemplary embodiment of the present invention.

FIG. 29 is a diagram illustrating the SRS transmission subframe in which the SRS is configured in the time domain symbol that is (time domain symbol index mod 2)=1, according to an exemplary embodiment of the present invention.

Specifically, FIG. 29 illustrates the case where the SRS is configured only for the time domain symbol that is (time domain symbol index mod 2)=1 in order to perform the CCA before each terminal transmits the SRS.

A total of seven time domain symbols (e.g., Nos. 1, 3, 5, 7, 9, 11, and 13) are configured for the SRS transmission and each terminal may perform the CCA prior to the SRS transmission.

That is, the even-numbered time domain symbols (e.g., Nos. 1, 3, 5, 7, 9, 11, and 13) among the time domain symbols of the SRS transmission subframe may be configured (usable) for the SRS transmission and the odd-numbered time domain symbols (e.g., Nos. 0, 2, 4, 6, 8, 10, and 12) are configured not to be used for the SRS transmission. For example, the odd-numbered time domain symbols (e.g., Nos. 0, 2, 4, 6, 8, 10, and 12) may be used for the CCA.

The following Table 21 shows the case where the time domain symbol index of the SRS transmission subframe is mapped to the subframe index or the slot index in the exemplary embodiment of FIG. 29. In the following Table 21, a symbol index represents a time domain symbol index, Sf_Index represents a subframe index, and $n_s$ represents a slot index.

TABLE 21

| Symbol Index | 1 | 3 | 5 | 7 | 9 | 11 | 13 |
|---|---|---|---|---|---|---|---|
| $n_s$ | 1 | 3 | 5 | 7 | 9 | 11 | 13 |
| Sf_Index | 0 | 1 | 2 | 3 | 4 | 5 | 6 |

Meanwhile, the information on the SRS transmission subframe may be signaled to the terminal. Here, the signaling may be transmitted through the RRC message of the higher layer. The signaling configuration information may include at least one of period information of the SRS transmission subframe, the number of time domain symbols used in the SRS transmission subframe, CCA related parameters, the time domain symbol information (for example, time domain symbol offset, time domain symbol bundle, etc.) on the SRS transmission subframe mapped to the subframe index information associated with the SRS generation, and SRS hopping information.

At least one of the sequence generation parameter of the SRS to be transmitted by each terminal, a frequency domain resource to be transmitted by each terminal, and a time domain symbol resource to be transmitted by each terminal within the SRS transmission subframe may be signaled to the terminal. Here, the signaling may consist of the RRC message in the higher layer, may be defined by information transmitted via the DCI of the unlicensed band common PDCCH, or may be included in each UE-specific DCI.

The method of confirming the SRS transmission timing of the terminal may include a method of signaling a DCI of an unlicensed band common PDCCH or a DCI of a UE-specific PDCCH to a terminal so that the terminal transmits an SRS in an n-th subframe. This signaling may include the configuration information of the SRS. The SRS configuration information may include the number of time domain symbols, the time domain symbol index to be used by each terminal, etc.

The method of confirming the SRS transmission time of the terminal may include a method of using SRS transmission period information configured by the terminal. Here, the SRS transmission period information may be configured for the UE-specific or may be commonly configured to all terminals as the cell-specific. The corresponding configuration information (e.g., SRS transmission period information) may be signaled to the terminal through the RRC of the higher layer Therefore, the terminal may also determine the SRS transmission timing based on the combination of the SRS transmission period information and the DCI information used in the method of confirming the SRS transmission timing of the terminal.

Meanwhile, in the resource configuration for the unlicensed band SRS transmission, the subframe including the extended SRS may be used.

A method for extending an SRS resource configured in a last time domain symbol of an uplink to a plurality of last time domain symbols and configuring it may be used. The slot parameter values required for the SRS sequence generation and resource configuration in the subframe including the extended SRS may be replaced with values mapped by the time domain symbol index of the SRS transmission subframe.

Figure 30:
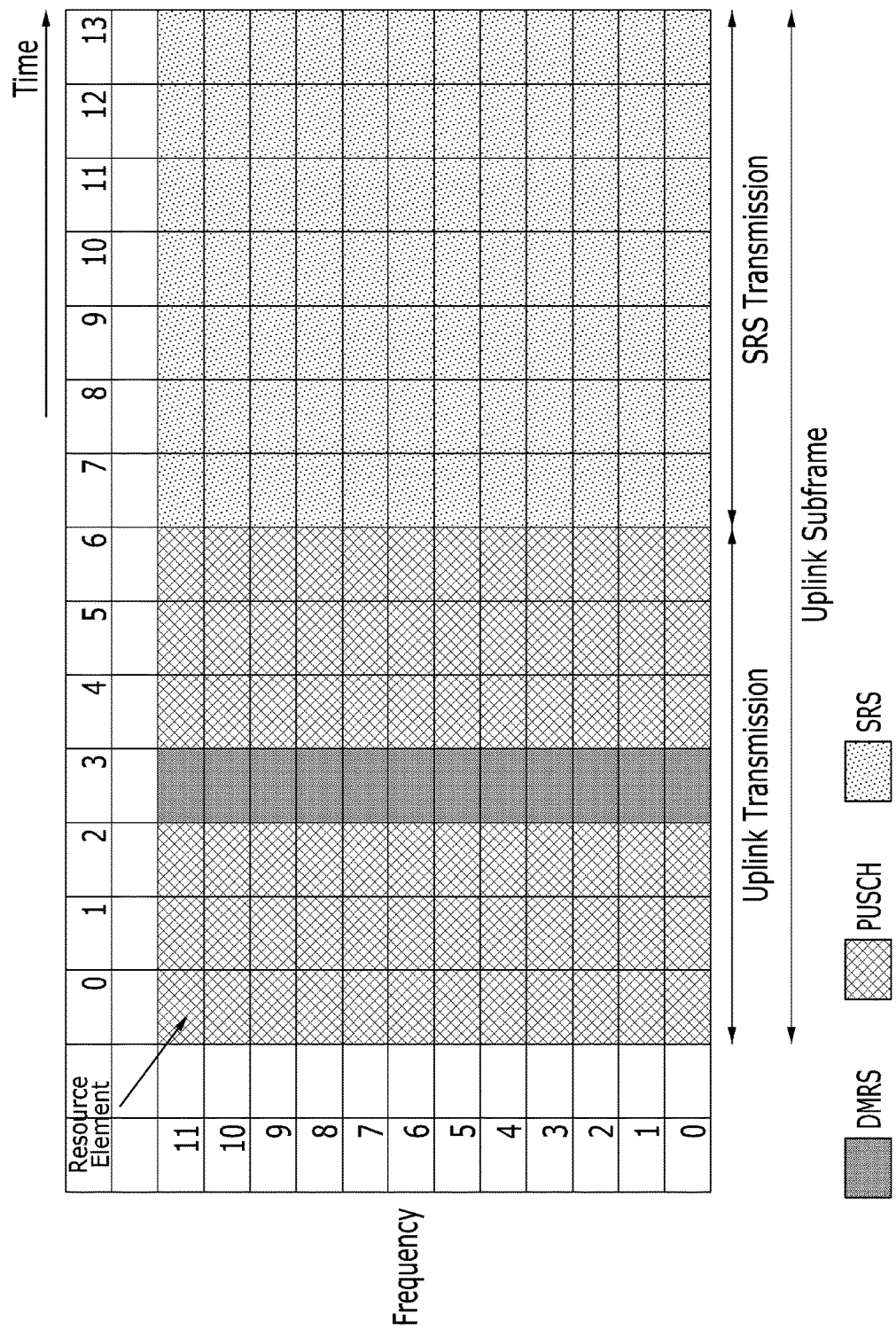
FIG. 30 is a diagram illustrating a case where a second slot of a subframe is configured for the SRS transmission, according to the exemplary embodiment of the present invention.

FIG. 30 is a diagram illustrating a case where a second slot of a subframe is configured for the SRS transmission, according to the exemplary embodiment of the present invention.

Specifically, FIG. 30 illustrates the case where a second slot among a first slot and the second slot of the uplink subframe may be configured (usable) for the SRS transmission. Further, the first slot of the uplink subframe is configured for the uplink transmission (e.g., DMRS, PUSCH).

However, this is only an example. As illustrated in the exemplary embodiment of FIG. 29, for the CCA, some of time domain symbols in the second slot may also be configured not to be used for the SRS transmission.

The following Table 22 shows the case where the extended time domain symbol index of the SRS is mapped to the subframe index or the slot index in the exemplary embodiment of FIG. 30. In the following Table 22, a symbol index represents a time domain symbol index, Sf_Index represents a subframe index, and $n_s$ represents a slot index.

TABLE 22

| Symbol Index | 7 | 8 | 9 | 10 | 11 | 12 | 13 |
|---|---|---|---|---|---|---|---|
| $n_s$ | 1 | 3 | 5 | 7 | 9 | 11 | 13 |
| Sf_Index | 0 | 1 | 2 | 3 | 4 | 5 | 6 |

Meanwhile, the information on the subframe including the extended SRS may be signaled to the terminal. Here, the signaling may be transmitted to the RRC message of the higher layer. The signaling configuration information may include at least one of period information of the subframe configuring the extended SRS, the number of time domain symbols configuring the extended SRS, the CCA related parameters, the time domain symbol information (for example, time domain symbol offset, time domain symbol bundle, etc.) mapped to the subframe index information associated with the SRS generation and configuring the extended SRS, and the SRS hopping information.

At least one of the sequence generation parameter of the SRS to be transmitted by each terminal, a frequency domain resource to be transmitted by each terminal, and a time domain symbol resource to be transmitted by each terminal within the subframe including the extended SRS may be signaled to the terminal. Here, the signaling may consist of the RRC message in the higher layer, may be defined by information transmitted via the DCI of the unlicensed band common PDCCH, or may be included in each UE-specific DCI.

The method of confirming the SRS transmission timing of the terminal may include a method of signaling a DCI of an unlicensed band common PDCCH or a DCI of a UE-specific PDCCH to the terminal so that the terminal transmits an SRS in an n-th subframe. This signaling may include the configuration information of the SRS. The SRS configuration information may include the number of time domain symbols, the time domain symbol index to be used by each terminal, etc.

The method of confirming the SRS transmission time of the terminal may include a method of using SRS transmission period information configured by the terminal. Here, the SRS transmission period information may be configured for the UE-specific or may be commonly to all terminals as the cell-specific. The corresponding configuration information (e.g., SRS transmission period information) may be signaled to the terminal through the RRC of the higher layer Therefore, the terminal may also determine the SRS transmission timing based on the combination of the SRS transmission period information and the DCI information used in the method of confirming the SRS transmission timing of the terminal.

In all the exemplary embodiments described above, the transmission timing of the SRS transmitted by the terminal may be different from the uplink transmission timing of the cell group. The terminal may transmit the SRS as much as $TA_{SRS}$ earlier than the normal uplink transmission timing (for example, exemplary embodiment of FIG. 23). Here, the $TA_{SRS}$ may be signaled through the higher layer message or may be included in the DCI message for the SRS configuration.

The exemplary embodiments of the present invention are not implemented only by the apparatus and/or method as described above, but may be implemented by programs realizing the functions corresponding to the configuration of the exemplary embodiments of the present invention or a recording medium recorded with the programs, which may be readily implemented by a person having ordinary skill in the art to which the present invention pertains from the description of the foregoing exemplary embodiments.

Although the exemplary embodiment of the present invention has been described in detail hereinabove, the scope of the present invention is not limited thereto. That is, several modifications and alterations made by those skilled in the art using a basic concept of the present invention as defined in the claims fall within the scope of the present invention.

The invention claimed is:

1. A method for transmitting, by a terminal, a sounding reference signal (SRS), the method comprising:
   receiving timing advance (TA) information for an SRS transmission from a base station through either one or both of a radio resource control (RRC) message and a downlink control information (DCI) message; and
   transmitting an SRS at a timing based on the TA information using either one or both of an SRS subframe configured for the SRS transmission and an extended uplink pilot time slot (UpPTS),
   wherein the extended UpPTS is spaced by a predetermined interval from a downlink partial subframe having a downlink pilot time slot (DwPTS) length, and
   wherein a last time domain symbol of a subframe comprising the extended UpPTS is used for clear channel assessment (CCA) for an unlicensed band channel.

2. The method of claim 1, wherein the downlink partial subframe has a length corresponding to any one of three time domain symbols, six time domain symbols, nine time domain symbols, ten time domain symbols, eleven time domain symbols, and twelve time domain symbols, and
   the predetermined interval is equal to or larger than a length corresponding to one time domain symbol.

3. The method of claim 1, wherein some time domain symbols existing in a head part among time domain symbols of the SRS subframe or some time domain symbols existing in a tail part among the time domain symbols of the SRS subframe are used for the SRS transmission.

4. The method of claim 1, wherein one time domain symbol existing in a head part among time domain symbols of the SRS subframe or one time domain symbol existing in a tail part among the time domain symbols of the SRS subframe is used for clear channel assessment (CCA) for an unlicensed band channel.

5. The method of claim 1, wherein even-numbered time domain symbols among time domain symbols of the SRS subframe are used for the SRS transmission, and
   odd-numbered time domain symbols among the time domain symbols of the SRS subframe are used for clear channel assessment (CCA) for an unlicensed band channel.

6. The method of claim 1, wherein the SRS subframe comprises a first time slot and a second time slot subsequent to the first time slot, and
   the second time slot of the SRS subframe is used for the SRS transmission.

7. A terminal for transmitting a sounding reference signal (SRS), the terminal comprising:
   a processor;
   a communication device, and
   a memory storing instructions that, when executed by the processor, cause the processor to control the communication device to:
   receive timing advance (TA) information for an SRS transmission from a base station through either one or both of a radio resource control (RRC) message and a downlink control information (DCI) message; and
   transmit an SRS at a timing based on the TA information using either one of or both an SRS subframe configured for the SRS transmission and an extended uplink pilot time slot (UpPTS),
   wherein the extended UpPTS is spaced by a predetermined interval from a downlink partial subframe having a downlink pilot time slot (DwPTS) length, and
   wherein a last time domain symbol of a subframe comprising the extended UpPTS is used for clear channel assessment (CCA) for an unlicensed band channel.

8. The terminal of claim 7, wherein the downlink partial subframe has a length corresponding to any one of three time domain symbols, six time domain symbols, nine time domain symbols, ten time domain symbols, eleven time domain symbols, and twelve time domain symbols, and
   the predetermined interval is equal to or larger than a length corresponding to one time domain symbol.

9. The terminal of claim 7, wherein some time domain symbols existing in a head part among time domain symbols of the SRS subframe or some time domain symbols existing in a tail part among the time domain symbols of the SRS subframe are used for the SRS transmission.

10. The terminal of claim 7, wherein one time domain symbol existing in a head part among time domain symbols of the SRS subframe or one time domain symbol existing in a tail part among the time domain symbols of the SRS subframe is used for clear channel assessment (CCA) for an unlicensed band channel.

11. The terminal of claim 7, wherein even-numbered time domain symbols among time domain symbols of the SRS subframe are used for the SRS transmission, and
odd-numbered time domain symbols among the time domain symbols of the SRS subframe are used for clear channel assessment (CCA) for an unlicensed band channel.

12. The terminal of claim 7, wherein the SRS subframe comprises a first time slot and a second time slot subsequent to the first time slot, and
the second time slot of the SRS subframe is used for the SRS transmission.

\* \* \* \* \*